United States Patent [19]
Murase et al.

[11] Patent Number: 5,907,658
[45] Date of Patent: May 25, 1999

[54] MULTIMEDIA OPTICAL DISK, REPRODUCTION APPARATUS AND METHOD FOR ACHIEVING VARIABLE SCENE DEVELOPMENT BASED ON INTERACTIVE CONTROL

[75] Inventors: Kaoru Murase, Ikoma-gun; Masayuki Kozuka, Neyagawa; Kazuhiro Tsuga, Takarazuka; Yoshihisa Fukushima, Osaka; Kazuhiko Yamauchi, Neyagawa; Katsuhiko Miwa, Osaka, all of Japan

[73] Assignee: Matsushita Electric Industrial Co., Ltd., Osaka-Fu, Japan

[21] Appl. No.: 08/700,283

[22] Filed: Aug. 20, 1996

[30] Foreign Application Priority Data

Aug. 21, 1995 [JP] Japan .................................. 7-211948
Apr. 5, 1996 [JP] Japan .................................. 8-084221

[51] Int. Cl.⁶ ............................ H04N 5/781; H04N 5/92
[52] U.S. Cl. ............................... 386/95; 386/125; 386/70
[58] Field of Search ................................. 386/125–126, 386/95, 96, 98, 104, 105, 106, 45, 69, 70; 360/18, 20; 369/32, 47, 48, 54, 58, 275.2, 275.3; H04N 5/781, 5/92, 5/26, 5/85, 9/79

[56] References Cited

U.S. PATENT DOCUMENTS

| | | | |
|---|---|---|---|
| 4,305,131 | 12/1981 | Best . | |
| 4,953,035 | 8/1990 | Yoshio . | |
| 5,043,826 | 8/1991 | Yoshio et al. . | |
| 5,065,252 | 11/1991 | Yoshio et al. . | |
| 5,097,349 | 3/1992 | Nomura et al. . | |
| 5,331,423 | 7/1994 | Ota et al. | 386/125 |
| 5,408,448 | 4/1995 | Carman . | |
| 5,506,370 | 4/1996 | Nakai et al. | 84/637 |
| 5,515,346 | 5/1996 | Watanabe et al. | 369/13 |
| 5,630,006 | 5/1997 | Hirayama et al. | 386/125 |
| 5,655,052 | 8/1997 | Nakai et al. | 386/125 |
| 5,687,160 | 11/1997 | Aotake et al. | 386/126 |

FOREIGN PATENT DOCUMENTS

| | | |
|---|---|---|
| 0600511 | of 0000 | European Pat. Off. . |
| 0624264 | of 0000 | European Pat. Off. . |
| 0677847 | of 0000 | European Pat. Off. . |
| 0677961 | of 0000 | European Pat. Off. . |
| 0689206 | of 0000 | European Pat. Off. . |
| 542377 | of 0000 | European Pat. Off. . |
| 653699 | of 0000 | European Pat. Off. . |
| 677842 | of 0000 | European Pat. Off. . |
| 724264 | of 0000 | European Pat. Off. . |
| 750304 | of 0000 | European Pat. Off. . |
| 9317430 | of 0000 | Germany . |

(List continued on next page.)

OTHER PUBLICATIONS

Parker, D.J., "Density Re–Inventing the Disc", CD ROM Professional, vol. 8, No. 6, Jun. 1995, pp. 21/22, 24, 26–33.

Primary Examiner—Thai Tran
Attorney, Agent, or Firm—Price Gess & Ubell

[57] ABSTRACT

A multimedia optical disk is provided. The multimedia optical disk includes a data area for storing objects which include moving picture data and at least one of audio data and sub-picture data. The multimedia optical disk also includes an index area for storing reproduction orders of the objects. Route information in the index area includes a sequence of addresses of objects whose alignment represents a reproduction order. Chain control information in the index area corresponds to the route information. The chain control information, being effective in reproducing objects specified by the alignment of the sequence of addresses (objects specified by the alignment of the sequence of addresses are called a chain), instructs the reproduction apparatus to have a navigation control of the chain. A piece of moving picture data having a certain time period is reproduced at the same timing as a piece of audio data and a piece of sub-picture data. A piece of sub-control information, being effective in reproducing moving picture data, sub-picture data, and audio data stored in a small unit instructs the reproduction apparatus to have a navigation control of the data stored in the same small unit.

32 Claims, 48 Drawing Sheets

FOREIGN PATENT DOCUMENTS

| | | |
|---|---|---|
| 3204687 | of 0000 | Japan . |
| 4119444 | of 0000 | Japan . |
| 413287 | of 0000 | Japan . |
| 4216169 | of 0000 | Japan . |
| 5128815 | of 0000 | Japan . |
| 5181904 | of 0000 | Japan . |
| 5234248 | of 0000 | Japan . |
| 6176545 | of 0000 | Japan . |
| 6187667 | of 0000 | Japan . |
| 63-225926 | of 0000 | Japan . |
| 6325085 | of 0000 | Japan . |
| 676479 | of 0000 | Japan . |
| 7147661 | of 0000 | Japan . |
| 779399 | of 0000 | Japan . |
| 9512179 | of 0000 | WIPO . |
| 9512275 | of 0000 | WIPO . |

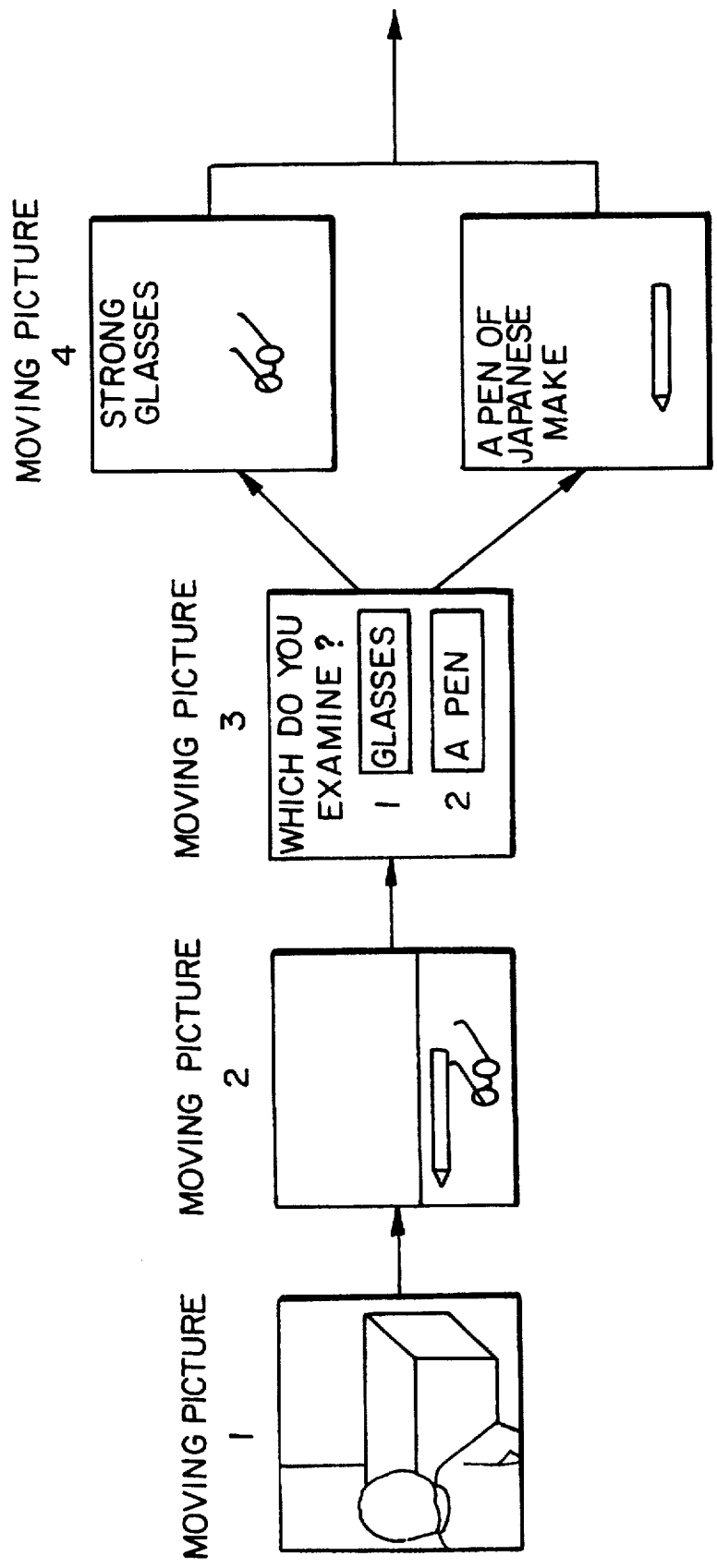

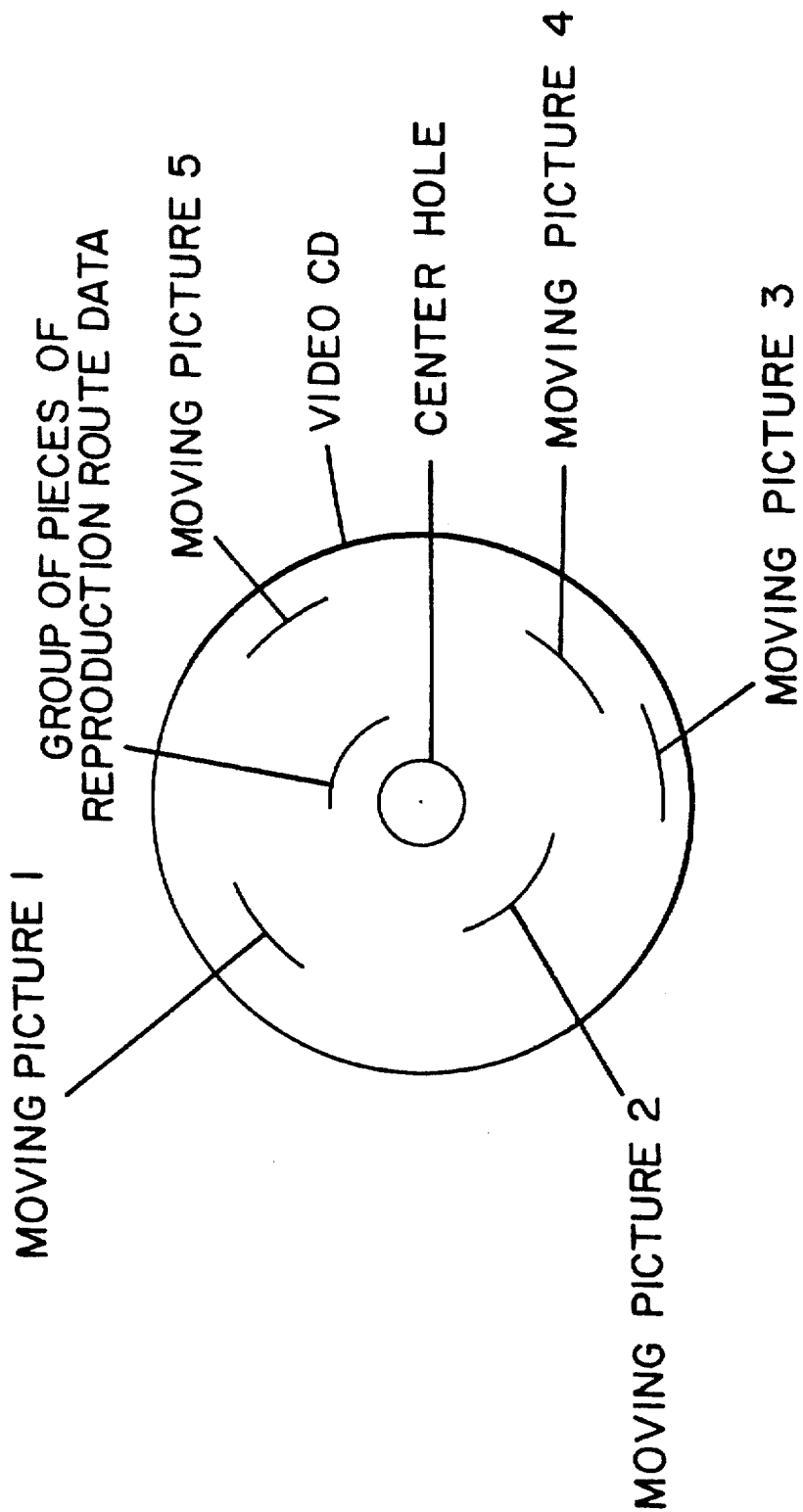

FIG. 1C

GROUP OF PIECES OF REPRODUCTION ROUTE DATA

| | ROUTE TYPE | ROUTE DATA |
|---|---|---|
| REPRODUCTION ROUTE DATA #1 | CONSECUTIVE REPRODUCTION | REPRODUCE MOVING PICTURE #1, THEN MOVING PICTURE #2, AND GO TO REPRODUCTION ROUTE DATA #2 |
| REPRODUCTION ROUTE DATA #2 | BRANCH REPRODUCTION | REPRODUCE MOVING PICTURE #3 (MENU), GO TO REPRODUCTION ROUTE DATA #3 IF (a) IS SELECTED, GO TO REPRODUCTION ROUTE DATA #4 IF (b) IS SELECTED |
| REPRODUCTION ROUTE DATA #3 | CONSECUTIVE REPRODUCTION | REPRODUCE MOVING PICTURE #4, AND GO TO REPRODUCTION ROUTE DATA #n |
| REPRODUCTION ROUTE DATA #4 | CONSECUTIVE REPRODUCTION | REPRODUCE MOVING PICTURE #5, THEN MOVING PICTURE #k, AND GO TO REPRODUCTION ROUTE DATA #J |
| ---- | ---- | ---- |

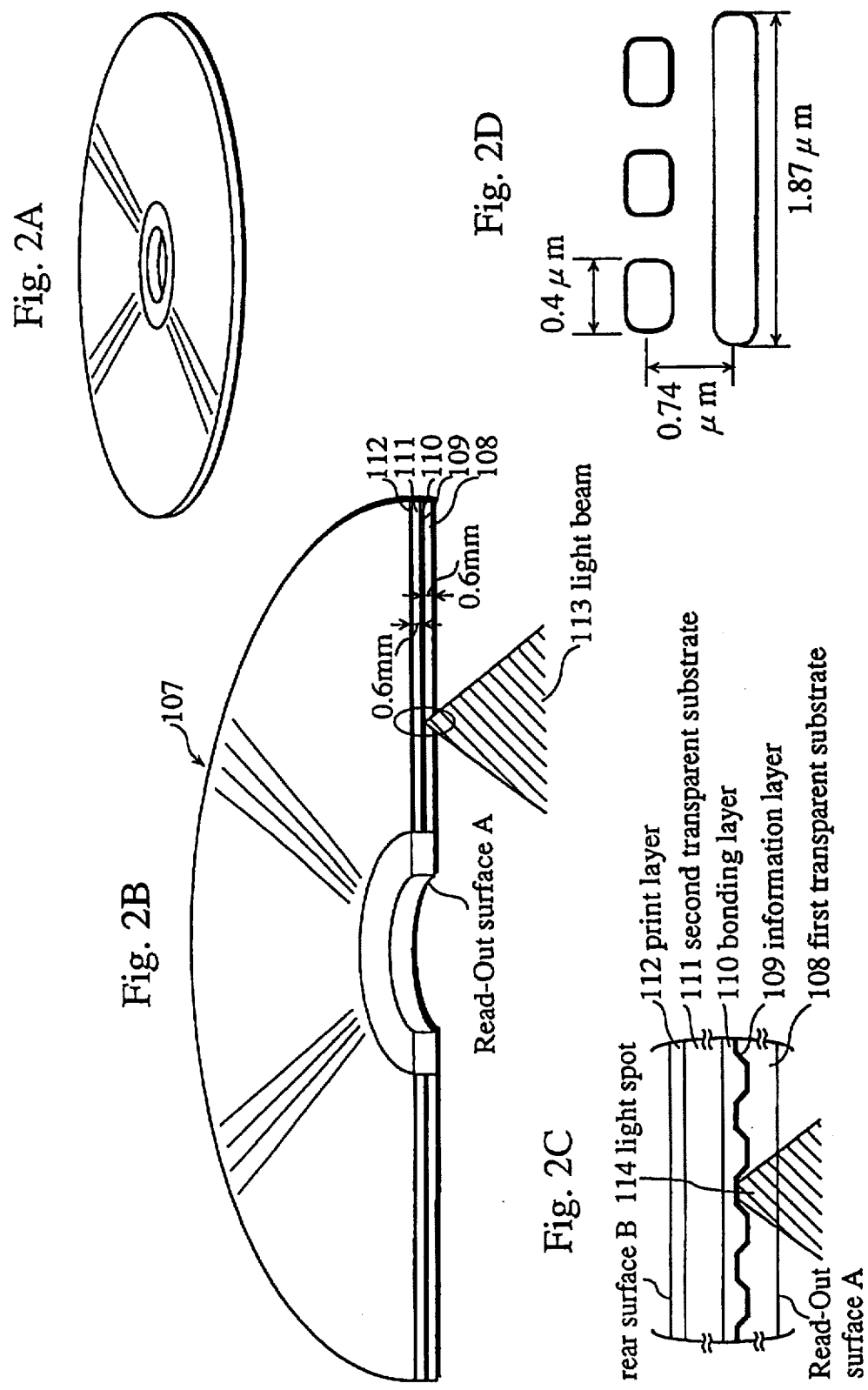

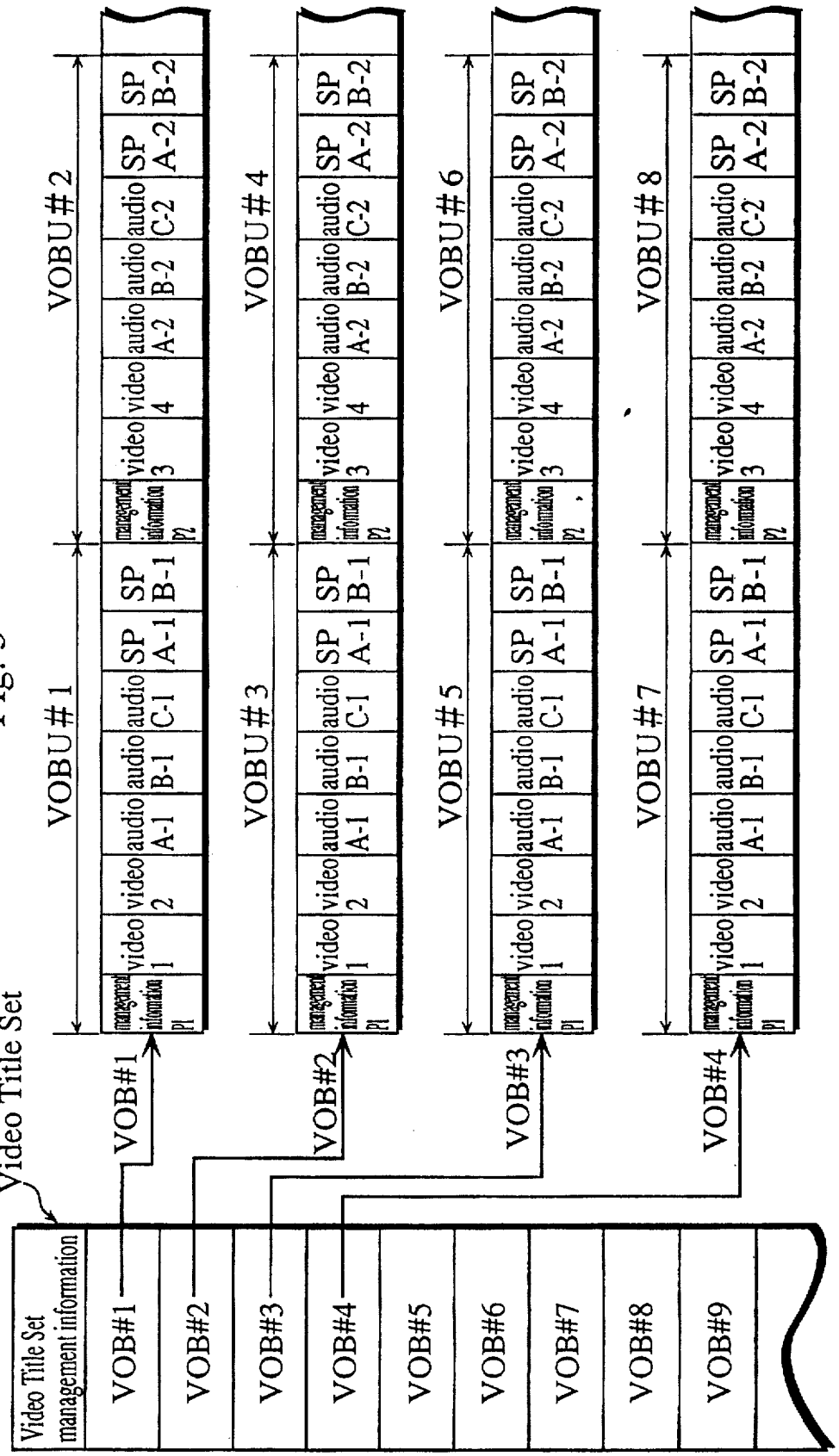

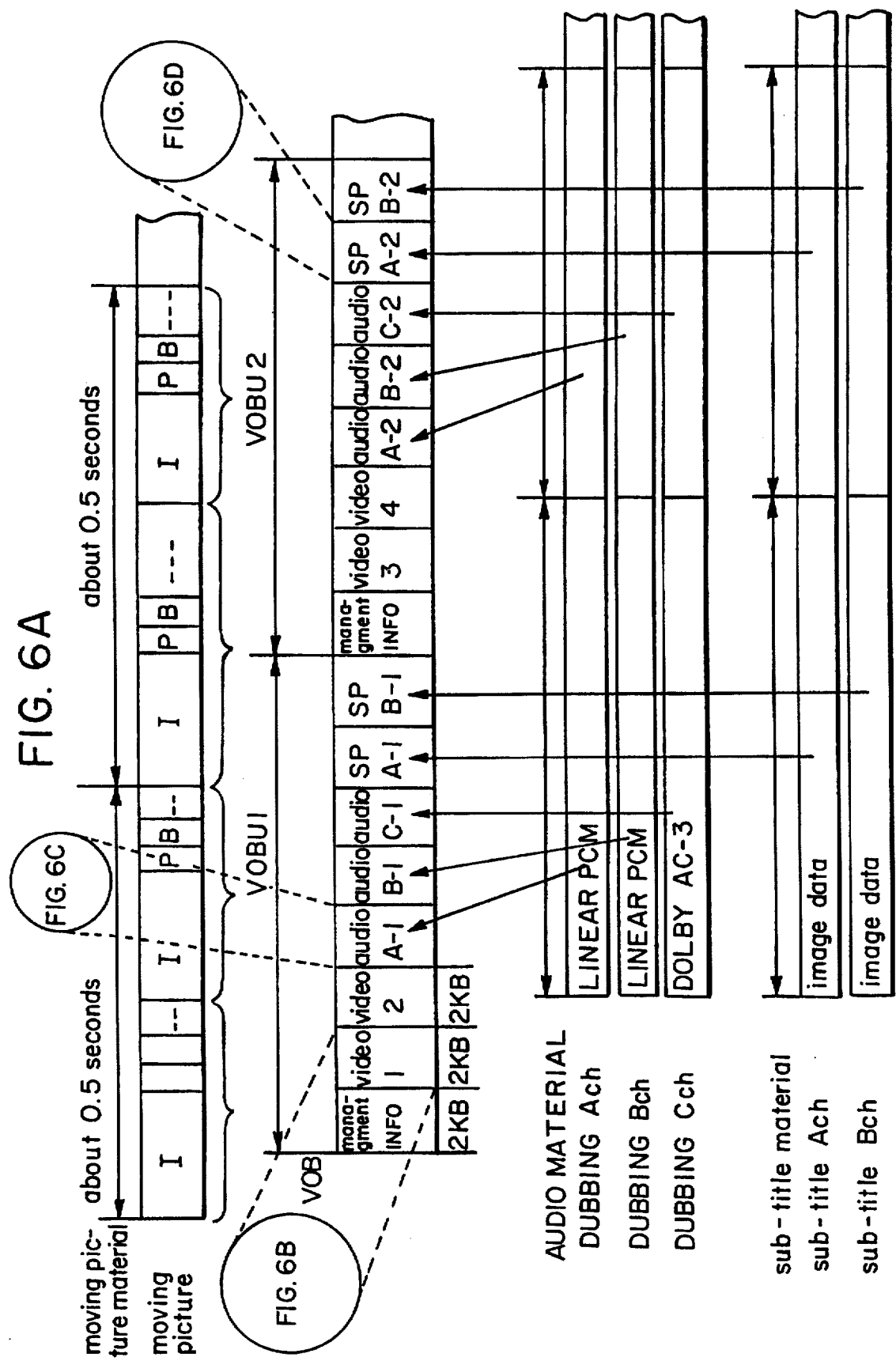

sub-picture pack

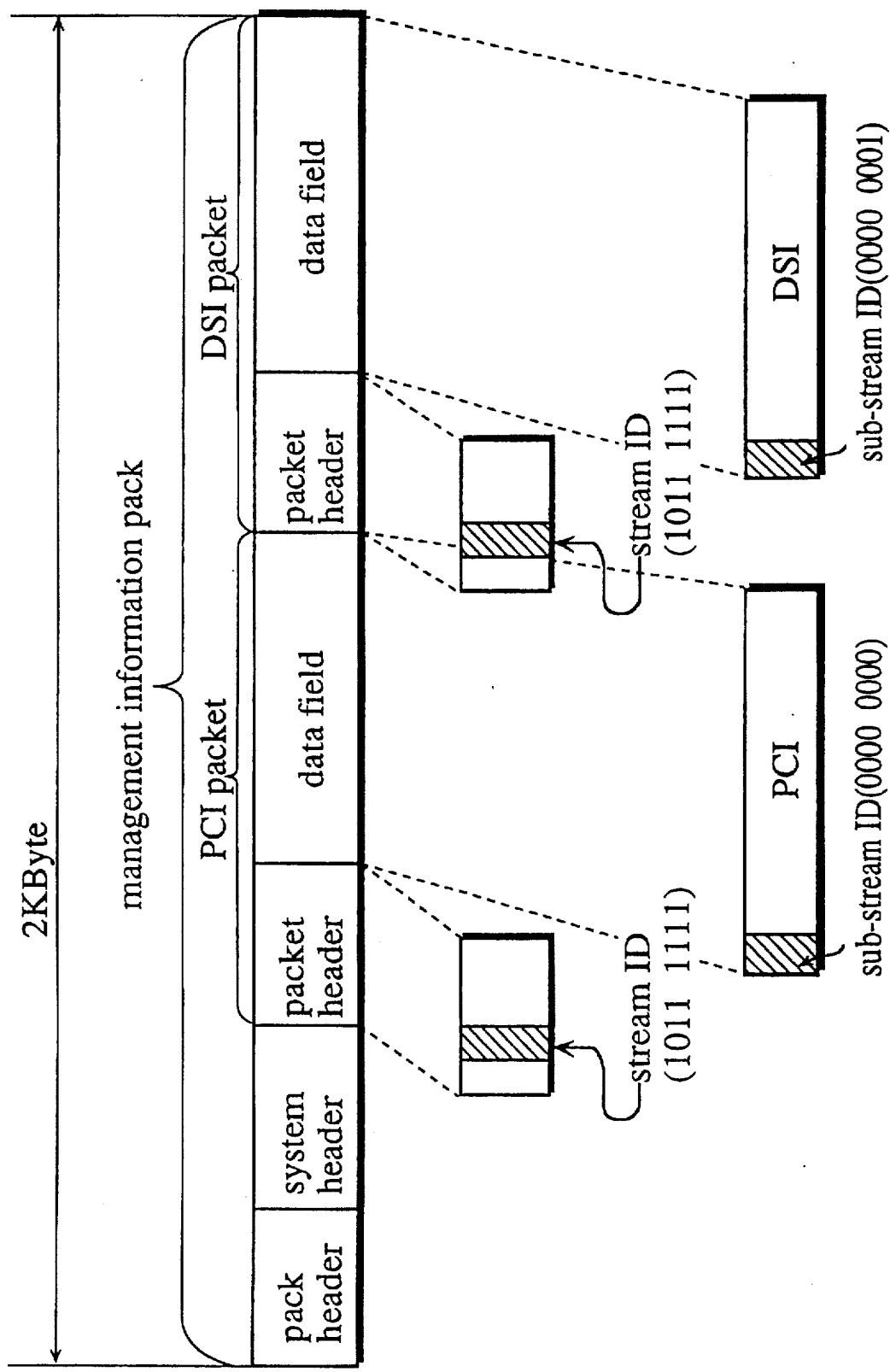

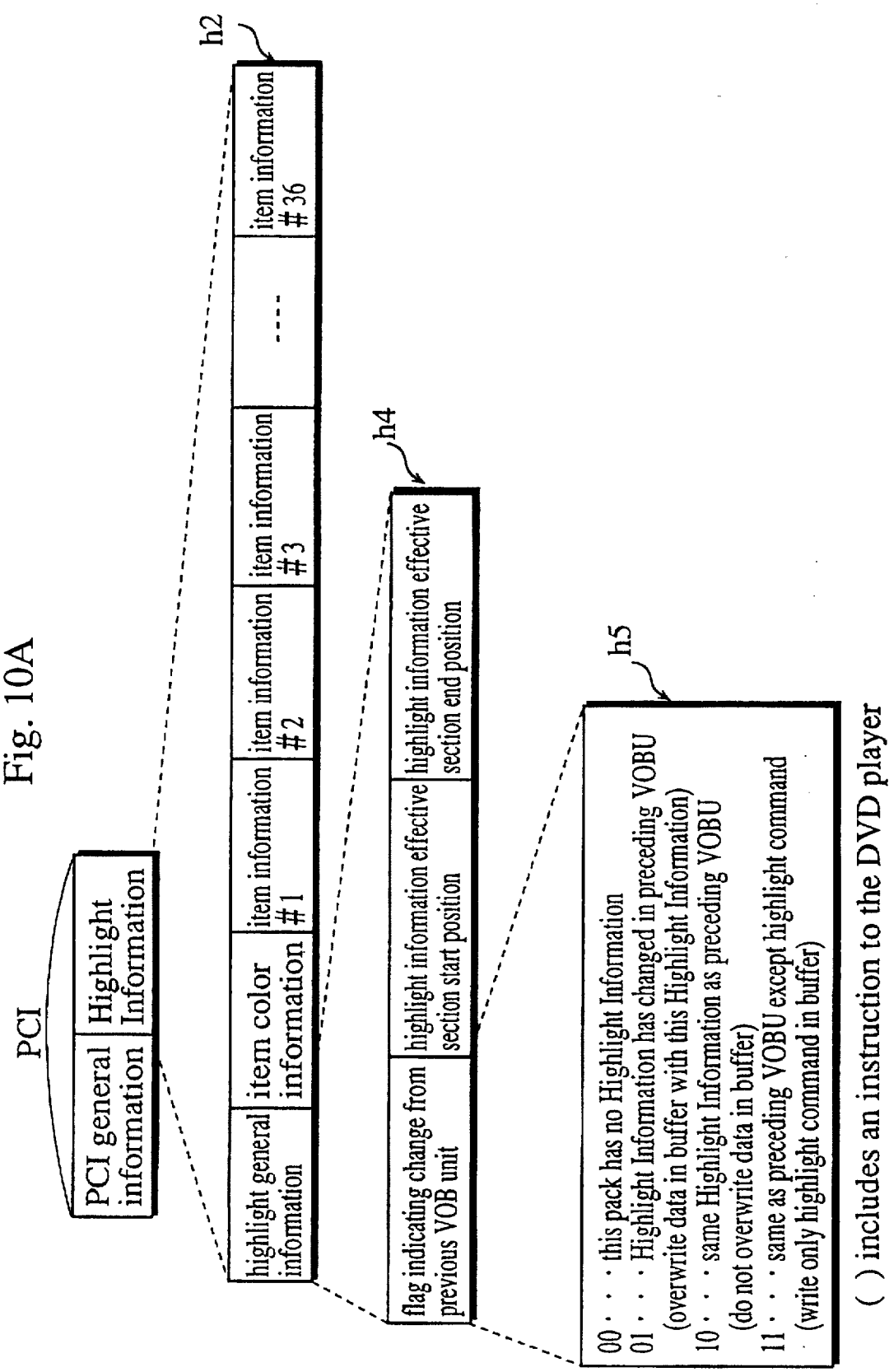

Fig. 11

| operation code | operand | outline |
|---|---|---|
| SetReg | register number, integer, operation (substitute, addition, subtraction, etc.) | perform operation on register value (substitute, addition, subtraction, etc.) |
| Random | register number, integer | generate random number and substitute it for register value |

Fig. 14

| operation code | field | outline |
|---|---|---|
| Link | branch target program chain number | branch to specified program chain |
| CmpReg Link | register number, integer, branch condition, branch target PGC number | compare integer with register value and branch if the result meets condition |
| SetReg Link | register number, integer, operation, branch target PGC number | perform operation on register value and branch |
| Play Title | Video Title Set number, branch target PGC information | branch to program chain in another Video Title Set |

FIG. 15A

VOB #2 FROM PRECEDING PGC → | management info. | VIDEO 1 | VIDEO 2 | AUDIO A-1 | AUDIO B-1 | AUDIO C-1 | SP A-1 | SP B-1 | management info. | VIDEO 3 | VIDEO 4 | AUDIO A-2 | AUDIO B-2 | AUDIO C-2 | SP A-2 | SP B-2 | → FIG. 15B VOB #4 → | management info. | VIDEO 1 | VIDEO 2 | AUDIO A-1 | AUDIO B-1 | AUDIO C-1 | SP A-1 | SP B-1 | management info. | VIDEO 3 | VIDEO 4 | AUDIO A-2 | AUDIO B-2 | AUDIO C-2 | SP A-2 | SP B-2 |

VOB #6 → | management info. | VIDEO 1 | VIDEO 2 | AUDIO A-1 | AUDIO B-1 | AUDIO C-1 | SP A-1 | SP B-1 | management info. | VIDEO 3 | VIDEO 4 | AUDIO A-2 | AUDIO B-2 | AUDIO C-2 | SP A-2 | SP B-2 |

VOB #8 → | management info. | VIDEO 1 | VIDEO 2 | AUDIO A-1 | AUDIO B-1 | AUDIO C-1 | SP A-1 | SP B-1 | management info. | VIDEO 3 | VIDEO 4 | AUDIO A-2 | AUDIO B-2 | AUDIO C-2 | SP A-2 | SP B-2 |

FIG. 15B

| VOB ADDRESS INFO. TABLE |
|---|
| VOB # 2 ADDRESS INFO. |
| VOB # 4 ADDRESS INFO. |
| VOB # 6 ADDRESS INFO. |
| VOB # 8 ADDRESS INFO. |
| ⋮ |

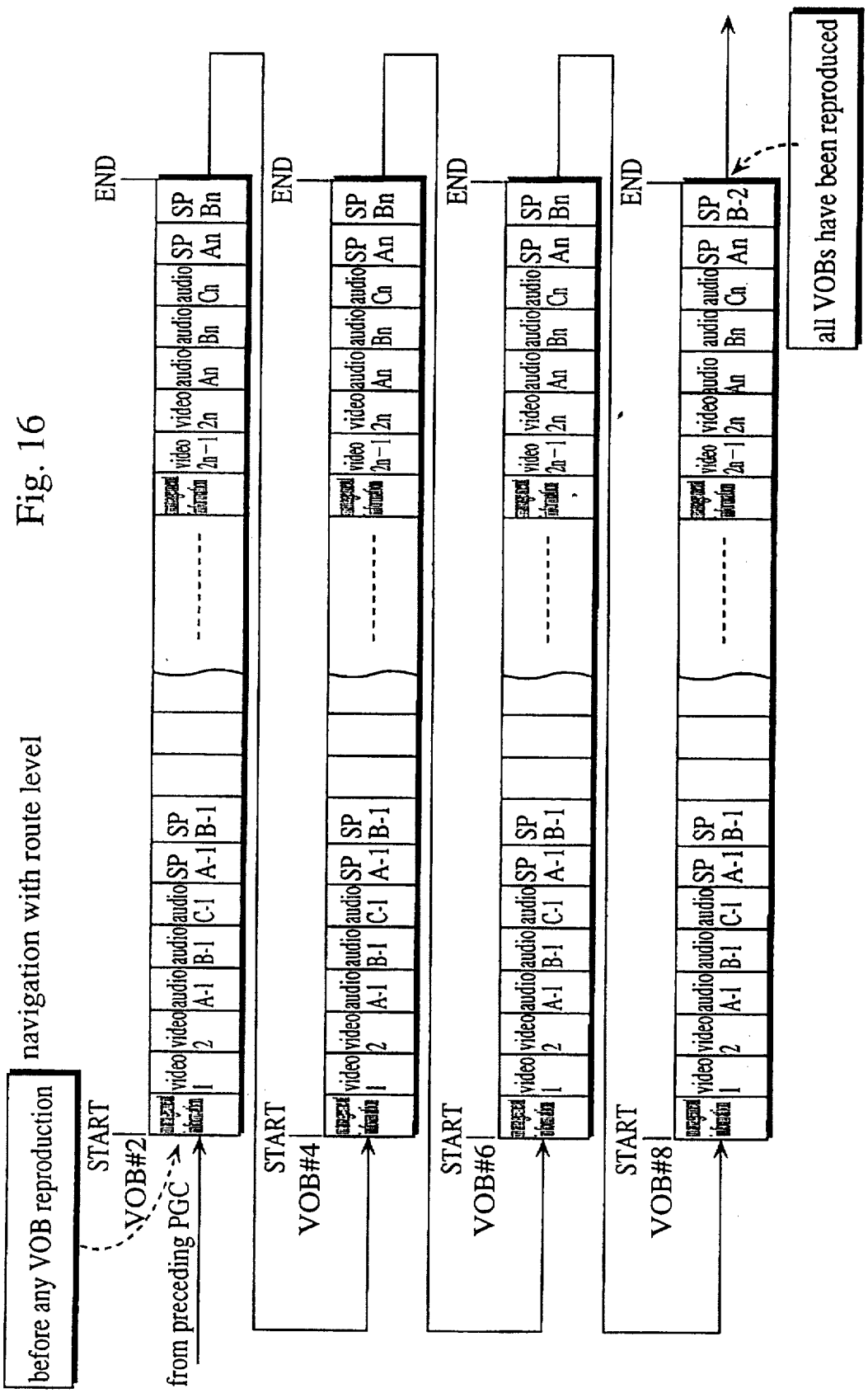

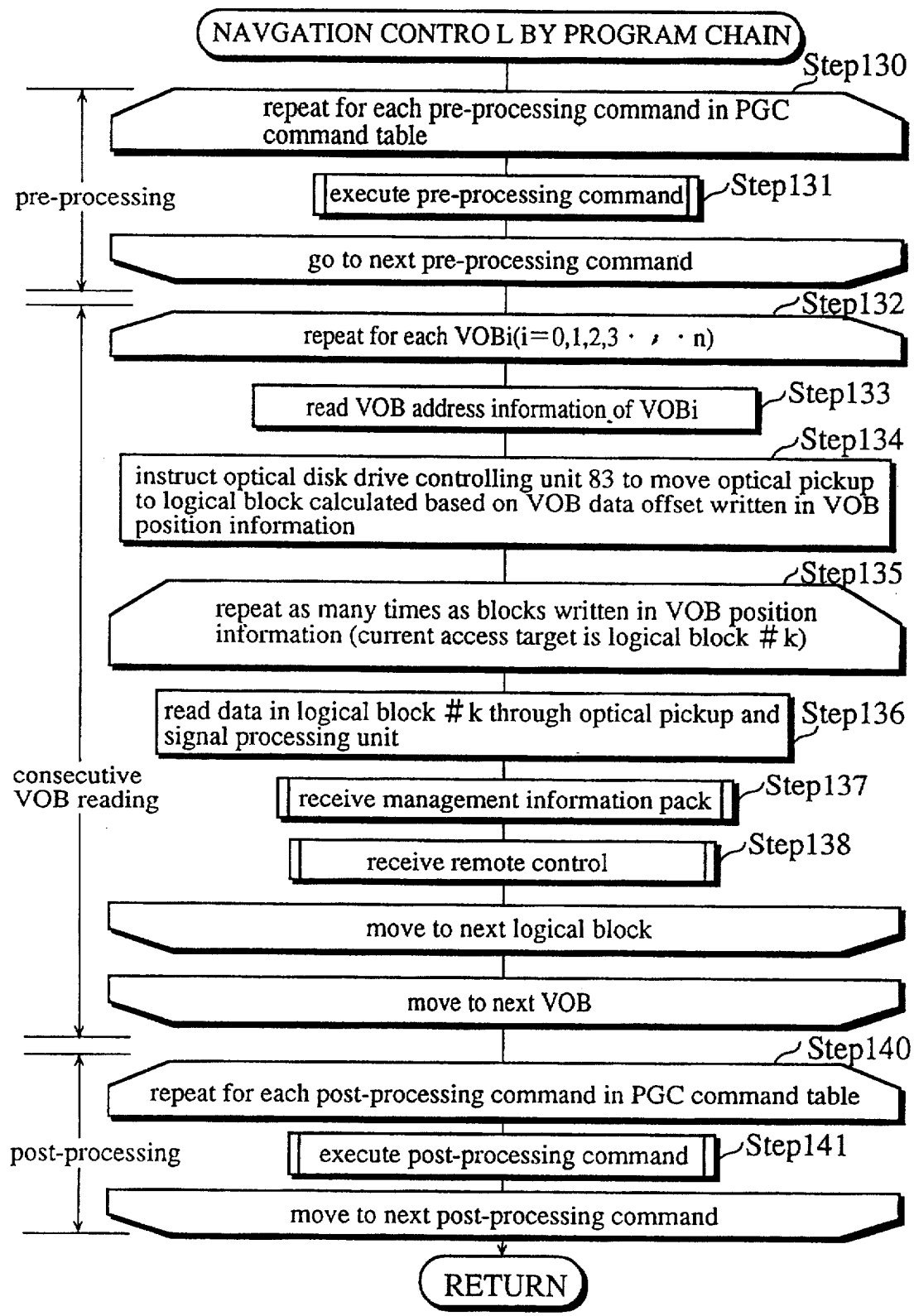

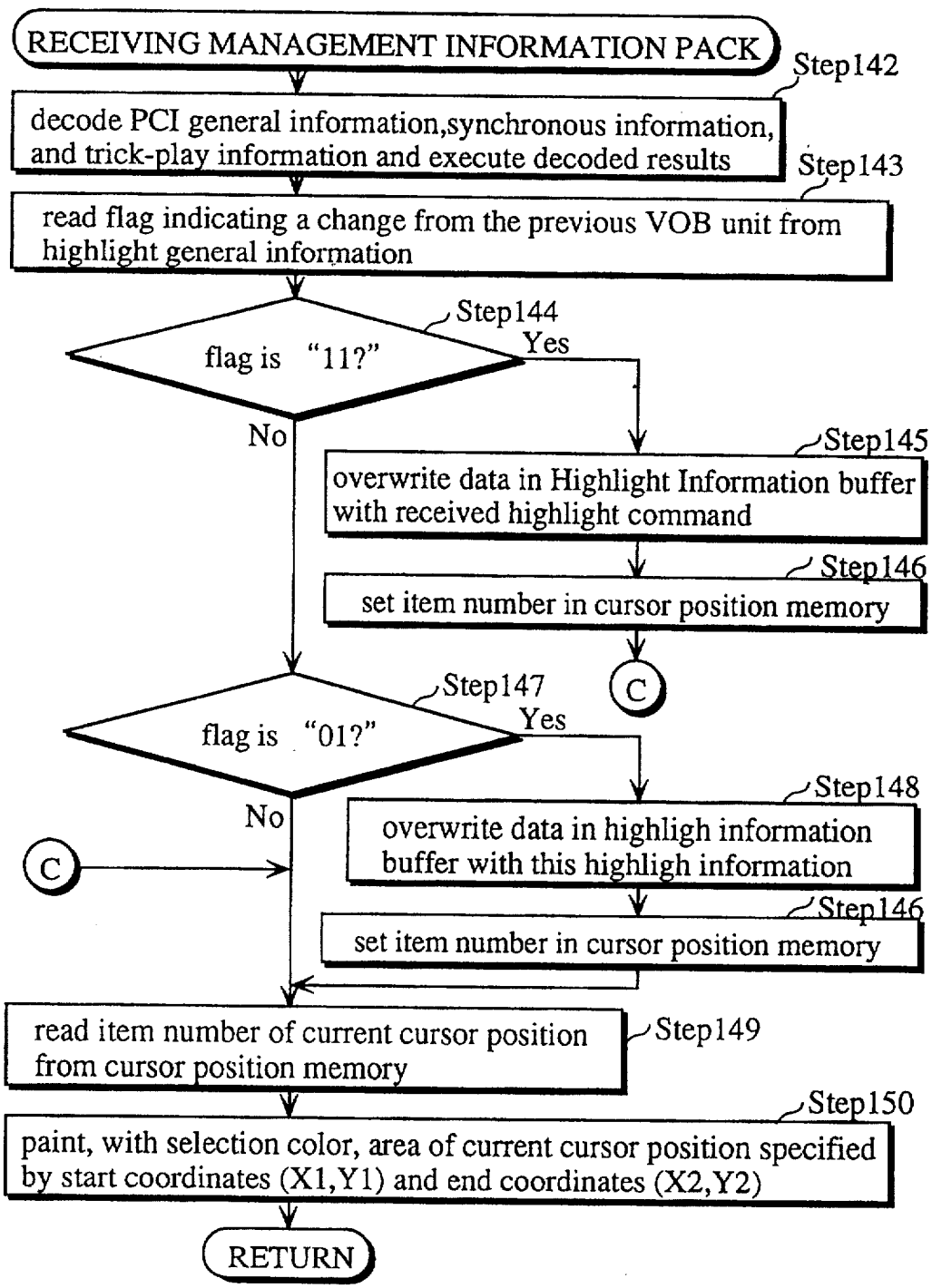

[ROUND-THE-WORLD QUIZ]
Video Title Set

Fig. 34B

PGC information #A1

| field | value |
|---|---|
| PGC connection information | PGC#A4 |
| pre-processing command | SetReg R1,0 |
| post-processing command | CmpRegLink R1,10,">",PGC#A3 |
| VOB address information table | VOB#A1 address information |
| | VOB#A2 address information |
| | VOB#A5 address information |
| | VOB#A6 address information |

Fig. 34C

PGC information #A5

| field | value |
|---|---|
| PGC connection information | PGC#A6 |
| pre-processing command | Random R2,3 |
| post-processing command | CmpRegLink R2,2,"=",PGC#A7 |
| | CmpRegLink R2,1,"=",PGC#A8 |
| VOB address information table | none |

MULTIMEDIA OPTICAL DISK, REPRODUCTION APPARATUS AND METHOD FOR ACHIEVING VARIABLE SCENE DEVELOPMENT BASED ON INTERACTIVE CONTROL

BACKGROUND OF THE INVENTION (1). Field of the Invention

The present invention relates to an optical disk which stores information signals recorded with a light beam and to a reproduction apparatus for reproducing such optical disks, more specifically to an optical disk which stores multimedia data including digital moving picture data, audio data, and sub-picture data and to an optical disk reproduction apparatus for reproducing such optical disks.

(2). Description of the Prior Art

Of conventional optical disks, compact disks (CDs) and video CDs are representative. About an hour of audio digital data can be recorded in a CD, and CDs are used mainly for music software titles. On the other hand, video CDs hold about an hour of moving picture digital data including audio digital data, and are used mainly for movie software titles. CDs and video CDs are prevalent among many music lovers and movie lovers since they are handy and have good quality of sounds and pictures.

As a new fashion in the moving picture software, interactive software titles for video CDs are often seen in the market recently. The interactive software selectively reproduces a plurality of moving pictures stored in an optical disk according to user instructions and dynamically changes reproduction orders during reproductions. An example of such interactive software titles is a multi-story drama in which a story develops according to user selected options.

Now, an optical disk for achieving the interaction and a reproduction apparatus for reproducing the optical disk are described with reference to FIGS. 1A–1C, supposing the optical disk is a video CD. FIGS. 1A–1C show a video CD. The video CD stores a multi-story detective story. Note that a multi-story can develop to a plurality of stories.

FIG. 1B shows how digital data is stored in a video CD. The drawing shows five pieces of moving picture digital data, moving pictures #1–#5, and a group of pieces of reproduction route data for specifying the reproduction order of the moving pictures are stored in the video CD. The digital data sequences making up the moving pictures are stored in the respective consecutive areas in separately. Note that all the digital data sequences need not be stored in the consecutive areas.

FIG. 1A shows the contents of the moving pictures and the reproduction order of them. Moving picture #1 shows an image of a detective entering a room. Moving picture #2 shows a pen and glasses on a desk in the room. Moving picture #3 is a menu providing two option items, item "1" for glasses and item "2" for a pen. Moving picture #4 is reproduced when "1" is selected; moving picture #5 when "2" is selected.

FIG. 1C shows several pieces of reproduction route data. The reproduction route data is divided into two types; one provides a reproduction order for a plurality of moving pictures; the other provides a plurality of branch targets.

The former type is called a play list. In the play list, a plurality of moving pictures to be reproduced successively and the reproduction order are specified. Also, the play list includes a piece of link information which specifies a branch destination of the play list itself, connecting a reproduction route to another.

The latter type is called a selection list. The selection list includes a plurality of reproduction routes as branch target candidates and a menu address. The menu address is a record address for a menu image that provides a plurality of branch targets. The menu image includes a plurality of items whose identification numbers correspond to identifiers of reproduction routes as the branch targets.

In FIG. 1C, reproduction route data #1, #3, and #4 are play lists, and reproduction route data #2 is a selection list. The identifiers of the respective items correspond to numeral keys on a remote controller. If the user presses any of the numeral keys, a corresponding reproduction route is reproduced.

Now, a reproduction of the video CD shown in FIG. 1B is described.

The reproduction apparatus calculates a record address of the starting reproduction route data of the optical disk by using a certain calculation method. On calculating the record address, the reproduction apparatus moves the pickup to a position specified by the address and reads the reproduction route data onto an internal memory. Suppose reproduction route data #1, a play list, is read onto a memory. Then, the reproduction apparatus determines moving pictures to be reproduced according to the reproduction order indicated by the reproduction route data #1. On determining the moving pictures, the reproduction apparatus moves the pickup to a position specified by the record address of the moving pictures and reads the digital data of the moving pictures. The reproduction apparatus converts the digital data into picture output signal and audio output signal through a certain signal process, then outputs the signals to the display and speakers.

After the above processing, the scene of moving picture #1 as shown in FIG. 1A is reproduced for several seconds. Moving picture #1 is followed by moving picture #2, the scene of a desk. The screen displays a pen and glasses for several seconds. When all the moving pictures included in the reproduction route data are reproduced, the reproduction apparatus refers to the link information and reads the next reproduction route data onto a storage through the pickup. Then, the reproduction apparatus discards reproduction route #1 and optically reads the next reproduction data onto the internal memory. As a result, reproduction route data #2 is read onto a memory, and a menu image providing a plurality of branch targets is displayed. Moving picture #3, a menu providing item "1" for glasses and item "2" for a pen, is displayed.

When the user presses a numeral key on a remote controller corresponding to the identifier of an item in the menu, the reproduction apparatus determines a piece of reproduction route data which is the branch target corresponding to the numeral. Then, the reproduction apparatus discards reproduction route #2 and optically reads the determined piece of reproduction data onto the internal memory. In the present example, reproduction route data #3 is read onto a memory if the user selects item "1;" reproduction route data #4 if the user selects item "2."

The reproduction apparatus continues the reproduction according to the new reproduction route data stored in the memory. If reproduction route data #3 is stored in the memory, moving picture #4, an image of close-up glasses, is reproduced. If reproduction route data #4 is stored in the memory, moving picture #5, an image of close-up pen, is reproduced. In this way, the reproduction apparatus continues the reproduction of the moving pictures changing the route according to the selections by the user for the menus.

It would be understood that a story in the interactive software can develop in various ways, and that the user can enjoy the multi-story feeling as if he/she is the detective appearing on the screen.

The data used for controlling the reproduction proceeding such as the reproduction route data is called navigation control data. Recently, the format of the navigation control data and the method the reproduction apparatus uses the data are recognized as very important technical subjects. This is because the format determines the capacity of the memory in the reproduction apparatus required for achieving the interactive software. The greater is the memory capacity, the more cost is required for the memory, increasing the price of the reproduction apparatus.

CD players and video CD players, being made for private use, generally use memories with the capacity of several-tens KB or under for achieving low costs. The above interactive software title causes the reproduction apparatus to have a piece of reproduction route data resident in a memory for reproducing a moving picture. The piece of reproduction route data occupies the space of hundreds of bytes in the memory. That means the data does not cause a problem to the reproduction apparatus using a memory having capacity of several tens of KB for reproducing the interactive software title.

Software title creators and users desire interactive software titles having more satisfying performances. They sometimes talk about the limitation in video CDs for achieving such satisfying performances. Now, the functions that cannot be achieved in video CDs and the obstacles to the achievement of such functions are described below.

First problem is that it is impossible to display options of branch targets to allow the user to selects an option in about 2.0 to 3.0 seconds while an image is displayed on the screen. For example, imagine a case where scenes seen from the train window are displayed consecutively on the screen and a set of options are displayed along with a scene of a building such as a castle and a bridge. Since a set of options for video CDs are specified for a whole moving pictures, but not for a part of the moving pictures. If a software title creator desires to realize a specification for a part of the moving pictures, the software title creator must divide the whole moving pictures into small units and specify the sets of options for the small units. However, this arrangement causes the reduction in response. That is, the reproduction of the moving pictures is temporarily stopped due to the disk seek for changing the moving pictures and reproduction route data. Due to the great compensation, namely, reduction in response, it is virtually impossible for video CDs to realize such reproduction control as changing menu items synchronizing with the moving picture images. In other words, it is impossible to have a close correspondence between images and reproduction control. For example, in FIG. 1, if a detective meets a suspicious-looking man, a menu asking the user to select an option is displayed according to the change in his face.

Second problem is that the reproduction cannot be controlled by a combination of a past result of the user selection and a current result of the user selection. For example, imagine a case of a teaching material where questions are displayed one by one and the points obtained by the user with correct answers are counted up, after all the questions complete, the user is judged as passed the examination if the user's point has exceeded a certain point. In video CDs, branch targets cannot be changed according to the past result of the user selection. Therefore, it is impossible to achieve such an interactive software title as changing the branch target according to the point for a plurality of questions.

Moreover, for a multi-story detective story, unexpected story development and different stories are required so that the user can repeatedly be interested in the story. However, if a menu item corresponds to only one story development, the user will soon learn the branch target. That is, in the beginning, the user may have an unexpected feeling for the story development, but soon will learn the story development in several repetitions. Then, the user will lose interest in the title. In the software title of the detective story, if item "glasses" is selected, the control always branches to reproduction route #3. It is desired that sometimes the control branches to another route by reflecting the past user selections for the actions of the detective. If the selection of item "glasses" always leads to reproduction route #3, the user is accustomed to the story development after playing the interactive software title several times.

SUMMARY OF THE INVENTION

It is therefore the first object of the present invention to provide a multimedia optical disk which achieves an interactive software title in which moving pictures are synchronized with instructions to the reproduction apparatus, enabling change of menu items according to the change in a scenery seen from a train window for example, with reduced amount of a memory, and to provide a reproduction apparatus for reproducing such a multimedia optical disk.

It is the second object of the present invention to provide a multimedia optical disk which achieves an interactive software title in which an instruction is sent to the reproduction apparatus by combining past instructions and present instructions input by the user, enabling a determination of a branch target according to several answers by the user for example, with reduced amount of a memory, and to provide a reproduction apparatus for reproducing such a multimedia optical disk.

The above objects are achieved by a multimedia optical disk comprising: a data area for storing a plurality of objects each of which includes moving picture data and at least one of audio data and sub-picture data; and an index area for storing a plurality of reproduction orders of at least one object, wherein the index area includes a first index area and a second index area, the first index area storing a plurality of pieces of route information each of which includes a sequence of addresses of objects, wherein an alignment of the sequence of addresses of objects in each of the plurality of pieces of route information represents one of the plurality of reproduction orders, and the second index area storing a plurality of pieces of chain control information which respectively correspond to the plurality of pieces of route information, wherein the plurality of pieces of chain control information, being effective in reproducing objects specified by the alignment of the sequence of addresses (hereinafter objects specified by the alignment of the sequence of addresses are called a chain), instruct a reproduction apparatus to have a navigation control of the chains, and the data area includes a plurality of small areas each of which includes a first sub-area and a second sub-area, wherein each of the plurality of objects is recorded over consecutive small areas, wherein the first sub-area stores at least a piece of moving picture data having a certain time period and at least one of a piece of audio data and a piece of sub-picture data, wherein the piece of audio data and the piece of sub-picture data are reproduced at the same timing as the piece of moving picture data, and the second sub-area stores a piece of sub-control information which, being effective in reproducing data stored in the first sub-area in the same small area, instructs the reproduction apparatus to have a navigation control of the data stored in the first sub-area in the same area.

With the above construction, the sub-control information, being effective in reproducing data stored in the first sub-area in the same small area, instructs the reproduction apparatus to perform a navigation control on the reproduction of the objects. This navigation control enables display of branch targets synchronized with displayed images, urging the user to select an branch target in about 2.0 to 3.0 seconds. For example, scenes seen from a train window are displayed consecutively on the screen and a set of options are displayed along with a scene of a building such as a castle and a bridge. The user can choose a branch target (option) which reproduces introductory images of the castle or the bridge.

The data area includes a plurality of small areas and each object is recorded over consecutive small areas. Therefore, a branch does not generate an interruption in moving picture reproduction nor a disk seek.

The reproduction order of each object is specified by the route information. The chain control information, being effective in reproducing chains, instructs the reproduction apparatus to have a navigation control of the chains. The chain control information enables a determination of a branch target according to several answers to several menus by the user, that is, by combining past selection results and a present selection result.

This enables a software title as a teaching material in which questions are displayed one by one and the points obtained by the user with correct answers are counted up, after all the questions complete, the user is judged as passed the examination if the user's point has exceeded a certain point.

Also, with such a construction, the items and branch targets are not related by one-to-one relation. Therefore, it is difficult for the user to learn the relation between the items and branch targets. This allows the user to enjoy playing the game longer.

The multimedia optical disk may further comprises a plurality of sectors formed on a spiral track, wherein each of the index area and the plurality of small areas is set in a series of consecutive sectors, each of the piece of moving picture data, the piece of audio data, and the piece of sub-picture data in the first sub-area is recorded over at least a sector, and the piece of sub-control information in the second sub-area is recorded over at least a sector.

With such a construction, since each index area and each small area is set in a series of consecutive sectors, data is tightly stored in the sectors. This allows the reproduction apparatus to fetch the data without waiting time taken by disk seek and the like. Therefore, the reproduction apparatus can fetch the sub-control information every about 0.5 seconds without stopping the image reproduction and control the reproduction according to the information.

In the multimedia optical disk, a pair of a piece of the route information and a piece of the chain control information may be a unit of resident information stored in the reproduction apparatus, and a piece of the sub-control information may be a unit of resident information stored in the reproduction apparatus.

With such a construction, the capacity of the memory of the reproduction apparatus can be reduced. This enables creation of interactive software titles which are reproduced by reproduction apparatuses for private use. That is, a multimedia software title which makes the most of large capacity of the multimedia optical disk is achieved by the present invention.

In the multimedia optical disk, some pieces of the sub-control information may include a flag that prohibits the reproduction apparatus from updating the sub-control information, wherein the reproduction apparatus prohibits a piece of the sub-control information from being stored in the reproduction apparatus as the resident information if the piece of the sub-control information includes the flag.

With such a construction, the reproduction apparatus checks to see whether a menu item has been selected by referring to this flag. This enables an update of the sub-control information during a certain time period. This also enables an avoidance of a complicated update per VOB unit by recognizing that this flag does not show the necessity of update.

In the multimedia optical disk, the chain control information may include any of a first branch command and a conditional branch command, wherein the first branch command specifies a chain to be reproduced next after a chain corresponding to the chain control information of the first branch command is reproduced, and the conditional branch command specifies a chain which is to be reproduced next after a chain corresponding to the chain control information of the conditional branch command is reproduced and which is determined according to an internal state of the reproduction apparatus, and some pieces of the sub-control information may include any of a second branch command and a change command, wherein the second branch command instructs the reproduction apparatus to branch from a data reproduction of a small area to which the second branch command belongs to a reproduction of another chain, and the change command instructs the reproduction apparatus to change the internal state of the reproduction apparatus.

With such a construction, since some pieces of the sub-control information includes any of the second branch command and the change command, an interactive branch change and an internal state change are possible. Also, since the chain control information includes the conditional branch command, a branch target can be changed according to the internal state changed by the sub-control information.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 1A–1C show recording of moving picture information and reproduction control information in a conventional interactive reproduction.

FIG. 2A shows an appearance of an optical disk used in the present embodiment.

FIG. 2B is a cross section of the optical disk.

FIG. 2C is an enlarged detail of a part where the optical spot is shone.

FIG. 2D shows pit sequences on information layer 109.

FIG. 5 shows the data construction of the Video Title Set.

FIGS. 6A–6D correspondence between moving picture materials, audio materials, and sub-title materials and the packs in video objects (VOBs).

FIG. 7D shows the construction of the management information pack.

FIG. 10A shows the construction of PCI.

FIG. 11 shows SET commands used in the present embodiment.

FIG. 14 shows the BRANCH commands used in the present embodiment.

FIGS. 15A and 15B show the reproduction order of the video objects (VOBs) according to the VOB address information table.

FIG. 16 shows a reproduction control with the route level.

FIG. 28 is a flowchart showing the process steps of system controlling unit 93 based on the PGC information.

FIG. 29 is a flowchart of receiving the management information pack.

FIG. 34B shows the description in PGC information #A1.

FIG. 34C shows the description in PGC information #A5.

DESCRIPTION OF THE PREFERRED EMBODIMENT

Figure 3A:
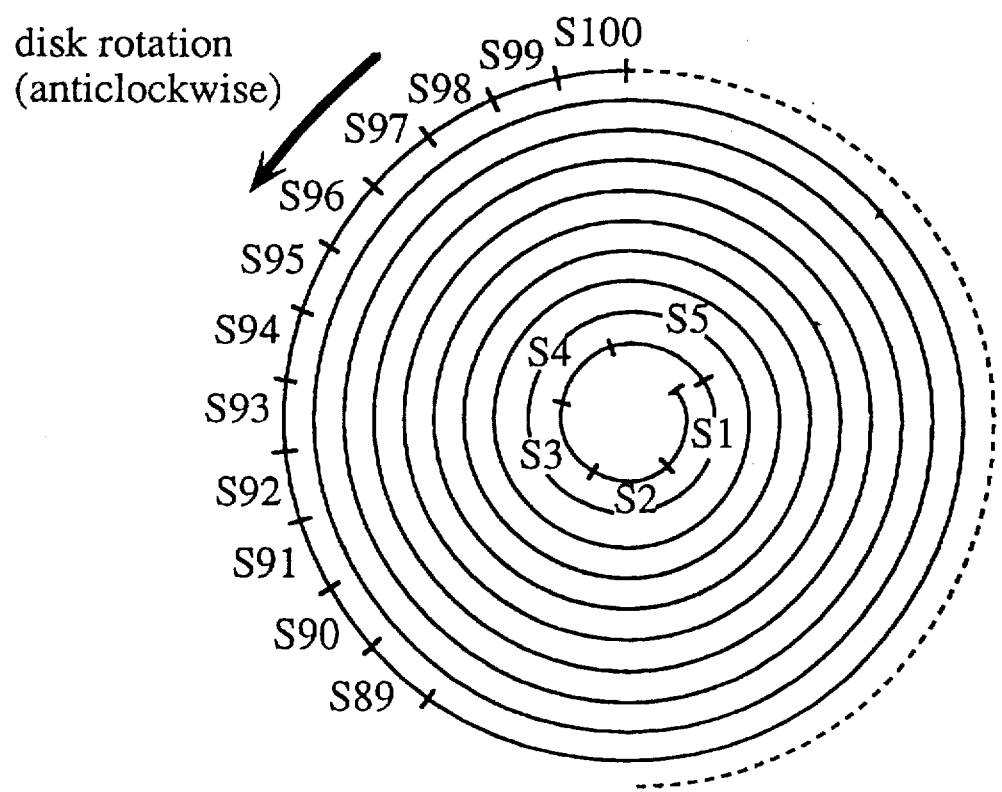
FIG. 3A shows a track arranged on the information layer of the optical disk.

An optical disk storing multimedia data suitable for the present embodiment is a digital video disk (DVD) with a diameter of 120 mm which stores about 4.7 GB of information on one side.

The following description is divided into a plurality of sections with the section number written on the left-hand side and the title as shown below. (1) and (2) are the highest levels of sections. These sections branch to sub-sections as indicated by the section numbers. The (1) family sections describe optical disk; the (2) family reproduction apparatus (disk reproduction apparatus).

(1.) Physical Construction of the Optical Disk (1.1) Logical Construction of the Optical Disk (1.1.1) Logical Construction . . . Video Title Set (1.1.1.1) Video Title Set . . . Video Object (VOB)

(1.1.1.1.1) Video Object (VOB) . . . Video Pack (1.1.1.1.2) Video Object (VOB) . . . Audio Pack (1.1.1.1.3) Video Object (VOB) . . . Sub-Picture Pack (1.1.1.1.4) Video Object (VOB) . . . Management Information Pack (1.1.1.1.4.1) Management Information Pack . . . DSI Packet (1.1.1.1.4.2) Management Information Pack . . . PCI Packet (1.1.1.1.4.2.1) PCI Packet . . . Highlight Information (1.1.1.1.4.2.1.1) Highlight Information . . . Highlight General Information (1.1.1.1.4.2.1.2) Highlight Information . . . Item Color Information (1.1.1.1.4.2.1.3) Highlight Information . . . Item Information (1.1.1.2) Video Title Set . . . Video Title Set Management Information (1.1.1.2.1) Video Title Set Management Information . . . PGC Information (1.1.2) Logical Construction . . . Video Manager (2.1) Outline of the Disk Reproduction Apparatus (2.2) Construction Element of the Disk Reproduction Apparatus (2.2.1) Construction Element of the Disk Reproduction Apparatus . . . Construction of Signal Separating Unit 86

(2.2.2) Construction Element of the Disk Reproduction Apparatus . . . Construction of System Controlling Unit 93

(2.3.1) Operation of System Controlling Unit 93 (General Operation)

(1.) Physical Construction of the Optical Disk

FIG. 2A shows an appearance of the DVD; FIG. 2B a cross-section of the DVD. FIG. 2C shows an enlarged circled part of FIG. 2B. Starting from the bottom, DVD 107 is formed of a first transparent substrate 108, an information layer 109, a second transparent substrate 111, a bonding layer 110, and a print layer 112 on which a label is printed.

First transparent substrate 108 and second transparent substrate 111 are both about 0.6 mm thick, that is in a range of about 0.5 mm to 0.7 mm, and are reinforcers of the same material.

Bonding layer 110, being formed between information layer 109 and transparent substrate 111, bonds these layers.

A reflective membrane such as metal foil is attached to a surface of information layer 109 where it is in contact with transparent substrate 108. Indented and protruding pits are formed in this reflective membrane with high density.

FIG. 2D shows pit shapes. The length of a pit ranges from 0.4 μm to 2.13 μm. A whole series of pits form a spiral track with a radial distance of 0.74 μm between the pit lines.

In FIG. 2C, information is retrieved by shining the light beam, 113 on the series of pits and measuring changes in the reflection ratio of the light spot 114.

The light spot 114 on a DVD has a diameter of around $1/1.6$ times the diameter of a light spot on a conventional CD due to an increase in the numerical aperture NA of the objective lens and a reduction in the wavelength λ of the light beam.

DVDs of the physical construction described above can store about 4.7 GB of information on one side, which is almost eight times the storage capacity of a conventional CD. As a result, it is possible to achieve a great improvement in picture quality for moving pictures and to increase the reproduction time from the 74 minutes which was possible with a video CD to over two hours.

The substrate technique which has enabled this improvement in storage capacity is a reduction of the spot diameter D of the light beam. Here, spot diameter D is given by the equation "D=laser wavelength λ/numerical aperture of objective lens NA," so that the spot diameter D can be reduced by reducing the laser wavelength λ and by increasing the numerical aperture of objective lens NA. It should be noted here that if the numerical aperture of objective lens NA is increased, comatic aberration occurs due to the relative inclination, known as "tilt", between the optical axis of the beam and the disk surface. In order to suppress this phenomenon, DVDs use a transparent substrate of reduced thickness. Such a reduction in the thickness of the transparent substrate creates the problem of reduced physical durability for the disk, although this problem can be overcome by reinforcing DVDs with another substrate.

Data is read from DVDs using an optical system with a short wavelength (650 nm) red semiconductor laser and an objective lens whose NA (numerical aperture) is about 0.6 mm. If the thickness of the transparent substrate is about 0.6 mm, a storage capacity of about 4.7 GB can be achieved for one side of a 120 mm diameter optical disk. With this large storage capacity, there is more than enough capacity for a whole feature film to be recorded on one disk, with it further being possible for the manufacturer to include soundtracks in several different languages. Also, 4.7 GB of storage capacity achieved by this substrate technique is more than enough for a plurality of pieces of moving picture data or audio data.

Figure 3B:
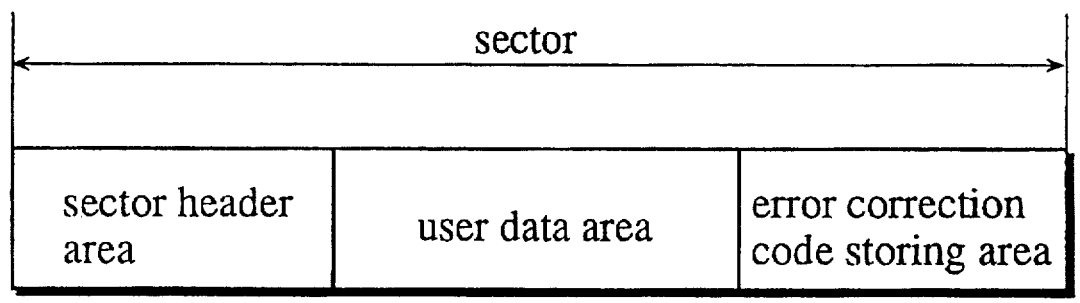
FIG. 3B shows the construction of the physical sector of the information layer of the optical disk.

FIG. 3A shows that a spiral track is formed on the information layer from an inner circle toward the circumference. Data is read from the spiral track in units of sectors. The sector includes, as shown in FIG. 3B, the sector header area, the user data area, and the error correction code storing area.

The sector addresses in the sector header area are used to identify each sector. The disk reproduction apparatus searches sectors to be read by using the sector addresses.

The user data area stores 2 KB-data.

The error correction code storing area stores an error correction code for the user data area in the same sector. The disk reproduction apparatus detects errors using the error correction code when the user data area in the same sector is read, and also corrects the detected errors. This secures the reliability of the data reading.

(1.1) Logical Construction of the Optical Disk

Figure 4A:
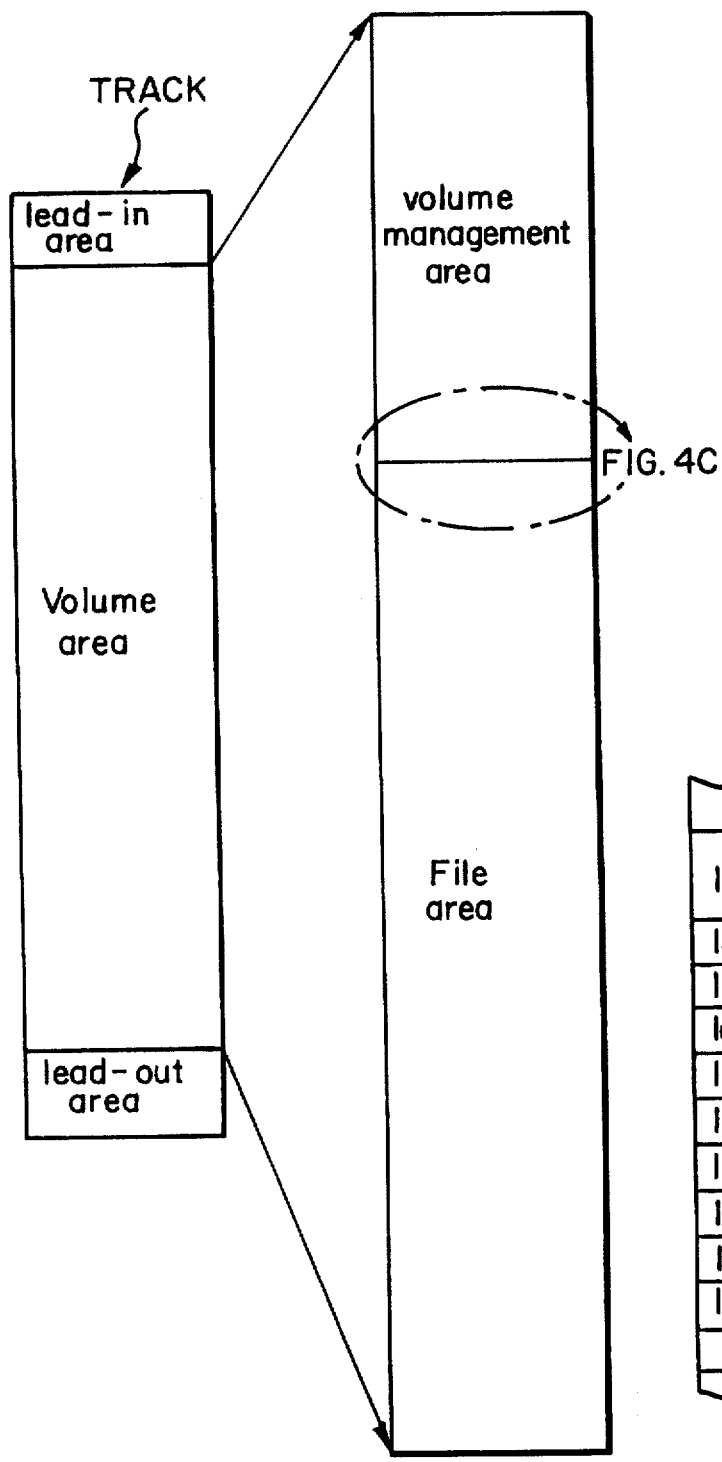
FIGS. 4A and 4C shows the logical construction of the optical disk.
Figure 4C:
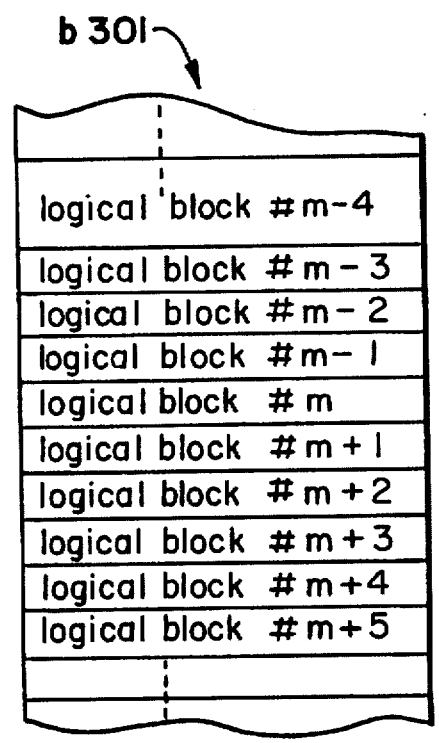

A spiral track formed with the series of pits includes a lead-in area, a volume area, and a lead-out area. FIGS. 4A and 4C show a spiral track re-formed into a rectangle. As shown in this drawing, the lead-in area, volume area, and lead-out area are included in a track in series, and these areas are recognized by identification information included in the sector address. The lead-in area is located at the innermost position of the track; the lead-out area the outermost position. The lead-in area stores operation stabilization data which is used when the DVD player starts reading data from the optical disk. The lead-out area informs the reproduction apparatus of the end of reproduction and does not store meaningful data.

The volume area stores digital data which makes up an application, and manages the physical sector, as a logical block, to which the volume area belongs. The logical blocks are identified by their serial numbers, which are put to consecutive physical sectors with the first physical sector in the data recording area as number 0. "b301" shown in FIG. 4A shows a group of logical blocks in the volume area. The logical blocks have their logical block numbers such as #m, #m+1, #m+2, #m+3, as shown in b301.

As shown in FIGS. 4A and 4C, the volume area also includes a volume management area and a file area.

The volume management area stores the file system management information conforming to ISO13346, which is used to manage a plurality of logical blocks as files. The file system management information shows the relation between a plurality of file names and addresses of groups of logical blocks. The disk reproduction apparatus achieves the disk access in units of files by using the file system management information. More specifically, if a file name is given, the disk reproduction apparatus refers to all the system management information to calculate all the groups of logical blocks for the file, and accesses the groups of logical blocks to fetch a desired piece of digital data.

Figure 4B:
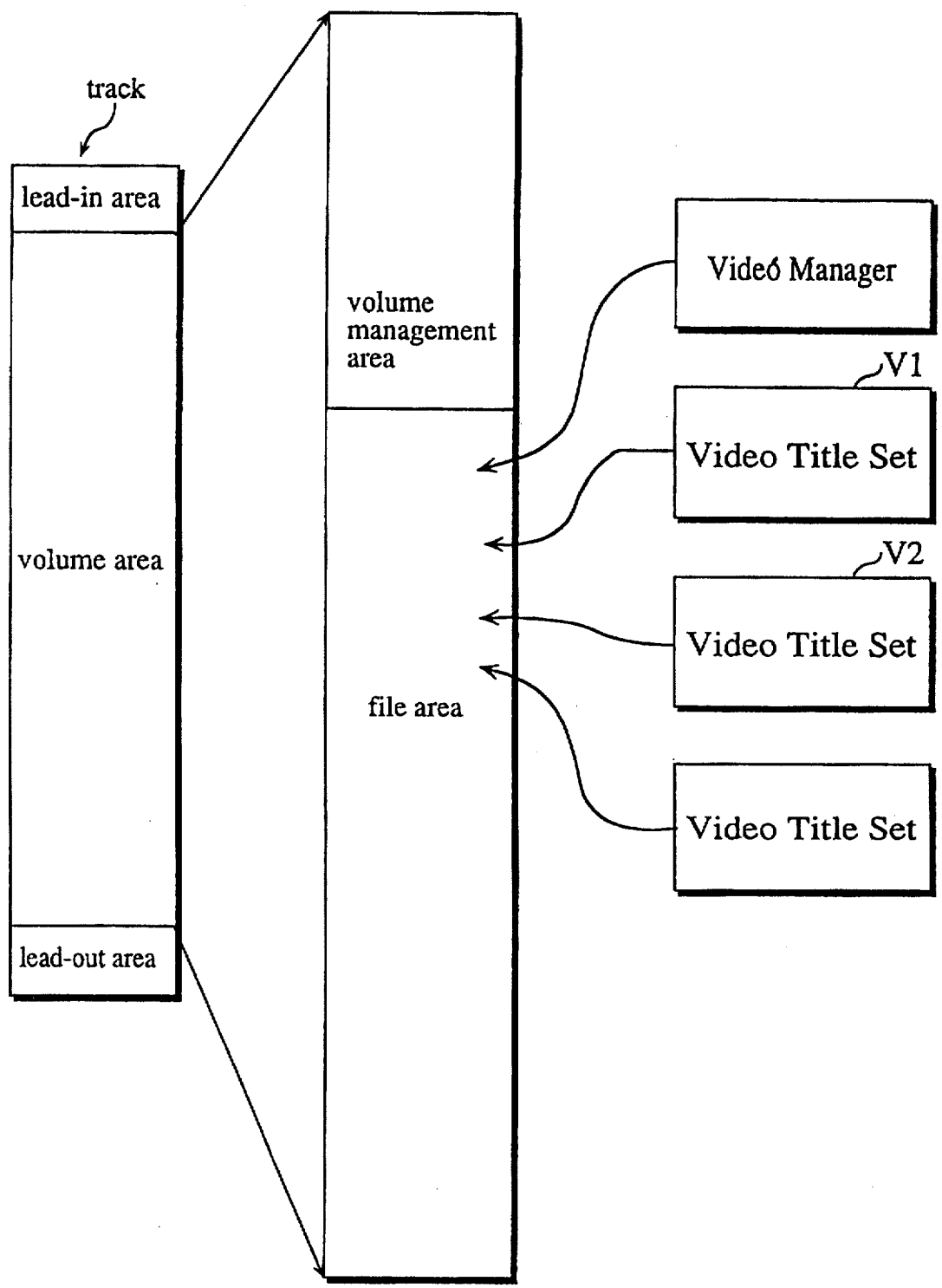
FIG. 4B shows the file area of the optical disk.
Figure 6B:
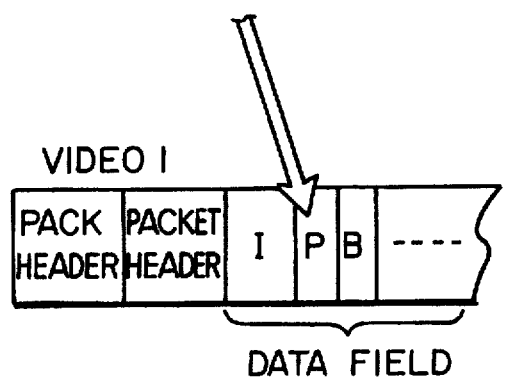
Figure 6C:
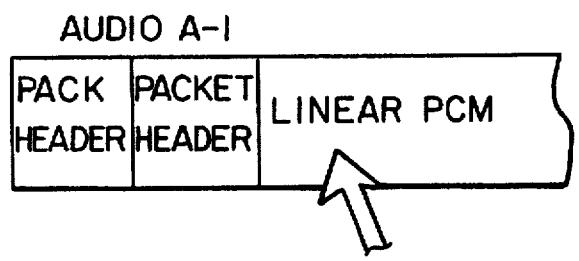
Figure 6D:
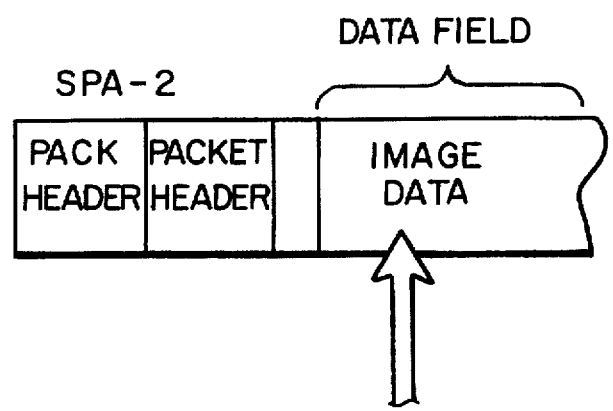

FIG. 4B shows the file area. As shown in the drawing, the file area stores a Video Manager and a plurality of Video Title Sets. Each of these elements includes a plurality of consecutive files whose recording positions are calculated from the file system management information. The reason why the files are consecutive is that since the data size of the moving picture data is so large that if the data is included in a file, the file size exceeds 1 GB.

The Video Title Set stores a set of one or more DVD applications called titles. An example of such a set is a movie application in which two versions of the same movie are included, namely, a theater version and an original cutting version. This is because since both versions share many parts of the same movie and can be used in effect when they are managed together as a set.

In FIG. 4B, Video Title Sets V1 and V2 are interactive software titles. Video Title Set V1 is "detective story game" and Video Title Set V2 is "round-the-world quiz." These interactive software titles are achieved by the data structure characteristic to the optical disk of the present embodiment. Though it is a game, "detective story game" has a lot of shots filmed with the casting and locations equivalent to those of a movie. The story includes many characters who are involved in mysterious events. The hero detective is driven into a corner many times. The user can selects the actions of the detective, and can change the story development by his/her reasoning and wits.

"Detective story game" is also a set of titles, namely "beginner," "intermediate," and "advanced," which differ in the mystery level. The three titles share the most of images, but each course has its own scenes. In "advanced," the user cannot enter a succeeding scene until he/she correctly answers a series of difficult questions. The series of difficult questions are replaced by scenes in "beginner" giving a hint as to the tricks to the user.

"Round-the-world quiz" provides the user with questions concerning geography and arts related to various places in the world. The title reproduces an image representing either "pass" or "not pass" at the end of the title according to the points obtained by the user. "Round-the-world quiz" is also a set of titles, namely "Europe course," "U.S.A. course," and "world course." "World course" shares the images with "Europe course" and "U.S.A. course." In each of "Europe course" and "U.S.A. course," the same questions are reproduced in the same order. However, in "world course," different combinations of questions are reproduced every time the user plays the title.

The Video Manager stores information on menus. The information is used when the user selects a title among all the titles stored in the plurality of Video Title Sets to reproduce it.

(1.1.1) Logical Construction . . . Video Title Set

FIG. 5 shows the construction of the Video Title Set.

The Video Title Set includes a plurality of video objects (VOBs), being multimedia data, and the Video Title Set management information that manages the reproduction order of the video objects (VOBs).

(1.1.1.1) Video Title Set . . . Video Object (VOB)

The video object (VOB) is multimedia data including digital moving pictures, digital sounds, image data, and management data for managing these kinds of data. For example, in interactive software title "detective story game," each of VOB#1, VOB#2, VOB#3, . . . shown in FIG. 5 includes a scene of interviewing people concerned, a scene of investigating the spot, and a scene of following a suspect, etc.

A video object (VOB) includes a plurality of VOB units aligned in time series. A VOB unit (VOBU) is a piece of reproduction data with a time period ranging from about 0.5 to 1.0 seconds. A VOB unit includes, as shown in FIG. 5, a management information pack and a plurality of packs, namely, video packs, audio packs, and sub-picture packs. Each data pack has 2 KB of data. By re-constructing these packs, digital data sequences of each video data, audio data, sub-picture data, and control data are generated. These digital data sequences re-constructed in types are called elementary streams. A VOB is also called a program stream or a system stream each of which includes a plurality of elementary streams.

In FIGS. 5 and 6A–6D, all data packs are arranged regularly for the sake of explanatory convenience. However, since the reproduction apparatus fetches these packs after storing them in buffers, they can be arranged irregularly, except the management information pack which should be placed at the first position. Also the total number of packs in a VOB unit and the number of packs for each type may not be the same since moving picture data, audio data, and sub-picture data include variable-length compressed data. Actually, each VOB unit has the number of packs different from each other. Also, though the VOB unit of the present embodiment has two video packs, a general moving picture includes hundreds of video packs since the rate of about 4.5 Mbits/s is assigned to the moving picture data for transferring the data to the reproduction apparatus.

The video packs stored in the video object (VOB) form at least a piece of digital video data called GOP (Group of Picture). GOP is a unit of compressed digital moving picture data after decompression, having about 12 to 15 frames of image data. GOP is stipulated under MPEG2 (Moving Pictures Experts Group, ISO11172, ISO13818).

FIGS. 6A–6D show the relation between these packs in VOB and a scene. The drawing shows, from the top, a moving picture material for a scene, a VOB, three channels of audio materials, and two channels of sub-title materials. The downward arrows indicate how moving picture materials are recorded in the data fields of the packs.

As shown in the drawing, a moving picture of about 0.5 seconds from the start is coded into I-pictures (Intra-Pictures), P-pictures (Predictive-Pictures), and B-pictures (Bidirectionally predictive Pictures). Then, the pictures are recorded in the data fields of video packs #1 and #2 in VOBU#1. Note that though there are hundreds of video packs in reality, it is supposed that there are two packs, as described above. Similarly, a moving picture of about 0.5 seconds to 1.0 seconds from the start is coded into I-pictures, P-pictures, and B-pictures. Then, the pictures are recorded in the data fields of video packs #3 and #4 in VOBU#2. Though it is not shown in the drawing, a moving picture of about 1.0 seconds to 1.5 seconds from the start is coded and recorded in the data fields of video packs in the next VOB unit. In this way, a lot of shots such as a realistic action by a stunt man and a marvelous performance by a famous actor are coded into thousands of I-pictures, B-pictures, and P-pictures, then are recorded in the data fields of the video packs in the VOB unit. In this way, moving picture data is stored in the data fields of the video packs.

(1.1.1.1.1) Video Object (VOB) . . . Video Pack

Figure 7A:
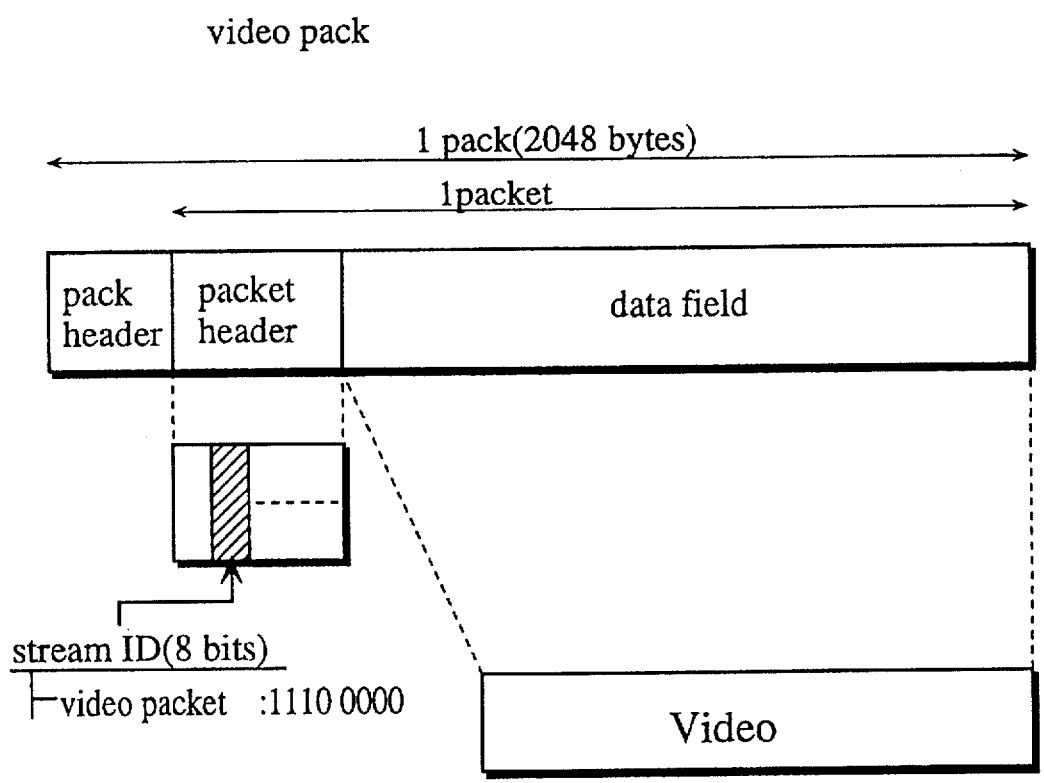
FIG. 7A shows the construction of the video pack.

FIG. 7A shows the construction of the video pack. A video pack includes a pack header, a packet header, and a data field as stipulated under MPEG and is 2 KB in size. The pack header includes a pack start code and an SCR (System Clock Reference) as stipulated under MPEG. The packet header includes a stream ID, a packet length, an STD (System Target Decoder) buffer scale size, a PTS (Presentation Time Stamp), and a DTS (Decoding Time Stamp) as stipulated under MPEG.

As shown in this drawing, the stream ID is set as "1110 0000." This indicates that the elementary stream formed by the pack is a moving picture stream.

The SCR and PTS are used to adjust the synchronism with the decoding of audio packs and sub-picture packs. More specifically, the video decoder in the disk reproduction apparatus sets the standard clock based on the SCR, decodes the moving picture data in the data field, and waits for the standard clock to show the time described in the PTS. When the time is shown, the decoding results are output to the display side. With this waiting based on the description of the PTS, the synchronism error between the moving picture data and sub-picture data/audio data when being output is resolved.

(1.1.1.1.2) Video Object (VOB) . . . Audio Pack

Figure 7B:
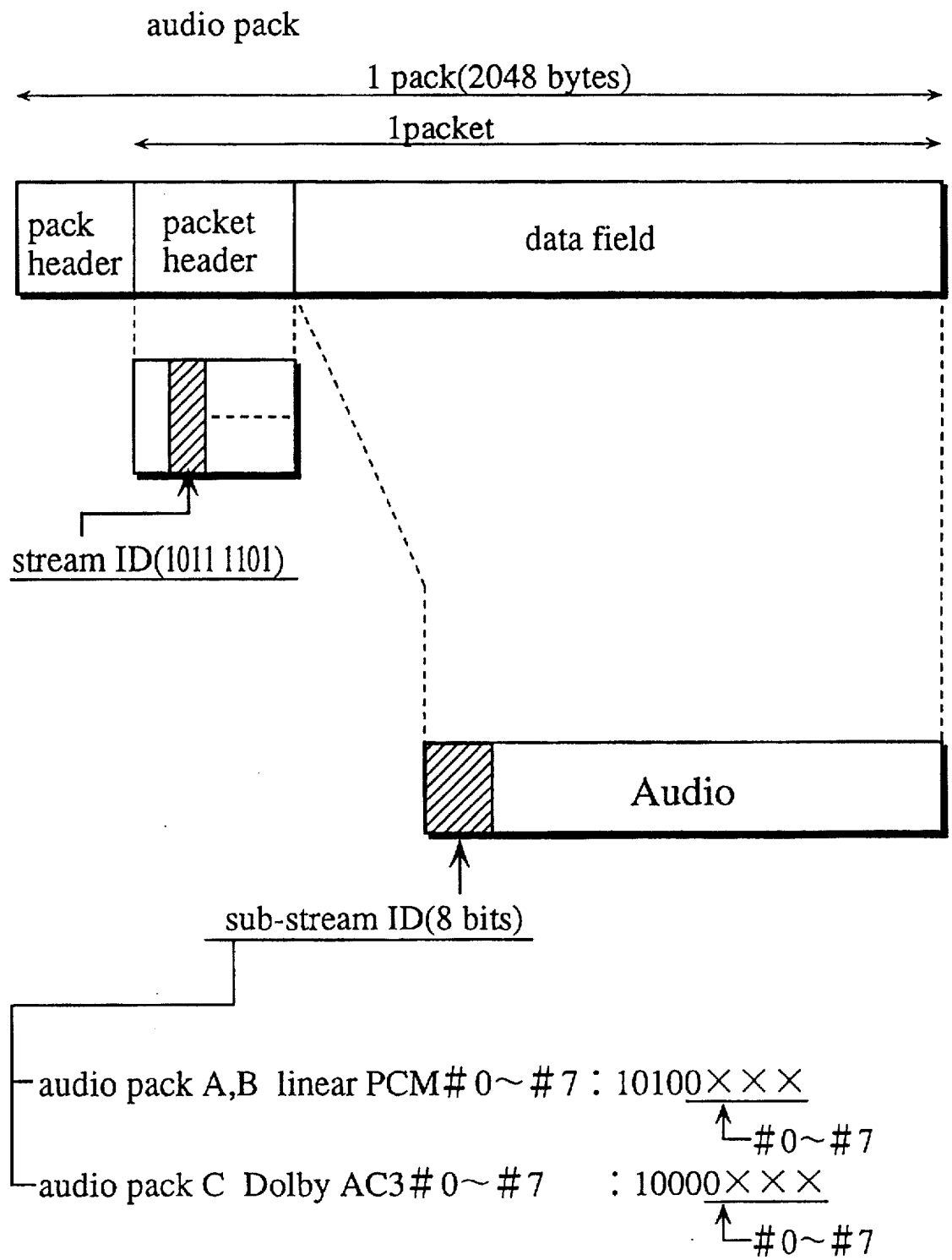
FIG. 7B shows the construction of the audio pack.

FIG. 7B shows the construction of the audio pack. The construction is almost the same as that of the video pack shown in FIG. 7A except that the stream ID of the packet header is set as "1011 1101" and that a sub-stream ID of eight bits is set at the beginning of the data field. See the shaded parts in the drawing. The stream ID is set as "11011 1101." This indicates that the elementary stream formed by the pack is a private stream 1. MPEG stipulates that the private stream is a stream used as other than a moving picture stream and an MPEG audio stream. In the present embodiment, a private stream is used for audio data other than the MPEG audio stream.

The pack header of the audio pack, as that of the video pack, includes a pack start code and an SCR as stipulated under MPEG. The packet header includes a stream ID, a packet length, an STD buffer scale size, a PTS, and a DTS as stipulated under MPEG.

The SCR and PTS of the audio pack are used to adjust the synchronism with the decoding of video packs and sub-picture packs. More specifically, the audio decoder in the disk reproduction apparatus sets the standard clock based on the SCR, decodes the audio data in the data field, and waits for the standard clock to show the time described in the PTS. Since the audio data is decoded faster than the moving picture data and the sub-picture data, the waiting time is much longer than that of them. When the time is shown, the decoding results are output to the speaker side. With this waiting based on the description of the PTS, the synchronism error between the audio data and sub-picture data/moving picture data when being output is resolved.

Each of audio packs A-C includes differently set sub-stream ID in the data field. In this drawing, while five bits on the left-hand side of the sub-stream ID of audio packs A and B are set as "1010 0," the counter part five bits of audio pack C are set as "1000 0." This is because audio packs A and B are of the linear PCM method and audio pack C is of the Dolby AC-3 method. The linear PCM method includes an L element and an R element. On the other hand, the Dolby AC-3 method includes a surround element as well as the L element and R element.

Elementary streams other than moving picture elementary streams are also called sub-streams. In DVD, a VOB can include a moving picture elementary stream and eight audio sub-streams at maximum. In this case, the eight sub-streams has identification numbers #0–#7.

In FIG. 5, two channels are used for the linear PCM method; one for the Dolby AC-3 method.

The data field stores digital sounds of the linear PCM method or the Dolby AC-3 method.

The relation between the dubbing in three channels and the data fields of the audio packs are described with reference to FIGS. 6A–6D show. As shown in the drawing, the dubbing in three channels are encoded with the two methods and recorded in the data fields of the audio packs in units of about 0.5 seconds. The dubbing of A channel is recorded in the data fields of audio packs A-1, A-2, A-3, . . . Note that since audio data and moving picture data are synchronized with PTS, audio data and moving picture data in the same VOB unit may not necessarily be used at the same time. Actually, it may happen that the previous VOB unit stores a piece of audio data corresponding to a piece of moving picture data of the current VOB unit.

Similarly, the dubbing of B channel is recorded in the data fields of audio packs B-1, B-2, B-3, . . . in units of about 0.5 seconds; the dubbing of C channel in the data fields of audio packs C-1, C-2, C-3, . . .

Hereinafter, pieces of data recorded in the data fields of audio packs A-C are respectively called audio data A, audio data B, and audio data C. For example, English dubbing is set as audio data A, French dubbing is set as audio data B, and Japanese dubbing is set as audio data C, allowing the user to select a desired dubbing.

(1.1.1.1.3) Video Object (VOB) . . . Sub-Picture Pack

Figure 7C:
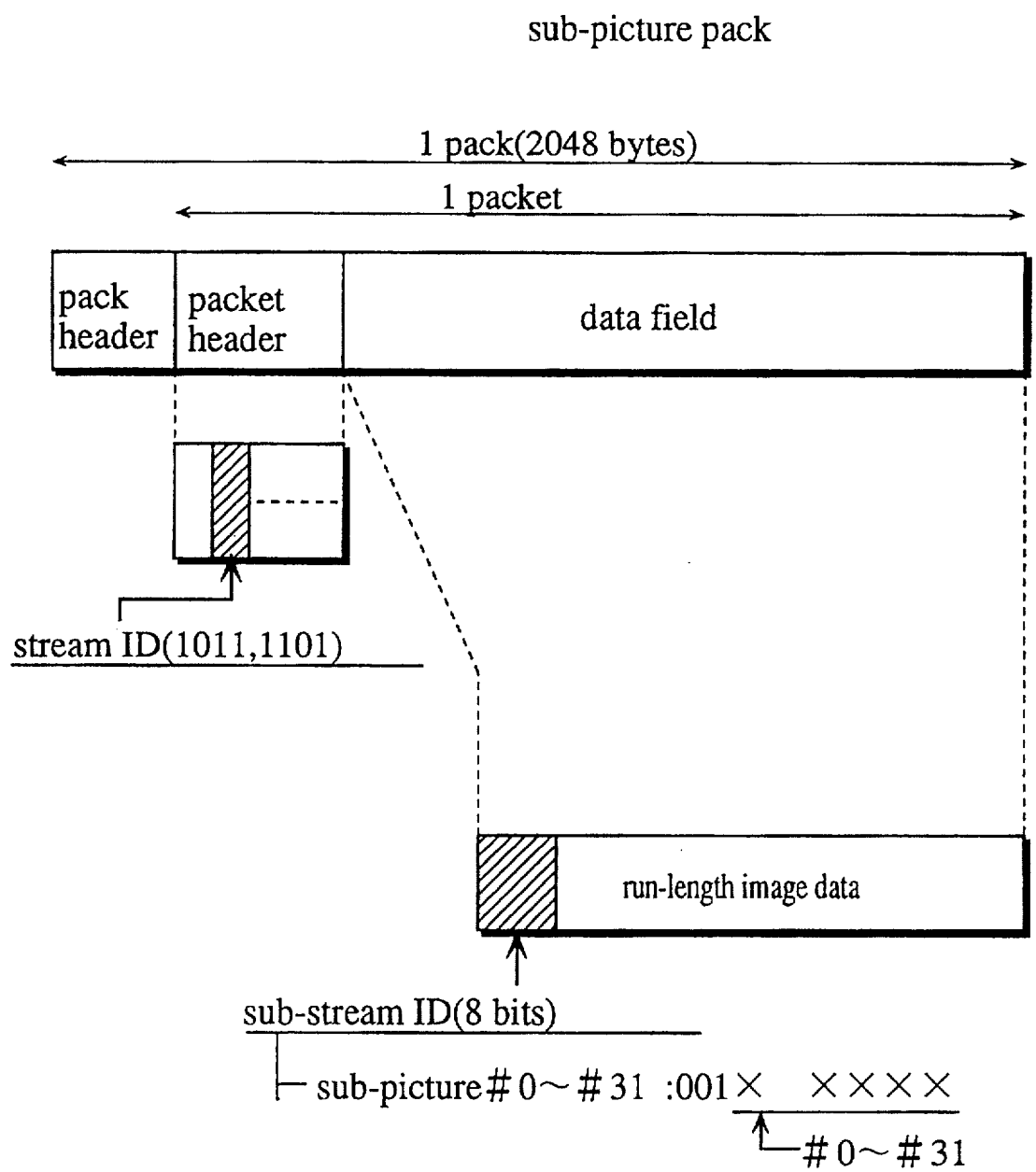
FIG. 7C shows the construction of the sub-picture pack.

FIG. 7C shows the construction of the sub-picture pack. The construction is basically the same as that of the audio pack shown in FIG. 7B.

The pack header of the sub-picture pack, as that of the audio pack, includes a pack start code and an SCR as stipulated under MPEG. The packet header includes a stream ID, a packet length, an STD buffer scale size, a PTS, and a DTS as stipulated under MPEG.

The SCR and PTS of the sub-picture pack are used to adjust the synchronism with the decoding of video packs and audio packs. More specifically, the sub-picture decoder in the disk reproduction apparatus sets the standard clock based on the SCR, decodes the sub-picture data in the data field, and waits for the standard clock to show the time described in the PTS. The waiting is necessary because the load for decoding moving picture data differs from that for audio data. The decoding of moving picture data includes the prediction of the motion compensation as well as run-length decoding, intra decoding, and in-field decoding. Also, while decoding the moving picture data is indispensable for each VOB unit, sub-titles may be decoded at intervals of several seconds. When the time is shown, the decoding results are output to the display side. With this waiting based on the description of the PTS, the synchronism error between the sub-picture data and audio data/moving picture data when being output is resolved.

The stream ID in the packet header of the sub-picture pack is set as "1011 1101," indicating the private stream. However, the sub-stream ID in the data field is set as "001* ****." See the shaded part in the drawing.

Elementary streams other than moving picture elementary streams are also called sub-streams. In DVD, a VOB can include a moving picture elementary stream and 32 sub-picture sub-streams at maximum. In this case, the 32 sub-streams has identification numbers #0–#31.

The data field stores image data compressed with run-length coding and display control information used for displaying the image data. The image data is displayed as the sub-pictures. The display control information is used to control the scroll up/down, color palette conversion, contrast conversion for the displayed sub-pictures. The sub-pictures are superimposed on the moving pictures in the same VOB unit or after.

In FIGS. 6A–6D, a VOB unit includes two sub-picture packs A and B. Therefore, the sub-titles in two channels are recorded in the data fields of these sub-picture packs. For example, English sub-titles are included in sub-picture data A, and French sub-titles are included in sub-picture data B, allowing the user select any of the languages.

Figure 8:
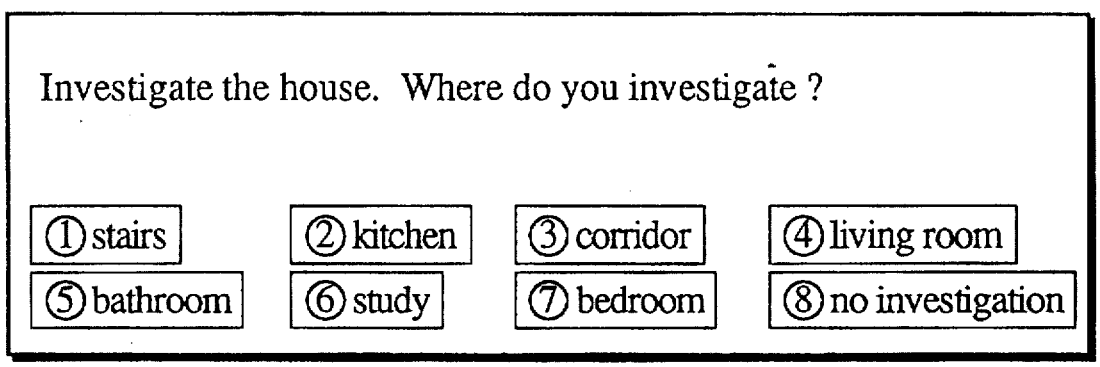
FIG. 8 shows a menu.

Also, the sub-picture data may be used as a menu. FIG. 8 shows a menu for "detective story game." There are eight items representing the places the user can investigate, such as the stairs, kitchen, corridor, and no investigation. The user can select an item using the cursor. The use of the sub-pictures as items in a menu will be described later.

(1.1.1.1.4) Video Object (VOB) . . . Management Information Pack

The management information pack is included in each VOB unit at its start, and its management information is effective while the VOB unit is reproduced. FIG. 7D shows the construction of the management information pack. While each of the video pack, audio pack, and sub-picture pack is a packet, a management information pack is two packets. The two packets are respectively PCI (Presentation Control Information) packet and DSI (Data Search Information) packet. The management information pack includes a pack header, a system header, a packet header for a PCI packet, a data field for a PCI packet, a packet header for a DSI packet, and a data field for a DSI packet. The system header stores the management information on the whole VOB unit conforming to MPEG, that is, the transfer rate for the whole, the transfer rate for each of the moving picture stream, audio stream, sub-picture stream, and the buffer size.

The stream IDs of both packet headers are set as "1011 1111."

(1.1.1.1.4.1) Management Information Pack . . . DSI Packet

Figure 9:
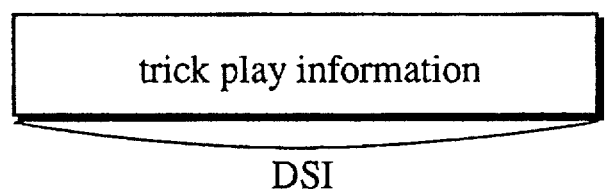
FIG. 9 shows the construction of DSI.

FIG. 9 shows the construction of the DSI packet. As shown in the drawing, a DSI packet includes trick play information.

The trick-play information includes jump target information for the forward bind and the backward bind.

(1.1.1.1.4.2) Management Information Pack . . . PCI Packet

FIG. 10A shows the construction of the PCI packet. As shown in the drawing, a PCI packet includes the PCI general information and Highlight Information.

The PCI general information specifies the reproduction start time and end time of the VOB unit.

(1.1.1.1.4.2.1) PCI Packet . . . Highlight Information

The Highlight Information, as indicated by reference h2, includes highlight general information, item color information, and item information #1, #2, #3, . . . #36. The item information is given to each item displayed at the timing the management information pack is read. For example, in FIG. 8, the eight items such as the stairs, kitchen, corridor, and no investigation are the items. In this case, item information #1 to item information #8 corresponding to the items are the entries. Since the field has a fixed length, effective information is not stored for item information corresponding to the items not used. 36 pieces of item information can be set at maximum. That means 36 items at maximum can be displayed on the screen at the same time.

Now, the menu used in the reproduction apparatus is outlined before the elements of the Highlight Information are described.

Firstly, the items in a menu are in any of the standard state, selection state, and determination state. The state changes with user operations. For example, in FIG. 8, the reproduction apparatus displays, for the default operation, item #1 as the selection state and other items as standard state. If the standard state is white, selection state blue, determination state red, then, only the item for item #1 is blue. With this arrangement, the user can check which item is in the selection state (the item in the selection state is also called the item specified by the cursor). The user can change the item in the selection state by pressing any of up/down/left/right cursor keys. The reproduction apparatus stores information on the cursor destinations for respective up/down/left/right cursor keys, which is later described in detail. If the user presses the determination key on the remote controller while the cursor stays at an item in the selection state, the user can determine the item. The item turns to red from blue. Then, a command specified for the determination state is executed. In FIG. 8, the reproduction control is performed for the determined item.

(1.1.1.1.4.2.1.1) Highlight Information . . . Highlight General Information

The highlight general information, as indicated by reference h4 in FIG. 10A, includes a flag indicating a change from the previous VOB unit, a Highlight Information effective section start position, and a Highlight Information effective section end position.

The flag indicating a change from the previous VOB unit has two bits. The flag set as "00" indicates that the Highlight Information includes no effective item color information or effective item information; "01" indicates that the present Highlight Information is effective from the present pack, then effective Highlight Information is written in the Highlight Information buffer (described later) in the disk reproduction apparatus; "10" indicates that the Highlight Information interleaved in the preceding VOB unit is also effective in the present VOB unit and that the Highlight Information buffer needs not be overwritten; "11" indicates that the highlight command in the Highlight Information has changed and that only the highlight command is written in the buffer.

By checking the flag indicating a change from the previous VOB unit, the disk reproduction apparatus determines whether information on the menu items has been changed. If the information has been changed, the reproduction apparatus updates the Highlight Information in units of VOB units. If the information has not been changed, the reproduction apparatus does not update the Highlight Information. This reduces complicated updates in units of VOB units.

The Highlight Information effective section start position and the Highlight Information effective section end position indicates the range of a section where the highlight section is effective.

(1.1.1.1.4.2.1.2) Highlight Information . . . Item Color Information

Figure 10B:
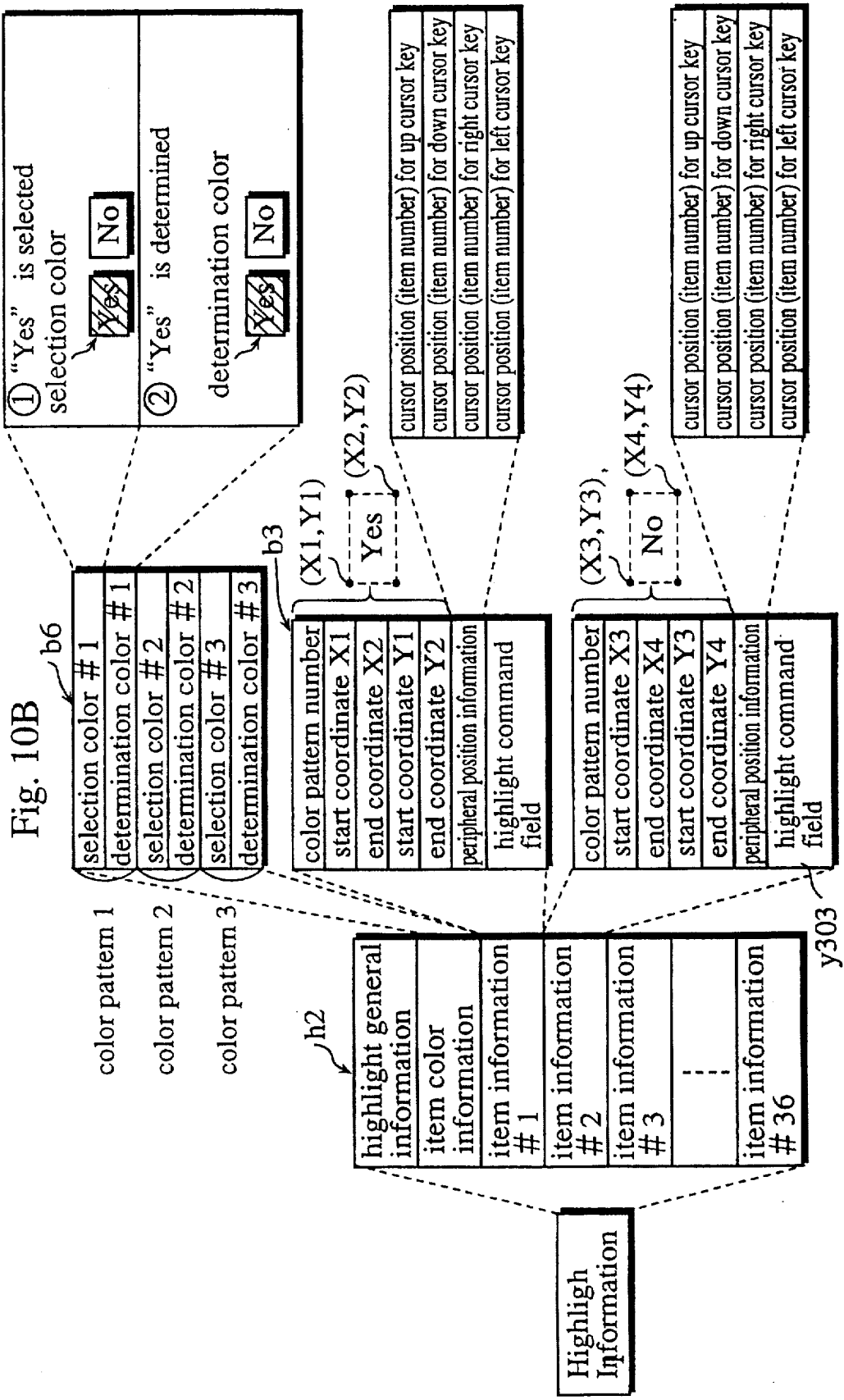
FIG. 10B shows the construction of the Highlight Information.

As indicated by reference b6 in FIG. 10B, the item color information includes three types of combinations of the selection color and determination color. The selection color is given to an item specified by the cursor; the determination color is given to an item determined by the user. Each combination of a selection color and a determination color specifies a color and a mixture ratio for the background color.

(1.1.1.1.4.2.1.3) Highlight Information . . . Item Information

A piece of item information, as indicated by reference b3 in FIG. 10B, includes a color pattern number, start coordinate X1, start coordinate Y1, end coordinate X2, end coordinate Y2, peripheral position information, and a highlight command field. The color pattern number specifies a combination of a selection color and a determination color included in the item color information. Start coordinate X1, start coordinate Y1, end coordinate X2, and end coordinate Y2 indicate the range of an area where the specified color and mixture ratio are applied to when an item is selected or determined by the user.

The peripheral position information includes four respective cursor destinations for up/down/left/right cursor keys. When any of the cursor keys is pressed, the cursor moves to a position specified in the peripheral position information.

For example, FIG. 8 shows a menu with eight items aligned in two rows (Example 1 shown below). Case 1 below is a piece of peripheral position information that specifies four destinations for four cursor keys when the cursor is currently at item 2; Case 2 when the cursor is currently at item 3.
<Example 1>
1 stairs 2 kitchen 3 corridor 4 living room 5 bathroom 6 study 7 bedroom 8 no investigation
<Case 1>Peripheral position information for the current cursor position at item 2
    cursor position for up cursor key . . . 6
    cursor position for down cursor key . . . 6
    cursor position for right cursor key . . . 3
    cursor position for left cursor key . . . 1
<Case 2> Peripheral position information for the current cursor position at item 3
    cursor position for up cursor key . . . 7
    cursor position for down cursor key . . . 7
    cursor position for right cursor key . . . 4
    cursor position for left cursor key . . . 2

In Case 1, the cursor stays at item 2 currently. Here, if the right cursor key is pressed, the cursor should move to item 3. Also, if the left cursor key is pressed, the cursor should move to item 1. The peripheral position information specifies these destinations with the item numbers.

The highlight command field is related to an item information. The command written in the highlight command field is executed by the disk reproduction apparatus after the related item is determined by the user. The commands that can be written in the highlight command field are divided into SET commands and BRANCH commands. Now, the SET commands are described. The BRANCH commands are described later.

The SET command instructs the disk reproduction apparatus to substitute a value for a value in a general-purpose register and to perform an operation using the value and an immediate value.

The general-purpose register temporarily stores user's actions or answers. For example, in "detective story game," general-purpose registers store user's actions in interviewing people concerned and in investigating a house. Also, in "round-the-world quiz," general-purpose registers temporarily store user's answers in certain scenes.

FIG. 11 shows various SET commands. The SET commands are divided into "SetReg" and "Random."

As shown in FIG. 11, the set register command "SetReg" includes a register number field, an operation field, and an increment (immediate value) field. The register number field specifies any of general-purpose registers R1–R3. The operation field specifies any of substitute, addition, multiplication, subtraction, division, MOD operation, AND operation, OR operation, and XOR operation. If "substitute" is specified in the operation field and a value is specified in the increment field, a specified general-purpose register is overwritten by the value. If "addition" is specified in the operation field and a value is specified in the increment field, the value is added to a specified general-purpose register. If "subtraction" is specified in the operation field and a value is specified in the increment field, the value is subtracted from a specified general-purpose register.

The random number generation command "Random" includes a register number field and an immediate value field. The random number generation command selects an integer at random among integers ranging from 1 to a numeral specified in the immediate value field, and substitutes the integer for a value in a general-purpose register specified in the register number field.

Suppose that the set register commands are written in the highlight command fields of the item information for the eight items in a menu shown in FIG. 8 as follows.
<Case 3>
1 stairs . . . set register command "SetReg R1,1"
2 kitchen . . . set register command "SetReg R1,2"
3 corridor . . . set register command "SetReg R1,3"
4 living room . . . set register command "SetReg R1,4"
5 bathroom . . . set register command "SetReg R1,5"
6 study . . . set register command "SetReg R1,6"
7 bedroom . . . set register command "SetReg R1,7"
8 no investigation . . . set register command "SetReg R1,8"

By writing the set register commands as shown above so that each general-purpose register stores a different value, actions taken by the user with the menu of FIG. 8 can temporarily be stored.

The Highlight Information included in the management information pack which is included in a video object (VOB) as well as the moving picture data, audio data, and sub-picture data, allows the disk reproduction apparatus to perform an addition/subtraction with a value stored in a general-purpose register according to a determination operation by the user.

The management information pack included in each VOB unit makes it possible for the disk reproduction apparatus to receive and execute an instruction from the user with time accuracy of around 0.5 seconds.

The above response by the disk reproduction apparatus is achieved by the following reasons. Since each pack included in a video object (VOB) is 2 KB in size, being equal to the sector size of the optical disk, each video object (VOB) is stored over consecutive sectors without rooms. The data stored in the consecutive sectors can be fetched in succession without a waiting time at seek and the like. As a result, the disk reproduction apparatus can fetch the management information at every around 0.5 seconds without halting the reproduction of image data and can control the reproduction according to the fetched management information.

The above reproduction control performed with time accuracy of around 0.5 seconds by using the control data for navigation stored in the management information pack is called the reproduction control with GOP level.

(1.1.1.2) Video Title Set . . . Video Title Set Management Information

The Video Title Set management information stores information used for managing the plurality of reproduction orders of the above-described video objects (VOBs). In DVD, the information specifying a reproduction order of a group of video objects (VOBs) is called a program chain (PGC). That is, the Video Title Set storing "detective story game" of the present embodiment has the Video Title Set management information which stores a plurality of program chains specifying the scene developments for "beginner," "intermediate," and "advanced."

Figure 12A:
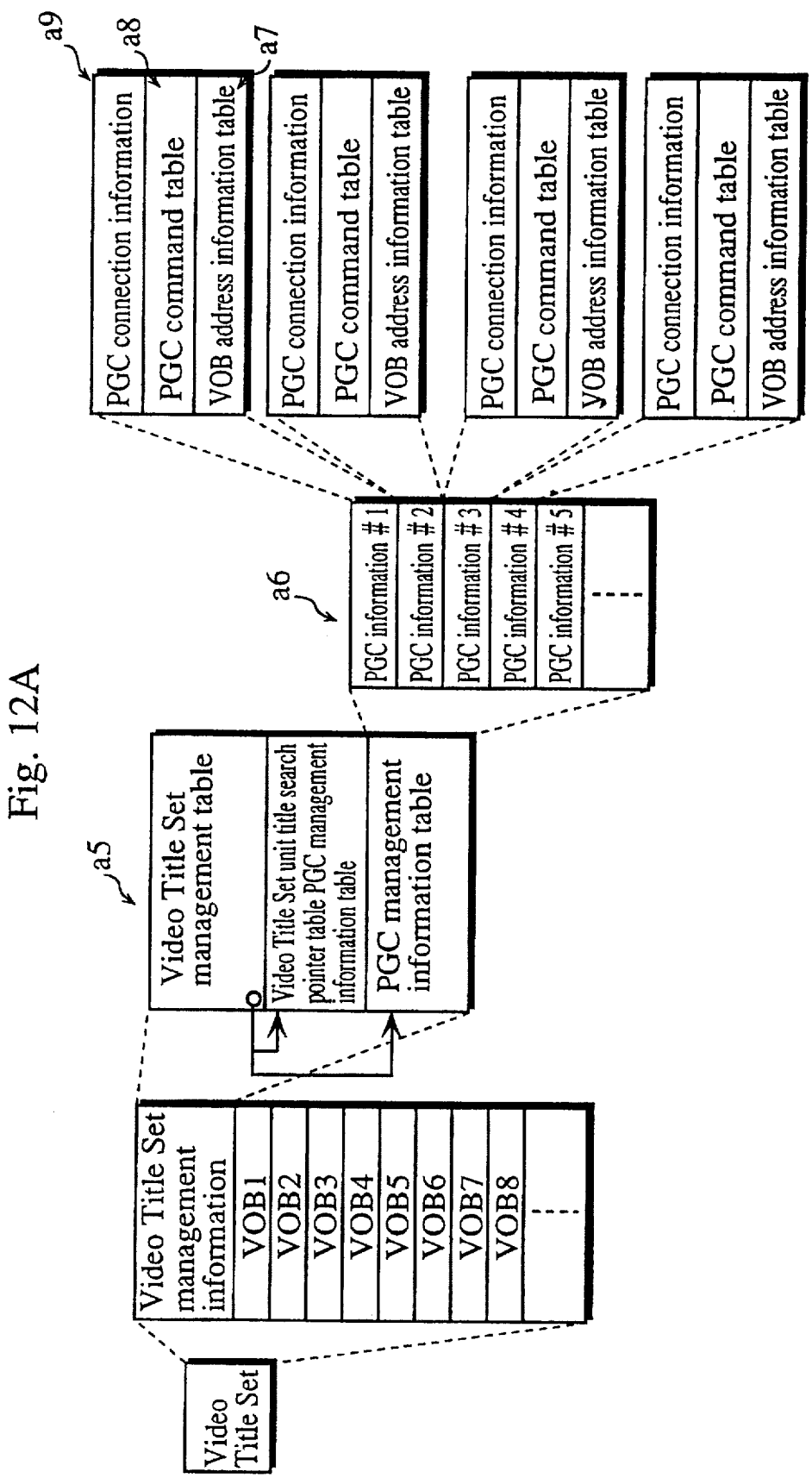
FIG. 12A shows the construction of the Video Title Set.

FIG. 12A shows the construction of the Video Title Set management information. As indicated by reference a5 in the drawing, a piece of Video Title Set management information includes a Video Title Set management table, a Video Title Set unit title search pointer table, and PGC management information table.

The Video Title Set management table is the header information of the Video Title Set management information and stores pointers for the storage positions of the Video Title Set unit title search pointer table and the PGC management information table.

The Video Title Set unit title search pointer table is the index of the plurality of program chains stored in the PGC management information table and specifies a pointer for the storage position of a program chain to be executed first in each title. In the present embodiment, this table stores the first piece of PGC information for each of "beginner," "intermediate," and "advanced" of "detective story game."

The PGC management information table stores, as indicated by reference a6, a plurality of pieces of PGC information #1, #2, #3, #4, . . . #n. Each piece of the PGC information specifies a reproduction order of one or more VOBs. It is possible to specify a plurality of reproduction orders by a plurality of pieces of PGC information for the same VOBs. For example, for the Video Title Set shown in FIG. 5, suppose a piece of PGC information stores a reproduction order of VOB#1-VOB#2-VOB#3-VOB#4, then, these VOBs are reproduced in the written order. Similarly, if a piece of PGC information stores a reproduction order of VOB#3-VOB#2-VOB#1-VOB#4, these VOBs are reproduced in this order. "Detective story game" of the present embodiment has a lot of story developments different from each other. This is achieved by preparing a plurality of pieces of PGC information for each story development, using the characteristic that a plurality of reproduction orders can be specified for the same group of VOBs.

(1.1.1.2.1) Video Title Set Management Information . . . PGC Information

A piece of PGC information, as indicated by reference a6 in FIG. 12A, includes PGC connection information as indicated by reference a9, a PGC command table as indicated by reference a8, and a VOB address information table as indicated by reference a7.

The PGC connection information specifies the piece of PGC information to which it belongs and the preceding and succeeding pieces of PGC information. The disk reproduction apparatus determines the next piece of PGC information according to the PGC connection information after it completes the reproduction of a piece of PGC information. In this way, the reproduction apparatus continues the reproduction control by changing the PGC information.

The VOB address information table describes the location on the optical disk where VOBs to be read for a scene development are recorded.

The PGC command table stores commands for navigation control related to the VOB address information table. The disk reproduction apparatus executes the commands written in this table before and after reading a VOB according to the VOB address information table.

(1.1.1.2.1.1) PGC Information . . . VOB address information Table

Figure 12B:
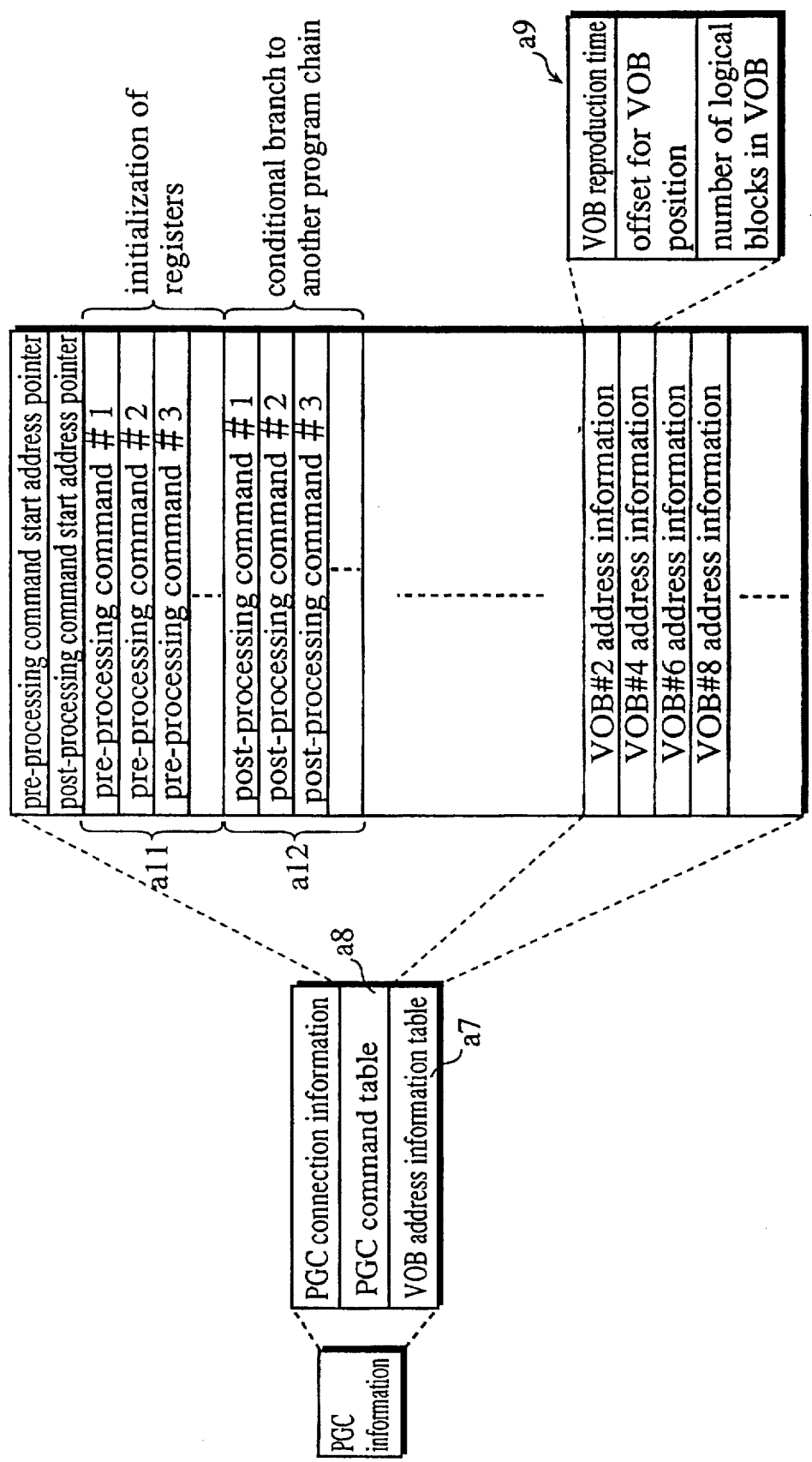
FIG. 12B shows the construction of the PGC command table and VOB address information table.

FIG. 12B shows the construction of the VOB address information table and the PGC command table.

As indicated by reference a7 in the drawing, VOB address information table stores a plurality of pieces of VOB address information to be reproduced. Each VOB address information, as indicated by reference a9, specifies a VOB reproduction time, an offset for a VOB position in the Video Title Set, and the number of logical blocks in the VOB. By using this information, the disk reproduction apparatus calculates the logical block numbers of all logical blocks which store a VOB when it reads the VOB.

Also, VOBs are reproduced in order as corresponding pieces of VOB address information are stored in this table. For example, in FIG. 12B, the VOB address information is stored in order of VOB#2-VOB#4-VOB#6-VOB#8- . . . The VOBs are reproduced in this order.

Now, the relation between the VOB address information table as shown in FIG. 12B and the locations where the VOBs are recorded is described with reference to FIGS. 13 and 15.

Figure 13:
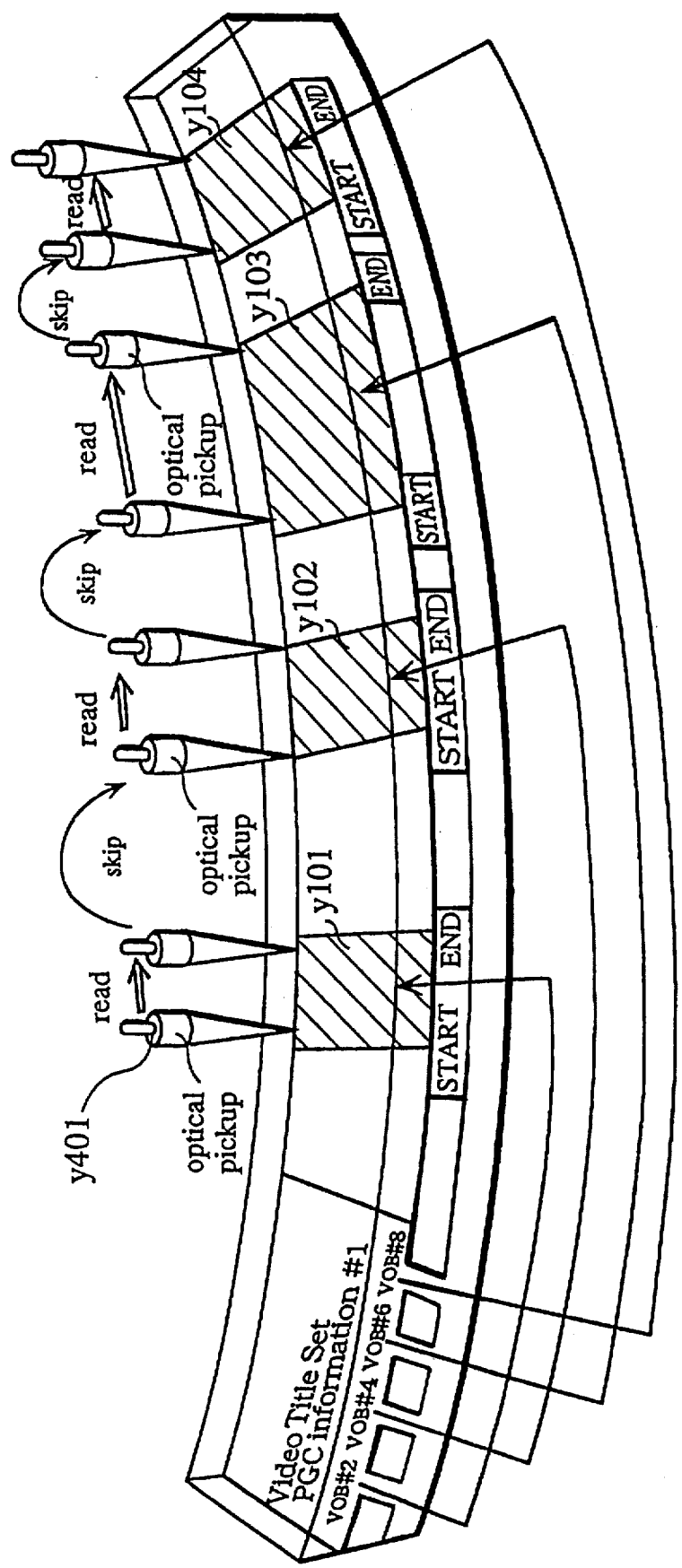
FIG. 13 shows the reproduction of a section in which the system stream shown in FIG. 10 is reproduced according to the reproduction order.

FIG. 13 shows the relation between the VOB address information table and the locations on the optical disk where the VOBs are recorded. FIGS. 15A and 15B show the reproduction order of VOBs according to the VOB address information table. As shown in FIG. 13, VOB#2, VOB#4, VOB#6, and VOB#8 respectively correspond to shaded portions, namely recording sections y101, y102, y103, and y104. A piece of VOB address information specifies the start and end positions of the corresponding recording section, namely, "START" and "END." The disk reproduction apparatus reads, through the optical pickup, data in the ranges specified in the VOB address information by skipping data in other ranges through the optical pickup. As a result, VOBs are reproduced in order of recording sections 101, 102, 103, and 104. FIGS. 15A and 15B show the reproduction of VOB#2, VOB#4, VOB#6, and VOB#8 in order among the VOBs included in a Video Title Set.

(1.1.1.2.1.2) PGC Information . . . PGC command table

The PGC command table, as shown in FIG. 12B, includes a pre-processing command start address pointer, a post-processing command start address pointer, a group of pre-processing commands and a group of post-processing commands. The pre-processing command start address pointer specifies the start position of the group of pre-processing commands (a11).

The post-processing command start address pointer specifies the start position of the group of post-processing commands (a12).

These commands differ in the execution timing by the disk reproduction apparatus. The group of pre-processing commands are executed consecutively before any of the groups of VOBs in the PGC are reproduced. The group of post-processing commands are executed consecutively after all the groups of VOBs in the PGC are reproduced. FIG. 16 shows an example of the reproduction. FIG. 16 shows the execution timing of the pre-processing command group a11 and the post-processing command group a12 in a consecutive reproduction of the VOBs according to the PGC information as shown in FIGS. 15A and 15B show.

The SET commands described before with reference to FIG. 11 can be set as the pre-processing commands or the post-processing commands. For example, if the set register commands "SetReg R1,1," "SetReg R2,2," and "SetReg R3,3," respectively specifying immediate values "1," "2," and "3" and general-purpose registers R1, R2, and R3 are written in the pre-processing command field, these commands are executed by the disk reproduction apparatus before VOBs are reproduced according to the PGC information. Then, the registers R1, R2, and R3 respectively store different initial values, "1," "2," and "3."

If random number generation command "Random R1,4" specifying immediate value "4" and general-purpose register R1 is written as the pre-processing command, the command instructs the disk reproduction apparatus to generate a random integer number in the range of 1–4 and substitute the number for general-purpose register R1 before VOBs are reproduced according to the PGC information.

The SET commands can also be set as the post-processing commands. In this case, the commands are executed after all the VOBs are reproduced according to the PGC information.

In "detective story game," the SET commands can be used as flags indicating which scenes have already been seen by the user. For example, suppose the game has a certain scene which should be watched at least once by the user in relation to the story development. If a pre-processing command in the PGC reproducing the certain scene is a SET command which instructs the disk reproduction apparatus to store a value in a register prepared for a flag, the value is stored in the register each time the scene is reproduced. This allows the disk reproduction apparatus to determine whether the user has reproduced the scene.

As the post-processing commands, the BRANCH commands are often set as well as the SET commands. This is because the BRANCH command as the post-processing command allows the disk reproduction apparatus to branch to a PGC other than a PGC specified as the next PGC in the PGC connection information as a default.

FIG. 14 shows various BRANCH commands. The command "Link" instructs the disk reproduction apparatus to branch to a program chain having a PGC number specified as an operand in the command. If executed, the command "Link" instructs the disk reproduction apparatus to stop reproducing VOBs by the current PGC information and start reproducing VOBs by the PGC information specified in the command "Link." The command "Link" is mainly written as the highlight command and is used to instruct the disk reproduction apparatus to branch to the reproduction corresponding to the menu item selected and determined by the user.

Note that when a piece of PGC information is switched to another piece of PGC information by executing a BRANCH command as a highlight command and the like, the post-processing command is not executed. This is because all the VOBs specified in the current piece of PGC information have not been reproduced by this time.

The command "SetRegLink" shown in FIG. 14 includes a branch command "Link" and a set register command "SetReg," that is, the command performs an operation such as substitute, addition, and subtraction using a value stored in a register, then allows the disk reproduction apparatus to branch to a program chain specified in the command, as in branch command "Link #n."

The command "SetRegLink" is also mainly used as a highlight command. For example, in "detective story game," suppose a menu is displayed urging the user to determine whether to let the detective examine glasses or a pen by selecting a corresponding item in the menu. Here, the command "SetRegLink" set as a highlight command instructs the disk reproduction apparatus to store a value in a register prepared for a flag and branch to a scene corresponding to the determined item.

The command "CmpRegLink" shown in FIG. 14 is a branch command "Link" specifying certain conditions and includes a register number field, an immediate value field (integer field), a branch condition field, and a branch target field for specifying operands. The register number field specifies a general-purpose register. The immediate value field specifies a value which is compared with a value of the specified register. The branch condition field specifies any of such conditions as "=" (equal), "=" (not equal), "<" (less than), ">" (greater than), "≦" (less than or equal), and "≧" (greater than or equal). The command allows the disk reproduction apparatus to judge whether the value stored in a general-purpose register specified in the register number field and the value specified in the immediate value field meet the condition specified in the branch condition field. If met, the disk reproduction apparatus changes the PGC information to the one specified and continues the reproduction.

If used as the post-processing command, the command "CmpRegLink" can instruct the disk reproduction apparatus to branch to a PGC other than a PGC specified as the next PGC in the PGC connection information as a default. For example, in "detective story game," suppose a flag indicating whether a certain scene has been seen by the user is stored in a register. If the flag indicates "no," the disk reproduction apparatus branches to PGC#A, namely, a default destination; if "yes," to PGC#B. By using the combination of the flags, the story development can be changed.

The command "PlayTitle" shown in FIG. 14 includes a title number field. The title number is an identification number of the title. The command "PlayTitle" instructs disk reproduction apparatus to start reproducing the title specified by the title number. The command is mainly used for a title menu which urges the user to select a title to be reproduced.

Note that when the disk reproduction apparatus executes the pre-/post-processing of the PGC information, it is expressed as "a program chain performs the pre-/post-processing." Also, the reproduction control of the VOBs according to the PGC information including the pre-/post processing command is called the reproduction control with route level.

By combining the reproduction control with route level achieved with the above-described construction of the PGC information and the reproduction control with GOP level achieved with the management information pack, a various branch targets can be selected through a plurality of menus displayed in each scene.

<Application Example 1>

Figure 17:
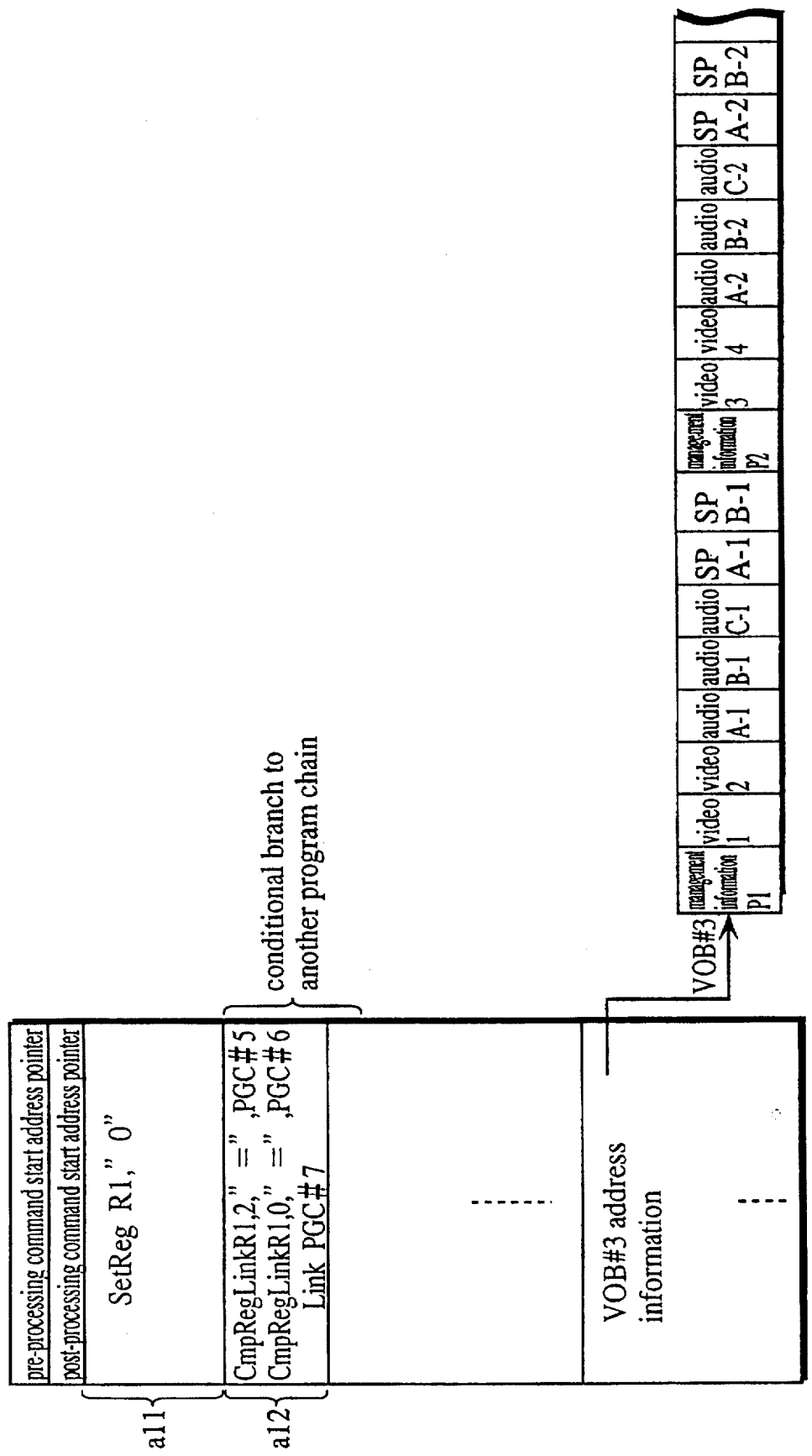
FIG. 17 shows descriptions in the pre-processing command field, the post-processing command field, and the VOB address information.

FIG. 17 shows PGC information #3 having the same construction as that as shown in FIG. 12B. However, PGC information #3 has different contents of the group of pre-processing commands (a11), the group of post-processing commands (a12), and VOB address information table from those of PGC information #3 of FIG. 12B. That is, in FIG. 17, the VOB address information table has the recording section of VOB#3. The pre-processing command field has the set register command "SetReg R1,0" for substituting immediate value "0" for general-purpose register R1. The group of post-processing commands (a12) are the BRANCH commands as shown in FIG. 14 which make up a program chain multi-branch. The program chain multi-branch provides different program chains as branch targets which are determined according to the conditions set in the commands.

In command "CmpRegLink R1,2,=,PGC5" written in the first row of the post-processing command field, "R1,2,=" indicate that the command judges whether general-purpose register R1 stores value "2." Also, "PGC5" indicates that the branch target is program chain #5.

In command "CmpRegLink R1,0,=,PGC6" written in the second row, "R1,0,=" indicate that it is judged whether general-purpose register R1 stores value "0." Also, "PGC6" indicates that the branch target is program chain #6.

The command "Link PGC7" specifies program chain #7 as the branch target.

The three commands set the following reproduction control: if register R1 stores "2," branch to program chain #5; if register R1 stores "0," branch to program chain #6; otherwise, branch to program chain #7.

Figure 18:
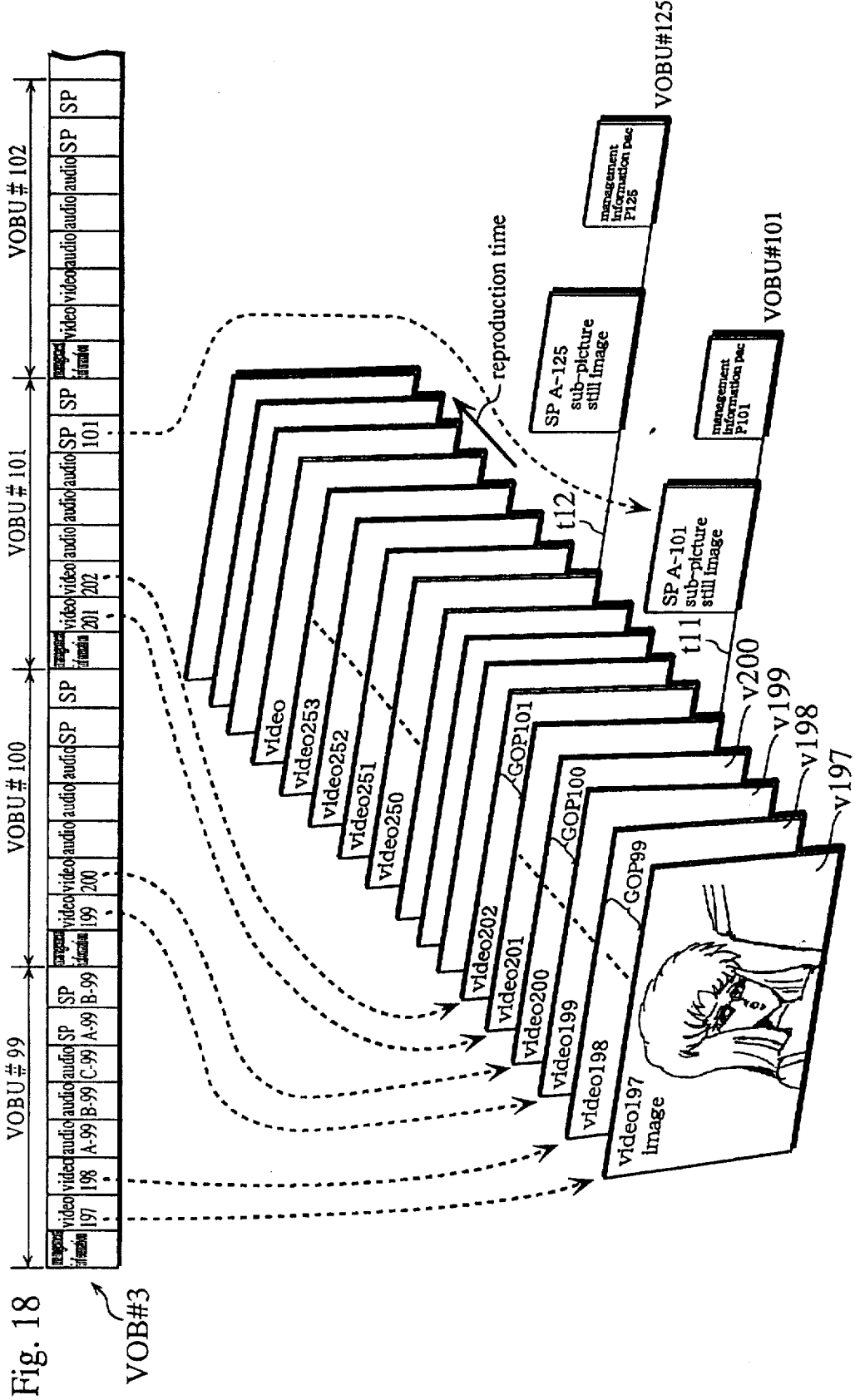
FIG. 18 shows moving picture materials, sub-picture data materials, management information pack used in the present embodiment.

FIG. 18 shows moving picture materials, sub-picture materials, and management information packs included in VOB#3, images to be displayed on the screen, and at what timing the images are displayed. The VOB#3 shown in FIG. 18 has the same construction as the VOB shown in FIGS. 6A–6D, and includes VOBU#99, VOBU#100, VOBU#101, and VOBU#102. VOBU#99 includes video packs 197 and 198. VOBU#100 includes video packs 199 and 200. VOBU#101 includes video packs 201 and 202. Video pack 197 is connected to image v197 by a dotted line arrow. Similarly, video packs 198, 199, 200 . . . are connected to the corresponding images by dotted line arrows.

Images v197 and v198 are images of video packs 197 and 198 included in VOBU#99, which is the 99th VOBU from the first VOBU (VOB#1). Similarly, images v199 and v200 are images of video packs 199 and 200 included in VOBU#100, which is the 100th VOBU from the first VOBU.

Image v197 of video pack 197 shows a still image reproduced from an I-picture among I-pictures, B-pictures, and P-pictures stored in video pack 197.

In the drawing, a VOBU includes two images. However, note that a VOBU in actual optical disks includes about 10–15 images of I-pictures, P-pictures, and B-pictures, corresponding to about 0.5 seconds of reproduction time.

Image 201 of the 101st VOBU stands on a line of time axis t11. Parallel to image 201, "SP A-101 sub-picture still image" and "management information pack P101" stand on the same line. "SP A-101 sub-picture still image" is a menu image of sub-picture A-101 included in the same VOBU (VOBU#101) as video pack 201 is.

"Management information pack P101," included in the same VOBU (VOBU#101) as video pack 201 is, is stored in a buffer of the disk reproduction apparatus when video pack 201 is decoded.

Image 250 of the 125th VOBU stands on a line of time axis t12. Parallel to image 250, "SP A-125 sub-picture still image" and "management information pack P125" stand on the same line. "SP A-125 sub-picture still image" is a menu image of sub-picture A-125 included in the same VOBU (VOBU#125) as video pack 250 is.

"Management information pack P125," included in the same VOBU (VOBU#125) as video pack 250 is, is stored in a buffer of the disk reproduction apparatus when video pack 250 is decoded.

A VOB has a lot of sub-picture packs other than the sub-picture packs as shown in the drawing. Most of them are used for displaying sub-titles. They are not shown in the drawing since they are not directly related to the reproduction control explained here.

Figure 19A:
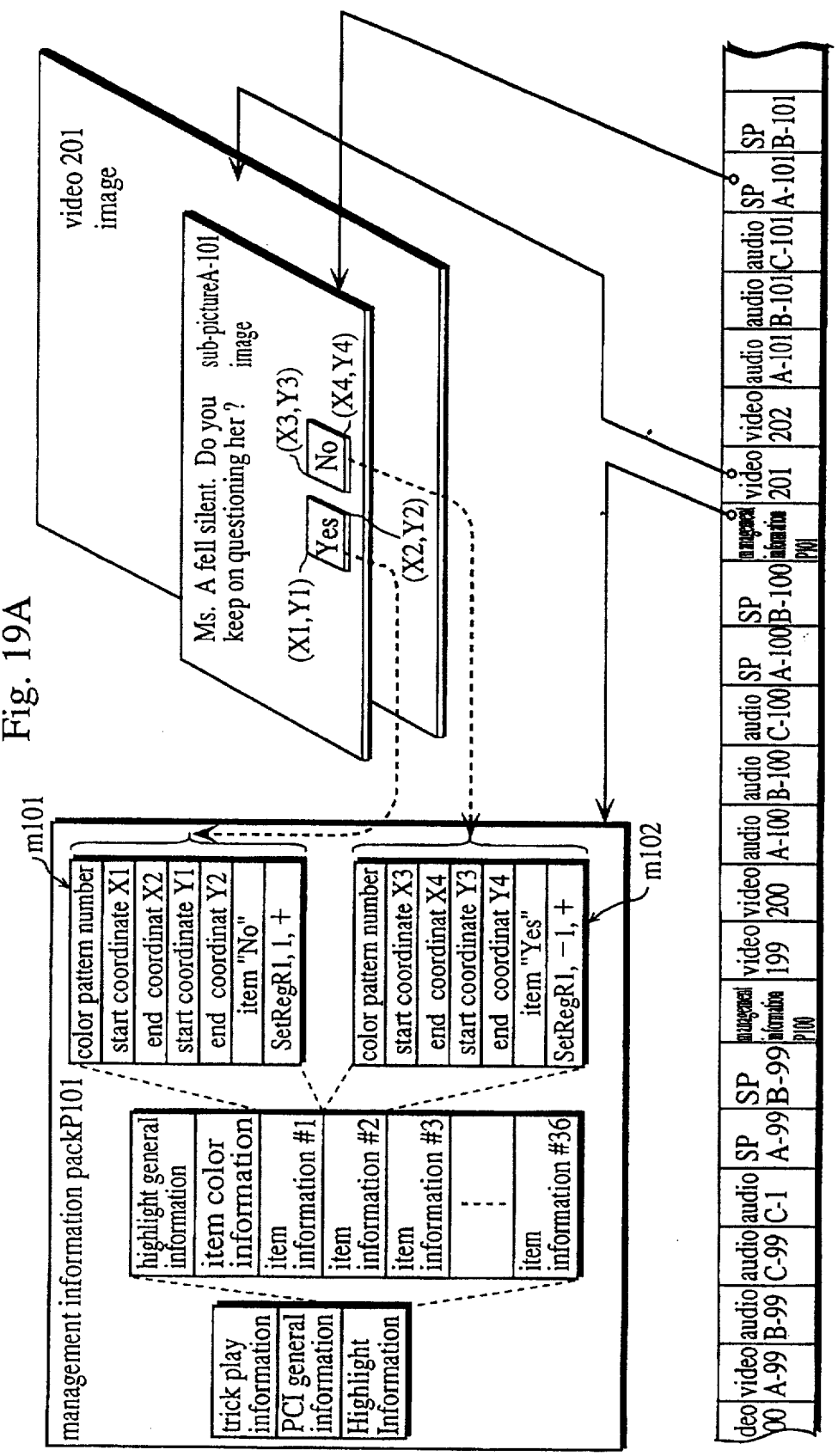
FIG. 19A shows a relation between management information pack P101 and sub-picture data A101 and video 201.

FIG. 19A shows the reproduction of video pack 201 and sub-picture pack A-101 and management information pack P101 stored in a buffer of the disk reproduction apparatus. In the upper-right side of the drawing, an image of sub-picture pack A-101 is superimposed on an image of video pack 201. In the upper-left side of the drawing, contents of the Highlight Information included in management information pack P101 are shown in layers. Broken-line arrows indicate that item "Yes" and item "No" in the sub-picture respectively correspond to item information m101 and m102. Each item information has the construction as shown in FIG. 10B.

"Item" "No" written under "end coordinate Y2" in item information m101 indicates that an identifier of item "No" is written in columns "cursor position for left cursor key" and "cursor position for right cursor key" in the peripheral position information whose construction is shown in FIG. 10B. No data is written in columns "cursor position for up cursor key" and "cursor position for down cursor key" of the same peripheral position information since there is only two items ("Yes" and "No") aligned in a row, as shown in FIG. 19A.

"item" "Yes" written under "end coordinate Y4" in item information m102 indicates that an identifier of item "Yes" is written in columns "cursor position for left cursor key" and "cursor position for right cursor key" in the peripheral position information whose construction is shown in FIG. 10B. No data is written in columns "cursor position for up cursor key" and "cursor position for down cursor key" of the same peripheral position information since there is only two items ("Yes" and "No") aligned in a row, as shown in FIG. 19A.

The highlight command fields of item information m101 and m102 respectively store the set register commands "SetReg R1,1,+" and "SetReg R1,-1,+" respectively for adding and subtracting "1" to/from a value stored in general-purpose register R1.

As the peripheral information in item information m101 and m102 is set above, the cursor moves between items "Yes" and "No" with the operation of cursor keys by the user. When the user performs a determination operation while the cursor stays at item "Yes" on sub-picture pack A-101, command "SetReg R1,1,+" instructs the disk reproduction apparatus to add "1" to the value stored in general-purpose register R1; item "No," command "SetReg R1,-1,+" to subtract "1."

Figure 19B:
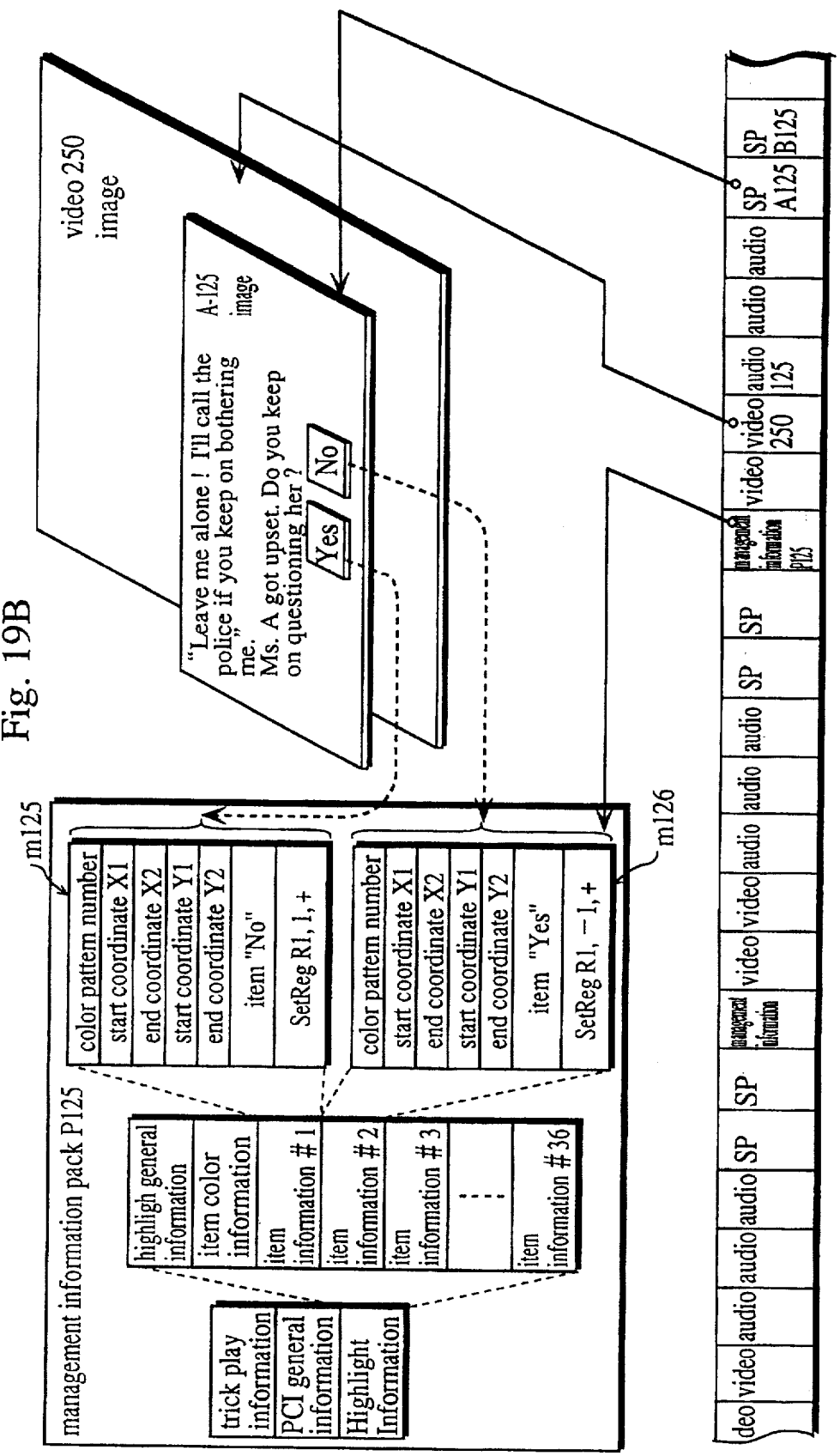
FIG. 19B shows a relation between management information pack P125 and sub-picture data A125 and video 250.

FIG. 19B shows the reproduction of video pack 250 and sub-picture pack A-125 and management information pack P125 stored in a buffer of the disk reproduction apparatus. In the upper-right side of the drawing, an image of sub-picture pack A-125 is superimposed on an image of video pack 250. In the upper-left side of the drawing, contents of the Highlight Information included in management information pack P125 are shown in layers. Broken-line arrows indicate that item "Yes" and item "No" in the sub-picture respectively correspond to item information m125 and m126. Each item information has the construction as shown in FIG. 10B.

"Item" "No" written under "end coordinate Y2" in item information m125 indicates that an identifier of item "No" is written in columns "cursor position for left cursor key" and "cursor position for right cursor key" in the peripheral position information whose construction is shown in FIG. 10B. No data is written in columns "cursor position for up cursor key" and "cursor position for down cursor key" of the same peripheral position information since there is only two items ("Yes" and "No") aligned in a row, as shown in FIG. 19B.

"item" "Yes" "written under" "end coordinate Y4" in item information m126 indicates that an identifier of item "Yes" is written in columns "cursor position for left cursor key" and "cursor position for right cursor key" in the peripheral position information whose construction is shown in FIG. 10B. No data is written in columns "cursor position for up cursor key" and "cursor position for down cursor key" of the same peripheral position information since there is only two items ("Yes" and "No") aligned in a row, as shown in FIG. 19B.

The highlight command fields of item information m125 and m126 respectively store the set register commands "SetReg R1,1,+" and "SetReg R1,-1,+" respectively for adding and subtracting "1" to/from a value stored in general-purpose register R1.

As the peripheral information in item information m125 and m126 is set above, the cursor moves between items "Yes" and "No" with the operation of cursor keys by the user. When the user performs a determination operation while the cursor stays at item "Yes" on sub-picture pack A-125, command "SetReg R1,1,+" instructs the disk reproduction apparatus to add "1" to the value stored in general-purpose register R1; item "No," command "SetReg R1,-1,+" to subtract "1."

Figure 20:
FIG. 20 shows several video images and menus.

FIG. 20 shows images of several video packs. These images "video 198," "video 201," "video 210," "video 220," and "video 250" are displayed on the screen in order as indicated by white arrows as video packs 198, 201, 210, 220, and 250 are decoded in time series. The character in these images looks sad in "video 198" and "video 201," and looks angry in "video 210," "video 220," and "video 250." The images (menus) of sub-picture packs A-101 and A-125 are respectively superimposed on the images of video packs 201 and 250.

If item "Yes" is selected in both menus of sub-picture packs A-101 and A-125, the set register command "SetReg R1,1,+" is executed twice, then the value stored in general-purpose register R1 is "2." Suppose the reproduction of a series of images as shown in FIG. 18 is completed with the value in register R1 unchanged, and the reproduction control changes from the GOP level shown in FIGS. 19A and 19B to the route level with the PGC information shown in FIG. 17. Then, the command "CmpRegLink R1,2,=,PGC#5" in the post-processing command field is executed and the disk reproduction apparatus judges that general-purpose register R1 has "2" and branches to program chain #5.

If item "Yes" is selected in the menu of sub-picture pack A-101 and "No" in A-125, or vice versa, the set register commands "SetReg R1,1,+" and "SetReg R1,–1,+" are executed. Then, the value stored in general-purpose register R1 is "0." Suppose the reproduction of a series of images as shown in FIG. 18 is completed with the value in register R1 unchanged, and the reproduction control changes from the GOP level shown in FIGS. 19A and 19B to the route level with the PGC information shown in FIG. 17. Then, the first command "CmpRegLink R1,2,=,PGC#5" in the post-processing command field is executed and the disk reproduction apparatus judges that general-purpose register R1 has "0" and branches to program chain #6.

If item "No" is selected in both menus of sub-picture packs A-101 and A-125, the set register command "SetReg R1,1,+" is executed twice, then the value stored in general-purpose register R1 is "–2." Then, the third command "Link PGC#7" is executed and the disk reproduction apparatus branches to program chain #7.

Figure 21:
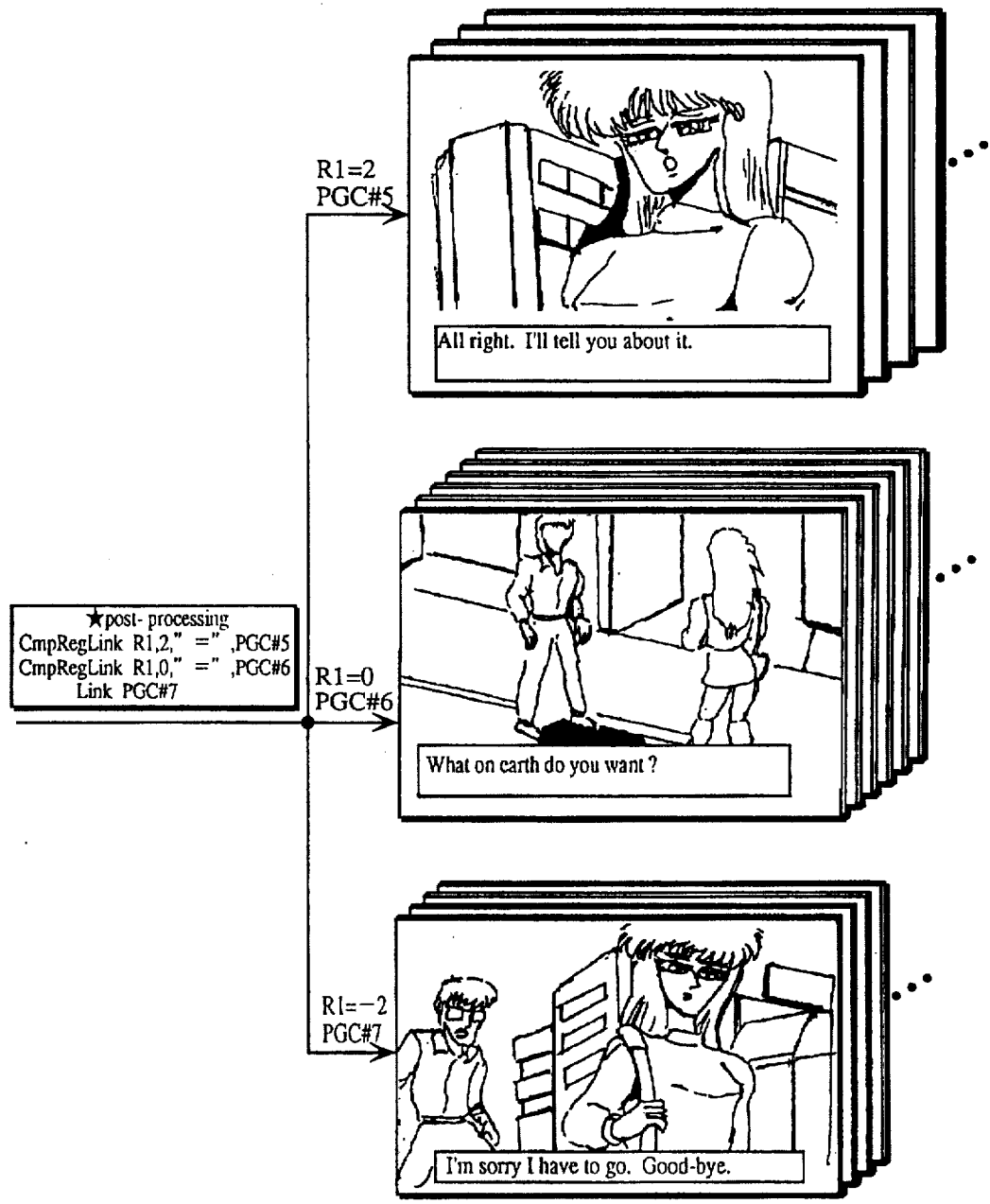
FIG. 21 shows several video images as branch targets in a multiple branch.

As shown above, the responses by the user to the two menus of FIG. 20 can lead to branching to any of three program chains. Here, it is supposed that the branch target program chains #5, #6, and #7 respectively correspond to three VOBs, and these VOBs respectively include images as shown in FIG. 21. The three images in FIG. 21 are filmed shots showing three patterns of action of the character. That means, one of these images in FIG. 21 is displayed. This is the result of the responses to the two menus by the user and the multi-branch by the post-processing as described before. Seeing the change in the action of the character, the user would feel his/her responses to the questions in two menus have influenced and changed the character.

Furthermore, the two menus are respectively synchronized with the changes in the face of the character as shown in FIG. 20 with time accuracy of around 0.5 seconds and are displayed for a necessary time period. Accordingly, being required to determine the action of the character in real time, the user enjoys the virtual reality of feeling as if he/she is the character itself.

Now, FIGS. 20 and 21 are explained from the viewpoint of the story development. In FIG. 20, the expression of the character in "video 198" and "video 201" gives one an impression that the character has an important clue to the case. By superimposing the menu of sub-picture pack A-101 on "video 201," the title urges the user to determine whether to ask the character to say the truth.

The character suddenly changes her attitude in "video 210" to "video 250." The character gets upset and protests against the character (user) in the menu of sub-picture A-125. By superimposing this menu on "video 250," the title intends to check the positiveness of the user in coming at the truth.

If the user selects "Yes" in both menus in FIG. 20, it means that the user is positive in solving the problem. After "Yes" is determined in the second menu, the disk reproduction apparatus branches to program chain 5 by the post-processing of program chain 3 and the upper image in FIG. 21 is displayed. The upper image indicates that the character, convinced by the positiveness of the character (user), begins to talk about the facts she knows.

If the user selects "No" in both menus in FIG. 20, it means that the user is negative in solving the problem. After "No" is determined in the second menu, the disk reproduction apparatus branches to program chain 7 by the post-processing of program chain 3 and the lower image in FIG. 21 is displayed. The lower image indicates that the character, amazed at the negativeness of the character (user), starts leaving the place.

If the user selects "Yes" in the first menu and "No" in the second menu, or vice versa, in FIG. 20, it means that the user is indefinite in solving the problem. After an item is determined in the second menu, the disk reproduction apparatus branches to program chain 6 by the post-processing of program chain 3 and the middle image in FIG. 21 is displayed. The middle image indicates that the character, looking at the ambiguous attitude of the character (user), begins to distrust him.

Now, the use of the highlight command field and the post-processing in branching is considered in comparison.

In Application Example 1, the set register command "SetReg" written in management information packs P101 and P125 sets a value in a general-purpose register, and the post-processing instructs the disk reproduction apparatus to branch to a specified program chain. However, by setting the BRANCH commands in the highlight command fields of VOBU#101 and setting corresponding items as described below in Application Example 2, the disk reproduction apparatus can branch from "video 201" to any of three program chains shown in FIG. 21.

<Application Example 2> item 1 . . . "keep asking the question"

item 2 . . . "stop asking the question"

item 3 . . . "difficult to decide"

highlight command field of item information #1 . . . Link PGC#5 highlight command field of item information #2 . . . Link PGC#6 highlight command field of item information #3 . . . Link PGC#7

When the commands set as above are executed, "video 201" switches to any of the images shown in FIG. 21. This change may be quick but may be too quick. This makes a sharp contrast to Application Example 1. In application Example 1, the change in the action and face of the character is regarded as important, and the current scene changes after all the images in the scene have been reproduced. As a result, if the title creator does not want a sudden change in scene development with program chains, he/she can temporarily store actions taken in a scene in a general-purpose register and allow the disk reproduction apparatus to branch to another program chain by the post-processing according to the value stored in the general-purpose register.

On the other hand, if the title creator wants to surprise the user by changing scenes quickly, he/she can allow the disk reproduction apparatus to branch to another program chain as soon as the user selects an option in a menu. Watching a scene totally different from the previous scene, the user is expected to be astonished.

Note that branching with the use of highlight commands means that an item selecting operation always leads to one kind of branching, namely, one-to-one relation. Though the user may be surprised at the sudden scene changes at first, soon he/she will be accustomed to the branches. Therefore, it is desired to mix the branching with highlight commands and the branching with the post-processing. However, in branching to the PGC information as in selecting a course from a menu, branching with the highlight commands is desirable because the speed is important. On the contrary, if the title creator intends to show each scene fully to the user, as in a dramatic scene development, it is desirable to insert a menu at every two to three seconds, as in Application example 1, and accumulate the responses to the menus and branch to another scene at the end of the current scene according to the accumulated values.

(1.1.2) Logical Construction . . . Video Manager

The Video Manager includes video objects (VOB) and the program chain management information, and the construction is almost the same as that of the Video Title Set. The VOB of the Video Manager differs from that of the Video Title Set in that the Video Manager is specialized in the volume menu. The volume menu provides a list of all the titles included in the optical disk so that the user can select one from the list. The volume menu is displayed on the screen after an optical disk is loaded in the disk reproduction apparatus and the optical pickup moves from the volume management area to the volume area.

Figure 32:
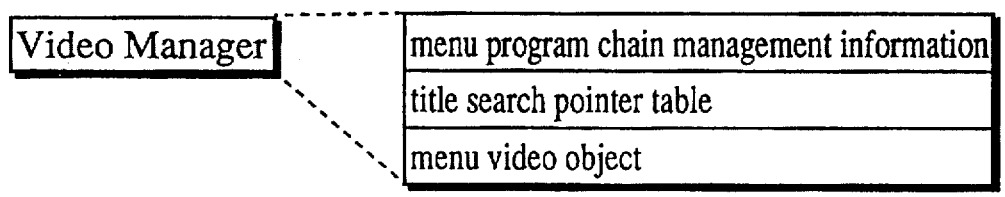
FIG. 32 shows the construction of the Video Manager.

There are following differences between the Video Manager and the Video Title Set. First, while the VOB of the Video Title Set includes video packs, audio packs, sub-picture packs, and a management information pack as shown in FIG. 6, the VOB of the Video Manager includes the same kinds of packs for a menu. Secondly, while the BRANCH commands written in the PGC information and the Highlight Information of the Video Title Set specify branch targets which do not exceed the Video Title Set itself, the BRANCH commands of the Video Manager can specify any of a plurality of titles included in a plurality of Video Title Sets as a branch target. FIG. 32 shows the construction of the Video Manager. As shown in the drawing, the Video Manager includes menu program chain management information, a title search pointer table, and a menu video object.

Figure 33:
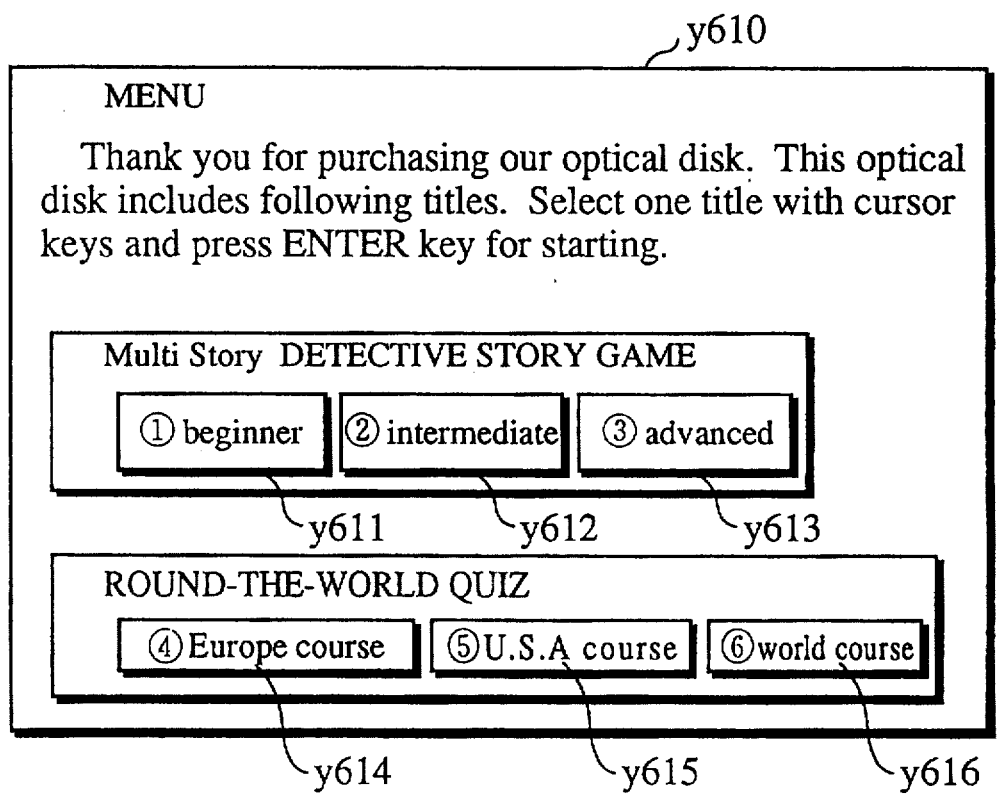
FIG. 33 shows a volume menu.

The menu video object is a VOB specialized in the volume menu. That is, the menu video object includes a sub-picture pack for the volume menu and a management information pack which controls the reproduction according to the selection and determination operations by the user. FIG. 33 is the volume menu displayed on the screen. The menu video object includes a plurality of items. The items represent titles such as "beginner" and "intermediate" of "detective story game." A title is specified when the user determines an item in the menu. The management information pack in the VOB includes as many pieces of Highlight Information as the titles in the optical disk as shown in FIG. 33. The highlight command field of each piece of Highlight Information includes the command "TitlePlay" specifying a Video Title Set or a title as the branch target.

The menu program chain management information is PGC information specialized in the volume menu. The menu program chain management information stores a recording section of the menu video object which is first read by the disk reproduction apparatus. The menu program chain management information is read by the disk reproduction apparatus after an optical disk is loaded in the disk reproduction apparatus and the optical pickup moves from the volume management area to the volume area. Then, the volume menu is displayed on the screen.

The title search pointer table is an index used to identify the Video Title Set and the title number of a title.

(2.1) Outline of the Disk Reproduction Apparatus

Figure 22:
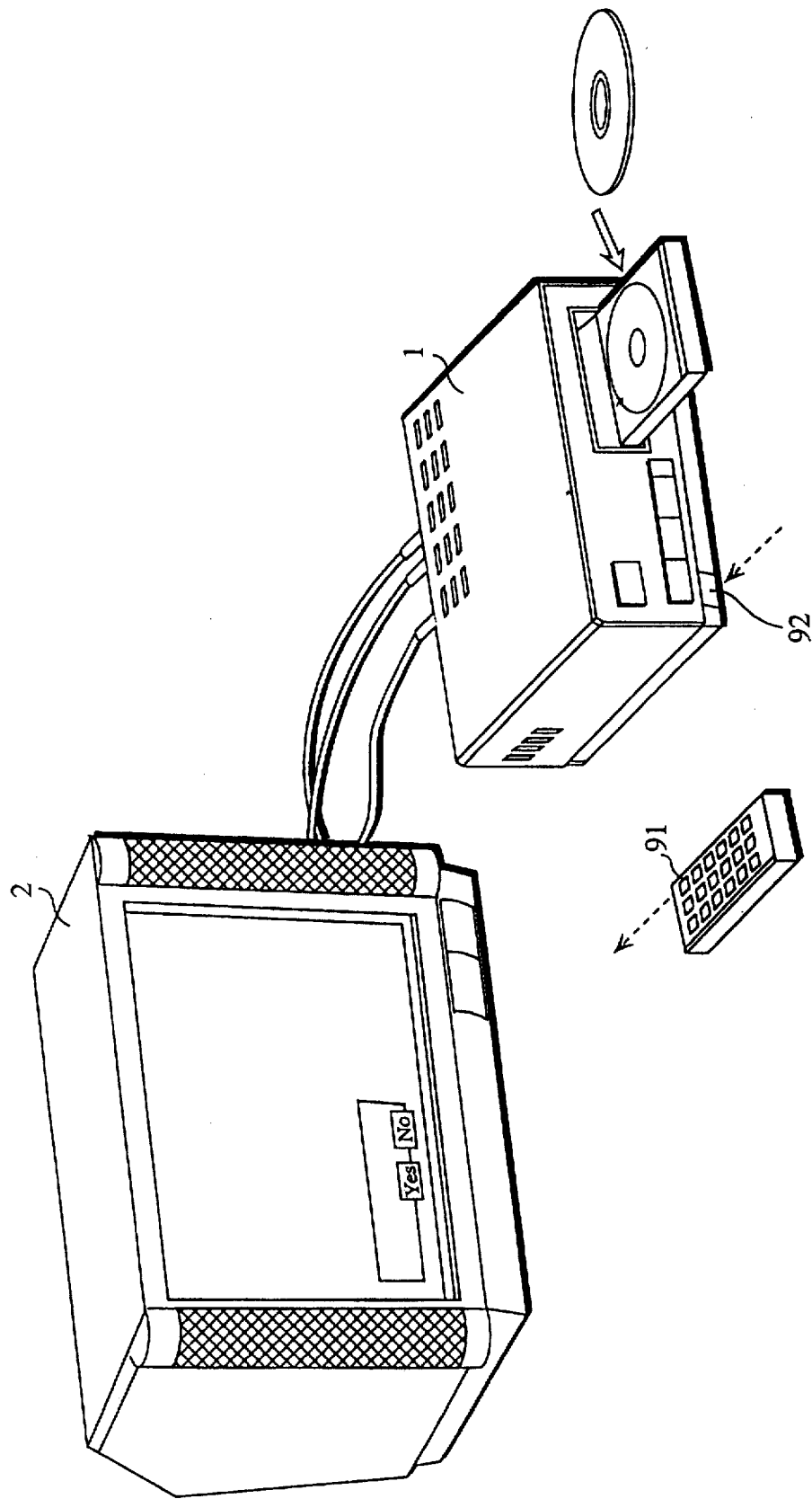
FIG. 22 shows the appearances of the reproduction apparatus of the present embodiment.

DVD players for reproducing optical disks are described with reference to the drawings. FIG. 22 shows the appearances of DVD player 1, TV monitor 2, and remote controller 91.

DVD player 1 includes an optical disk drive in which an optical disk can be set through the slot on the front side.

Remote control receiving unit 92, also set on the front side of the DVD player, includes a light receiving device which receives infrared rays sent from the remote controller. Responding to an infrared ray from the remote controller by a user operation, remote control receiving unit 92 outputs an interrupt signal indicating that a key signal has been received.

On the rear side of the DVD player, video output terminal and audio output terminal are set. Through AV cords connected to the terminals, image signals reproduced by the DVD player can be output to TV monitor 2. The user can enjoy the images reproduced by the DVD player on a large-size TV such as 33-inch or 35-inch TV. As understood from the above description, DVD player 1 in the present embodiment is intended to be used as a household appliance connected to TV monitor 2, not connected to a personal computer and the like.

Figure 23:
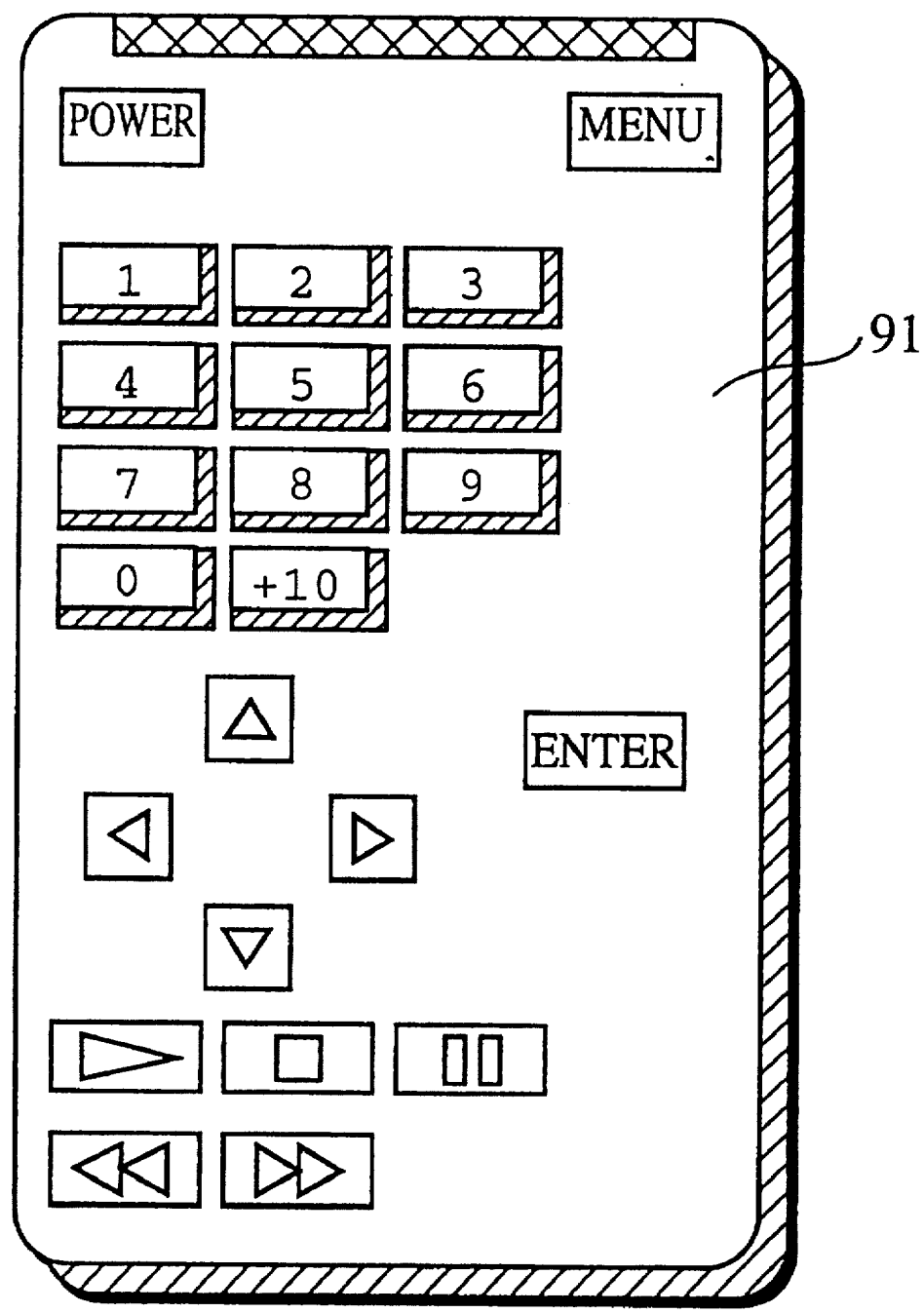
FIG. 23 shows the key arrangement on remote controller 91.

Remote controller 91 outputs infrared rays as codes when key pads with springs under them set on the controller are pressed by the user. FIG. 23 shows the operation panel on remote controller 91. POWER key is pressed to turn on/off the DVD player. MENU key is pressed to call the volume menu of an optical disk during a reproduction of a program chain. Ten keys are used for a chapter jump in a film or for selecting songs. The up/down/left/right cursor keys are used to select an item in the menu. ENTER key is used to determine a selected item. An item including a cursor is displayed with the selection color; an item determined by ENTER key is displayed with the determination color. The remote controller also includes keys such as PLAYBACK, STOP, PAUSE, FORWARD BIND, and BACKWARD BIND which are generally set in AV players.

(2.2) Construction Element of the Disk Reproduction Apparatus

Figure 24:
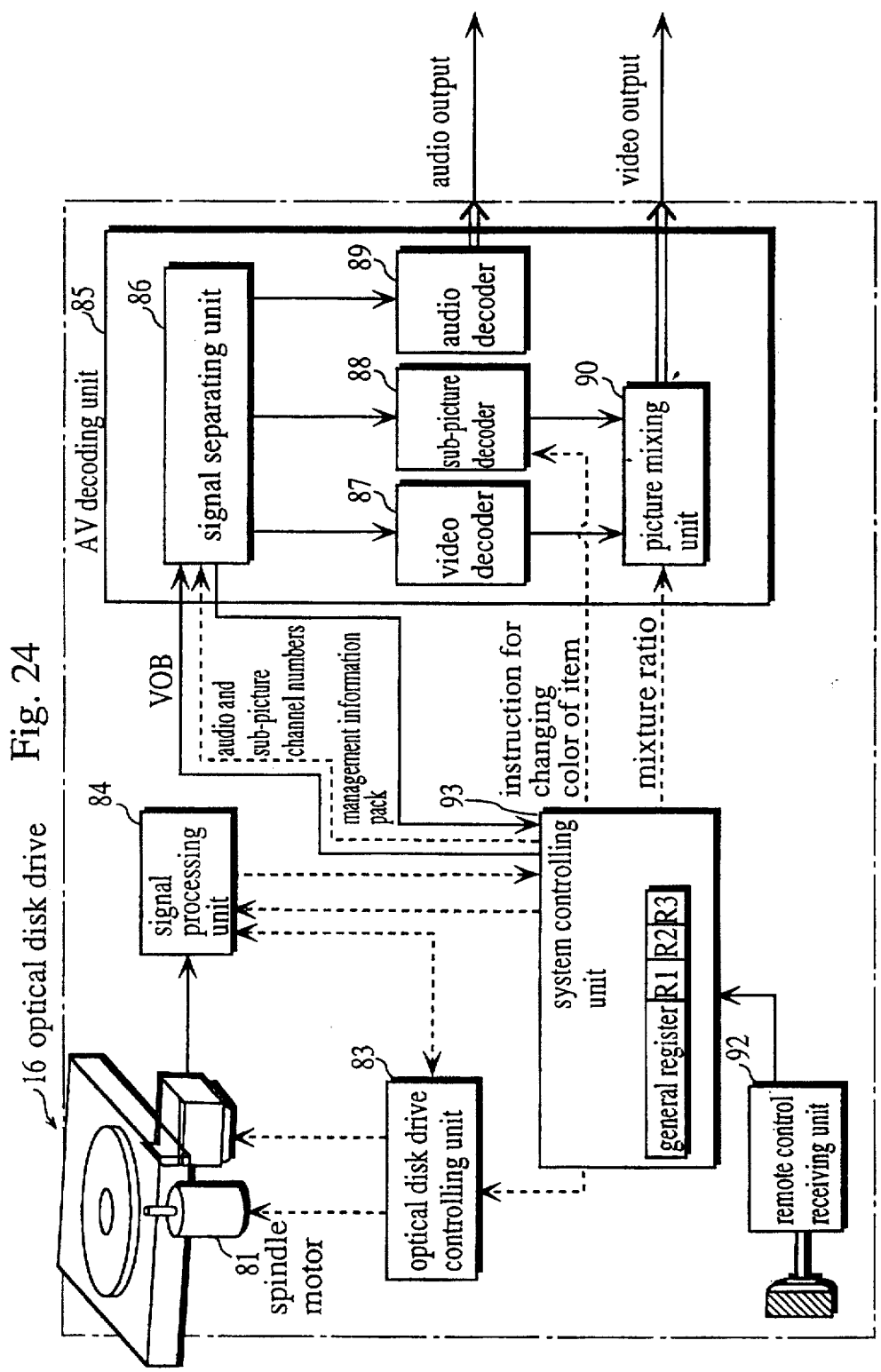
FIG. 24 is a block diagram showing the construction of DVD player 1 used in the present embodiment.

FIG. 24 is a block diagram showing the construction of the DVD player used in the present embodiment. The DVD player includes optical disk drive 16, optical pickup 82, optical disk drive controlling unit 83, signal processing unit 84, AV decoding unit 85, remote control receiving unit 92, and system controlling unit 93. AV decoding unit 85 comprises signal separating unit 86, video decoder 87, sub-picture decoder 88, audio decoder 89, and picture mixing unit 90.

Optical disk drive 16 comprises a board on which an optical disk is placed and spindle motor 81 for rotating the set optical disk. The board moves in and out of the cubic space by means of an eject mechanism which is not shown in the drawing. The user places an optical disk on the board ejected outside the DVD player. Then, the board moves into the DVD player, loading the optical disk.

Optical disk drive controlling unit 83 controls optical pickup 82 and optical disk drive 16 including spindle motor 81. Specifically, optical disk drive controlling unit 83 adjusts the motor speed according to a track position specified by system controlling unit 93, moves optical pickup 82 by controlling the actuator of the pickup, then after a correct track is detected by servo control, waits for a desired physical sector and reads signals continuously starting from desired position.

Signal processing unit 84 converts the signals read through optical pickup 82 into digital data by processing the signals with amplification, waveform shaping, conversion to binary, demodulation, error correction, etc., then stores the processed data in buffer memory 94 (described later) in system controlling unit 93 in units of logical blocks.

AV decoding unit 85 converts VOBs of digital data into the video signals and audio signals.

Signal separating unit 86 receives the digital data transferred from the buffer memory in units of logical blocks (packets), and classifies the data into the management information data, moving picture data, sub-picture data, and audio data by identifying the stream ID and sub-stream ID of each packet. Signal separating unit 86 outputs the moving picture data to video decoder 87. Signal separating unit 86 outputs the management information pack to system controlling unit 93. System controlling unit 93 sends a channel number for each of the audio material and the sub-title material to signal separating unit 86. Signal separating unit 86 outputs the audio data of the specified channel to audio decoder 89; sub-picture data of the specified channel to sub-picture decoder 88. The audio and sub-picture materials of other channels are discarded.

(2.2.1) Construction Element of the Disk Reproduction Apparatus . . . Construction of Signal Separating Unit 86

Figure 25:
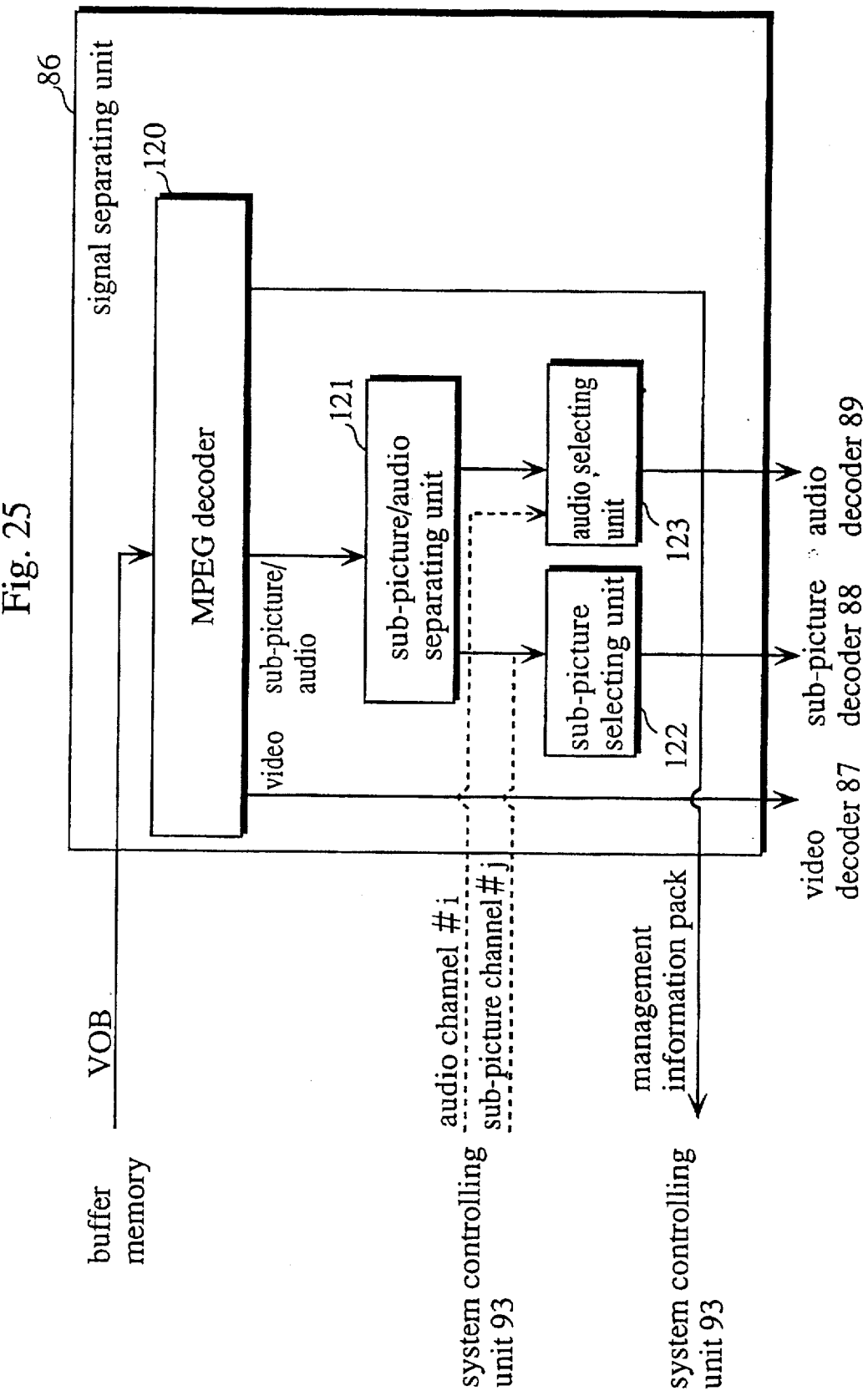
FIG. 25 is a block diagram showing the construction of signal separating unit 86.

FIG. 25 is a block diagram showing the construction of signal separating unit 86. As shown in the drawing, signal separating unit 86 comprises MPEG decoder 120, sub-picture/audio separating unit 121, sub-picture selecting unit 122, and audio selecting unit 123.

MPEG decoder 120 determines the types of packs transferred from the buffer memory by checking the stream IDs, and outputs the packets as follows: if the stream ID is "1110 0000," MPEG decoder 120 outputs the packet to video decoder 87; "1011 1101," to sub-picture/audio separating unit 121; "1011 1111," to system controlling unit 93.

Sub-picture/audio separating unit 121 outputs the packets input from MPEG decoder 120 to sub-picture selecting unit 122 if their sub-stream ID is 001* **; to audio selecting unit 123 if "1010 0*." As a result, each the sub-picture data and audio data is output to any of sub-picture selecting unit 122 and audio selecting unit 123.

Sub-picture selecting unit 122 outputs the sub-picture data of the channel number specified by system controlling unit 93 to sub-picture decoder 88, and discards the rest of the sub-picture data. Suppose, in FIGS. 6A–6D, sub-picture materials for channels A and B are respectively English and French subtitles. Then, if channel A is specified, sub-picture selecting unit 122 outputs the sub-picture data of channel A to sub-picture decoder 88, and sub-picture decoder 88 decodes only English subtitles.

Audio selecting unit 123 outputs the audio data of the channel number specified by system controlling unit 93 to audio decoder 89, and discards the rest of the audio data. Suppose, in FIGS. 6A–6D, audio materials for channels A, B, and C are respectively English, French, and Japanese. Then, if channel A is specified, audio selecting unit 123 outputs the audio data of channel A to audio decoder 89, and audio decoder 89 decodes only English audio data.

Video decoder 87 decodes and extends the moving picture data sent from signal separating unit 86 and outputs the data to picture mixing unit 90 as digital video signals.

Sub-picture decoder 88 decodes and extends the sub-picture data sent from signal separating unit 86 if the sub-picture data is image data compressed with run length compression, and outputs the sub-picture data to picture mixing unit 90 in the same format as video signals. Here, the color palette of the image data can be changed by an instruction from system controlling unit 93. Therefore, if the image data is provided with a plurality of items and the user moves the cursor between these items, system controlling 93 instructs sub-picture decoder 88 to change the color palette (or change the color) of the image data. This instruction for changing color is output based on the item color number recorded in the Highlight Information. According to the instruction, the item changes its color to the selection color or the determination color. The selection color indicates the position of the cursor.

The description of the construction of DVD decoder 1 continues with reference to FIG. 24. Audio decoder 89 decodes and extends the audio data sent from signal separating unit 86, and outputs digital audio signals.

Picture mixing unit 90 outputs picture signals after mixing the outputs from video decoder 87 and sub-picture decoder 88 according to the ratio specified by system controlling unit 93. The mixture ratio is determined based on the contrast described in the item color information in the Highlight Information. The mixture ration can be changed per GOP. The picture signals are converted to NTSC (National Television System Committee) Video Signals.

(2.2.2) Construction Element of the Disk Reproduction Apparatus . . . Construction of System Controlling Unit 93

Figure 26:
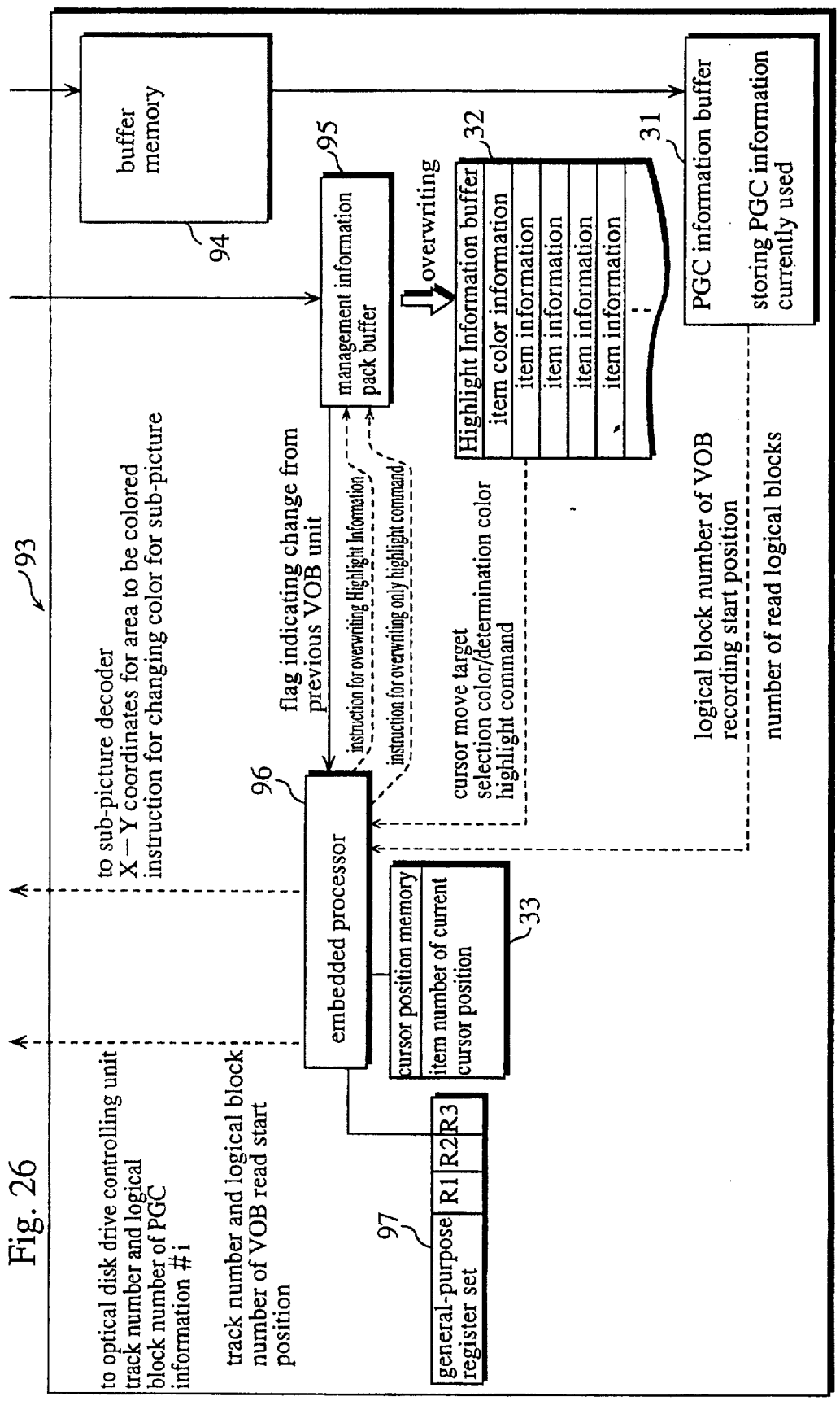
FIG. 26 is a block diagram showing the construction of system controlling unit 93.

System controlling unit 93 controls entire DVD player 1, and is constructed as shown in FIG. 26. System controlling unit 93 includes buffer memory 94, management information pack buffer 95, embedded processor 96, general-purpose register set 97, PGC information buffer 31, Highlight Information buffer 32, and cursor position memory 33.

Embedded processor 96 includes a ROM, a work memory, and a CPU. The CPU includes a fetching unit for sequentially fetching SET commands and BRANCH commands from Highlight Information buffer 32, a command buffer for storing the fetched SET commands and BRANCH commands, a decoding unit for decoding operation codes and operands stored in the command buffer, a calculator for performing operations specified in the operation codes by using the values stored in general-purpose registers and immediate values stored in the instruction buffer, and buses for transferring the operation results and immediate values specified in operands to general-purpose registers.

Buffer memory 94 stores data which has been processed with amplification, waveform shaping, conversion to binary, demodulation, error correction, etc. From buffer memory 94, system controlling unit 93 transfers the Video Title Set management information to another buffer which is not shown in the drawing; VOBs to signal separating unit 86 in units of packs. Signal separating unit 86 sends back the management information pack to system controlling unit 93.

Management information pack buffer 95 stores the management information pack sent back from signal separating unit 86.

Embedded processor 96 instructs management information pack buffer 95 to overwrite the Highlight Information or only the highlight command stored in Highlight Information buffer 32 by referring to a flag indicating a change from the previous VOB unit, the flag being included in the highlight general information in the stored management information pack.

General-purpose register set 97 includes general-purpose register and general-purpose timer which can be used by the software title creator.

PGC information buffer 31 stores the PGC information currently selected.

Highlight Information buffer 32 is a buffer whose area is divided into a plurality of small areas. Highlight Information buffer 32 stores the Highlight Information with the format shown in FIG. 10B. Embedded processor 96 reads the cursor position, selection color, determination color, and highlight command from Highlight Information buffer 32. The Highlight Information stored in Highlight Information buffer 32 is overwritten by the Highlight Information stored in management information pack buffer 95 according to the instruction by embedded processor 96. That is, only the Highlight Information necessary for the section currently reproduced by the system stream is stored in Highlight Information buffer 32 though a considerable number of management information packs are interleaved in the system stream.

Cursor position memory 33 stores the item number of the item where the cursor stays. Cursor position memory 33, which is one of system registers, is not shown in the drawings since it is not directly related to the present invention.

The other system registers store the currently effective title number, PGC number, audio channel (audio sub-stream number), and sub-picture channel (sub-picture sub-stream number).

(2.3.1) Operation of System Controlling Unit 93 (General Operation)

Figure 27A:
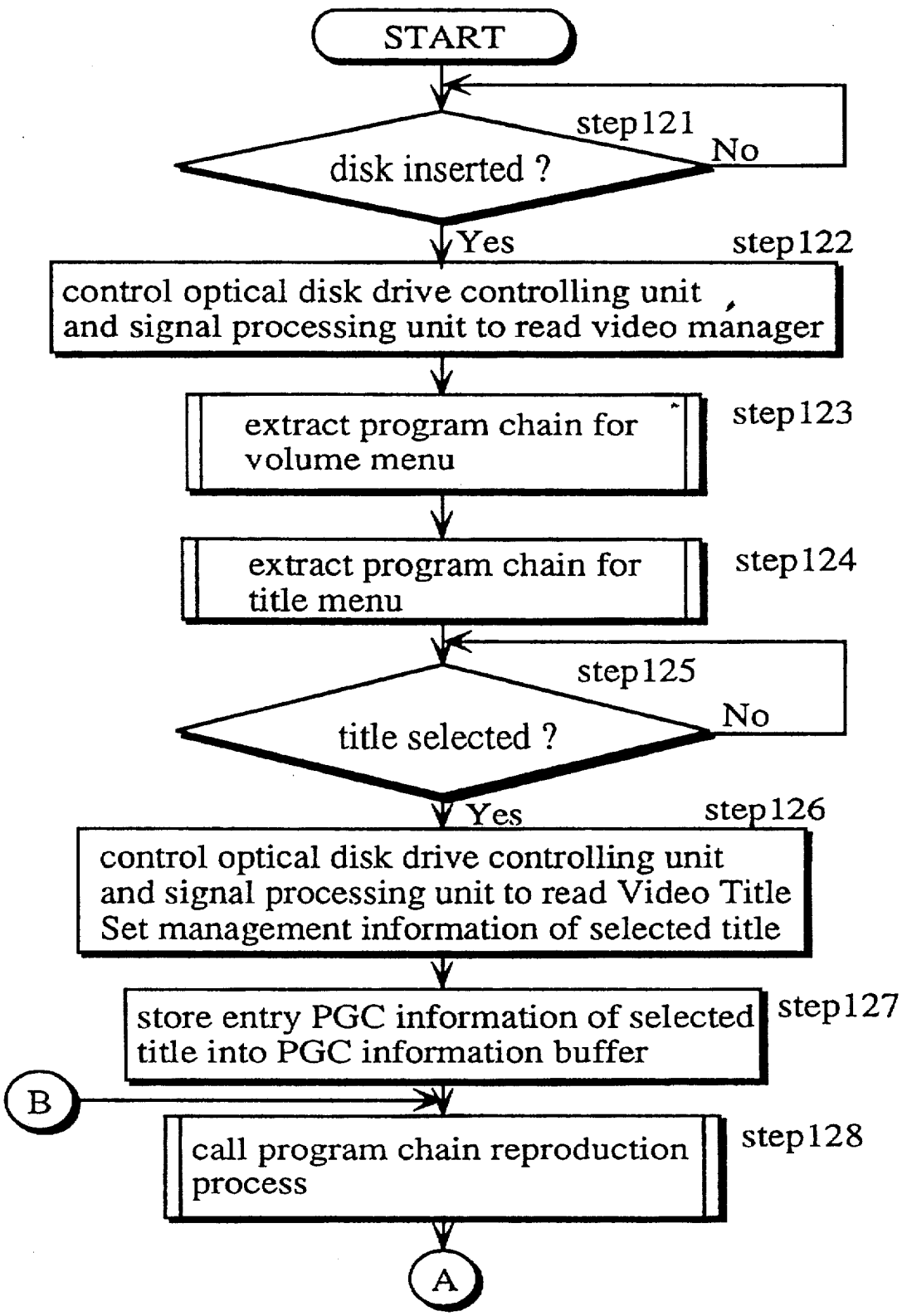
FIGS. 27A and 27B show a main flowchart showing the process steps of system controlling unit 93.
Figure 27B:
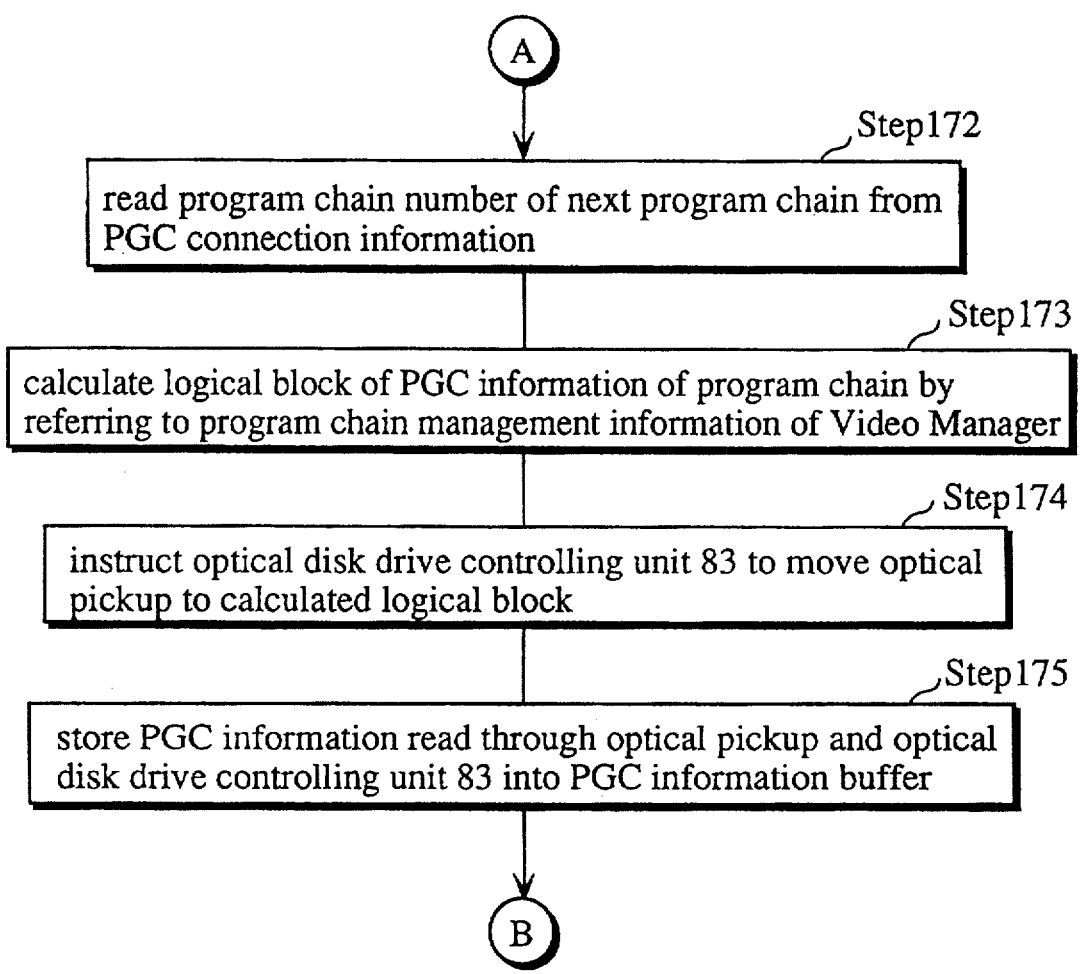

Now, the operation of DVD player 1 is described with reference to FIGS. 27A and 27B. FIGS. 27A and 27B show a flowchart showing the process steps of system controlling unit 93.

For inserting an optical disk, the user presses the eject button on the front side of DVD player 1 and places the optical disk on the ejected board. Then, the board, with the optical disk on itself, moves into the DVD player and the optical disk loads into the DVD player.

At step 121, system controlling unit 93 is in a wait state judging whether an optical disk has been inserted. On receiving notification from an optical sensor that an optical disk has been inserted, system controlling unit 93 controls optical disk drive controlling unit 83 and signal processing unit 84 so that the rotation of the disk is controlled while optical pickup 82 is placed in the lead-in area. The disk rotation is stabilized while optical pickup 82 is placed in the lead-in area. After the rotation is stabilized, the optical pickup is moved from the lead-in area toward the circumference and the volume management area is read. Then, according to the information read from the volume management area, a Video Manager is read (step 122). System controlling unit 93 calculates the address of the program chain of the volume menu by referring to the menu program chain management information in the Video Manager, then reproduces the program chain and stores it in PGC information buffer 31. Then, system controlling unit 93 refers to the PGC information stored in the buffer and recognizes the VOB to be reproduced and calculates its address. System controlling unit 93 outputs control signals to optical disk drive controlling unit 83 and signal processing unit 84. Then the VOB is fetched from the optical disk and reproduced, displaying the volume menu as shown in FIG. 33 on TV monitor 2 (step 123).

If the user selects an item in the menu and performs the determination operation for the item, system controlling unit 93 executes the command "PlayTitle" specifying the title number which is set as a highlight command corresponding to the title (step 125). The operation of system controlling unit 93 in item selection/determination is described in detail in the succeeding section.

The command "PlayTitle" instructs system controlling unit 93 to refer to the title search pointer table of the Video Manager to determine the Video Title Set (VTS) and the VTS title number. Then, system controlling unit 93 outputs control signals to optical disk drive controlling unit 83 and signal processing unit 84, reproduces the Video Title Set management information of the determined video title, and fetches the Video Title Set unit title search pointer table of this information (step 126).

System controlling unit 93 determines the PGC information of the first program chain in the title by referring to the fetched Video Title Set unit title search pointer table. Then, system controlling unit 93 outputs control signals to optical disk drive controlling unit 83 and signal processing unit 84, reproduces the determined PGC information, and stores the information in PGC information buffer 31. The PGC information of the volume menu is overwritten by the PGC information. System controlling unit 93 determines the video object to be reproduced and its address by referring to the stored PGC information, outputs control signals to optical disk drive controlling unit 83 and signal processing unit 84, and reproduces the determined video object.

After this, system controlling unit 93 determines and reproduces video objects in order according to the stored PGC information. System controlling unit 93 determines the next PGC information by referring to the PGC connection information of the current PGC information when it completes reproducing the last video object specified in the current PGC information. Then, system controlling unit 93 discards the current PGC information and stores the next PGC information to continue the reproduction (step 128).

Note that DVD player 1 has a key for selecting an audio channel and a sub-picture channel though the key is not shown in the drawing. The audio channel and the sub-picture channel selected by the user are stored in system registers (not shown in the drawings). When the video object is reproduced, system controlling unit 93 refers to the system registers to determine the effective channels and informs the channels to AV decoding unit 85 by outputting the control signals. As a result, only an effective audio channel and a sub-picture channel provides data to be output together with the moving picture data.

Now, the navigation control operation is described. The navigation control operation is the reproduction control operation with route level and GOP level performed for each program chain.

(2.3.2.1) Operation Example 1 . . . Reproduction Control with Route Level by System Controlling Unit 93

The entry program chain of "detective story game" corresponds to PGC information #3 as shown in FIG. 17. The VOB address information table of PGC information #3 specifies VOB#3. The reproduction control with reference to FIGS. 17 and 18 has already been described. Now, the software control performed by system controlling unit 93 based on the reproduction control is described as Operation Example 1, with reference to the flowcharts of FIGS. 28–31.

As program chain #3 is selected, system controlling unit 93 performs the pre-processing, that is, the reproduction control with the route level. The pre-processing corresponds to steps 130–131 in the flowchart of FIG. 28. Step 131 is repeated for each pre-processing command in the PGC command table. At step 131, embedded processor 96 fetches a pre-pre-processing command by referring to the pre-processing command start address pointer. As shown in FIG. 17, the pre-processing command described in the pre-processing command field is a SET command, "SetReg R1,0," immediate value "0" is transferred to general-purpose register R1.

After the pre-processing for program chain #3 completes, the reproduction control with the GOP level is performed.

(2.3.2.2) <Operation Example 1> Reading and Decoding of VOBs by System Controlling Unit 93

VOBs are read and decoded at steps 132–139. These steps are repeated for each VOB corresponding to the VOB address information described in the VOB address information table.

At step 133, the VOB address information of VOB#3 is read from program chain buffer 31. In FIG. 17, the VOB address information is indicated by reference a305.

At step 134, a track corresponding to the logical block to be read next is calculated based on the VOB data offset written in the VOB address information. The track position is informed to optical disk drive controlling unit 83, and optical pickup is moved to the recording start position. Then, optical disk drive controlling unit 83 is instructed to control reading. It is supposed here that logical block #k is to be read next.

When the above step is executed, the optical pickup moves to the start position of a VOB, as indicated by reference y401 in FIG. 13, even if the optical pickup is currently at a remote Video Manager. At step 136, data recorded in logical block #k is read through the optical pickup and signal processing unit 84.

Video, audio, and sub-picture packs are read sequentially under control of optical disk drive controlling unit 83. Signal processing unit 84 converts the signals read through optical pickup 82 into digital data by processing the signals with amplification, waveform shaping, conversion to binary, demodulation, error correction, etc., then stores the processed data in buffer memory 94 in system controlling unit 93 in units of logical blocks. Signal separating unit 86 receives the packs transferred from the buffer memory, and identifies the stream ID and sub-stream ID of each packet.

The packs with stream ID "1110 0000" are output to video decoder 87. Video decoder 87 performs intra decoding and in-field decoding for I-pictures, B-pictures, and P-pictures included in the moving picture data, and performs the motion compensation to generate the picture signals. Video decoder 87 sets the standard clock based on the SCR and waits for the standard clock to show the time described in the PTS, then outputs the picture signals to picture mixing unit 90.

The packs with stream ID "1011 1101" and sub-stream ID "001* ****" are output to sub-picture decoder 88. Sub-picture decoder 88 performs run-length decoding. Sub-picture decoder 88 sets the standard clock based on the SCR and waits for the standard clock to show the time described in the PTS, then outputs the decoding results to picture mixing unit 90.

Picture mixing unit 90 mixes the outputs from video decoder 87 and sub-picture decoder 88 according to the ratio specified by system controlling unit 93. The picture signals are converted to analog signals, then input to TV monitor 2.

Through the above steps, TV monitor 2 displays images as shown in FIG. 18. The menu image of sub-picture SP A-101 is displayed with display images of video pack #201 at the same timing as shown in FIG. 19A.

(2.3.2.3) <Operation Example 1> Updating of Highlight Information by System Controlling Unit 93 (GOP level)

AV decoding unit 85 separates management information pack 101 shown in FIG. 19A. The process for receiving this management information pack 101 by system controlling unit 93 is described with reference to the flowchart of FIG. 29. This flowchart is a detailed step 137 in FIG. 28.

At step 142, PCI general information, synchronous information, and trick-play information are decoded, then the decoded results are executed. At step 143, the flag indicating a change from the previous VOB unit is read from the highlight general information in management information pack 101. At step 144, it is judged whether the flag is "11." Management information pack 101 includes the Highlight Information for sub-picture data 101 and the flag is set as "01." Therefore, at step 144, it is judged as "No." Control goes to step 147.

At step 147, it is judged whether the flag is "01." It is judged that the flag is "01" since management information pack 125 stores "01." Control goes to step 148. At step 148, the Highlight Information is written in Highlight Information buffer 32.

Then, at step 146, an item number is set in cursor position memory 33. As shown in FIG. 19A, item information m101 and m102, respectively corresponding to "Yes" and "No," respectively have item numbers #1 and #2. Item number #1 is set in cursor position memory 33, and control goes to step 149.

At step 149, the item number of the item where the cursor currently stays is read. At step 150, an area specified with start coordinates (X1, Y1) and end coordinates (X2, Y2) for item information m101 with item number #1 is read. Then, sub-picture decoder 88 is instructed to paint the area with the selection color. Then, the area for item "Yes" is painted with the selection color on the screen.

If it is judged that the flag indicating a change from the previous VOB unit is "11" at step 144, the received highlight command is used to overwrite Highlight Information buffer 32 at step 145. After the overwriting, an item number is set in cursor position memory 33.

The logical blocks are kept to be read and the images are displayed on the screen after the item is painted with the selection color.

(2.3.2.4) <Operation Example 1> Cursor Control for Menus

Suppose the user presses the right cursor key with a thumb, holding the remote controller with his/her right hand, somewhat bewildered by the question that has suddenly appeared on the screen. The process following the operation on the remote controller is described below with reference to FIG. 30.

Figure 30:
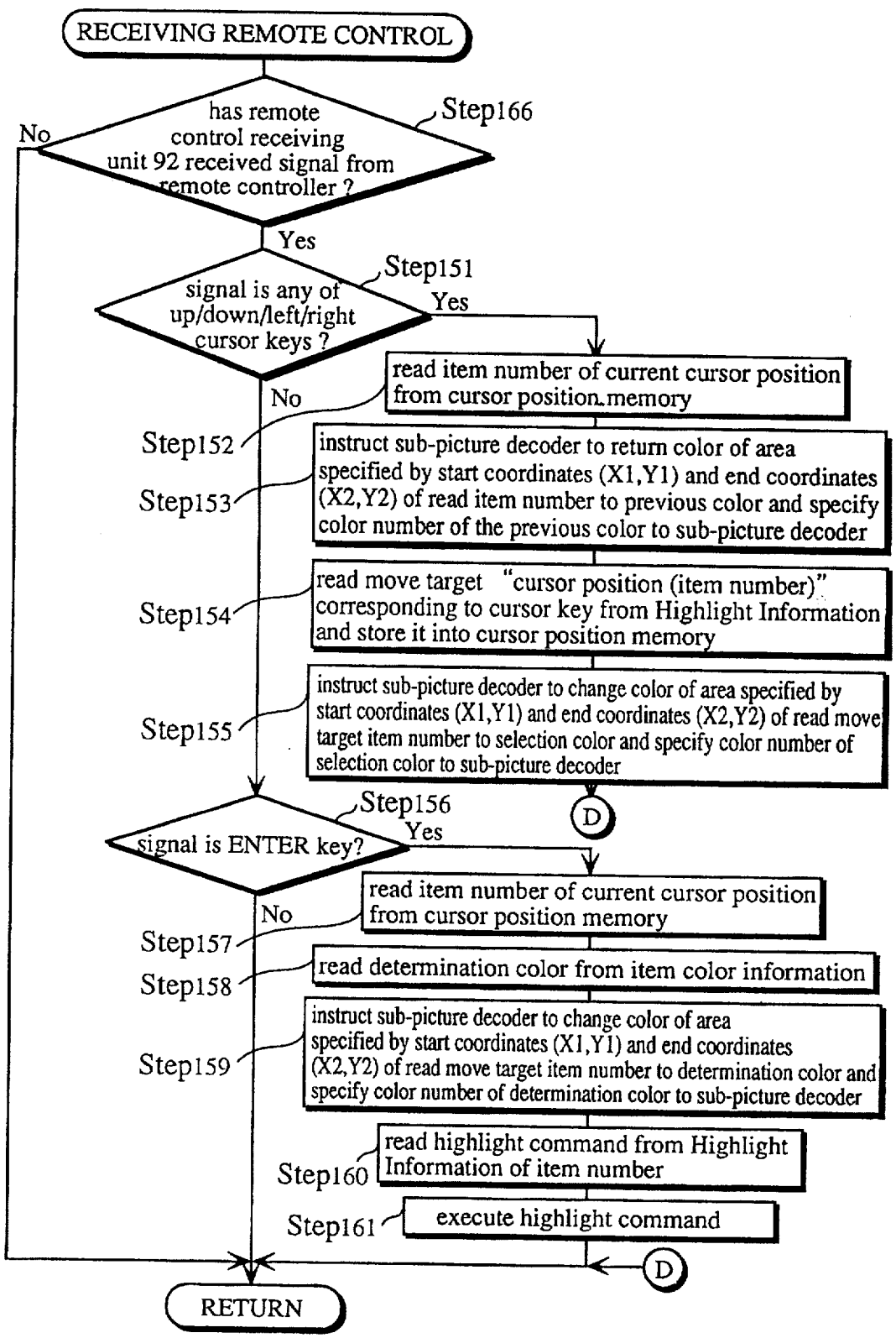
FIG. 30 is a flowchart of receiving signals from the remote controller.

FIG. 30 is a detailed flowchart of step 138 shown in FIG. 28.

At step 166, remote control receiving unit 92 judges whether a signal has been received from the remote controller. Since the input signal by the above remote controller operation has been received, control moves to step 151.

At step 151, it is judged whether any of the up/down/left/right cursor keys has been pressed. In this case, since the right cursor key has been pressed, control goes to step 152. At step 152, item number #1 set in cursor position memory 33 is read. At step 153, start coordinates (X1, Y1) and end coordinates (X2, Y2) of item information m101 with item number #1 is read. Then, sub-picture decoder 88 receives a color number so that it can change the color of the area to the former color. After this process, the color of item "Yes" in FIG. 34 returns to the original color.

At step 154, the move destination item number corresponding to the right cursor key is read from Highlight Information m101, and the number is stored in cursor position memory 33. Then, item number #2 for item "No" is set in cursor position memory 33, and control moves to step 155.

At step 155, start coordinates (X1, Y1) and end coordinates (X2, Y2) of item information m102 with item number #2 is read. Then, sub-picture decoder 88 receives a color number so that it can change the color of the area to the selection color. After this process, the color of item "No" is painted with the selection color, and the cursor moves from item "Yes" to item "No."

(2.3.2.5) <Operation Example 1> . . . Determination Operation for Menus

Suppose the user finally selects and determines item "Yes" after remembering previous scenes. That means at step 151, it is judged as "no," and control moves to step 156.

At step 156, it is judged whether ENTER key has been pressed. Since the judgement is "yes," the item number of the item where the cursor currently stays is read from cursor position memory 33 at step 157. At step 158, the determination color is read from the item color information. At step 159, sub-picture decoder 88 receives the color number of the determination color so that it can change an area specified with start coordinates (X1, Y1) and end coordinates (X2, Y2) for the item the cursor currently stays to the determination color.

At step 160, a highlight command, the set register command "SetReg R1,1,+" is read from Highlight Information #101 corresponding to item "Yes." System controlling unit 93 adds "1" to the value stored in general-purpose register R1 specified by the command.

Suppose the above processing is also performed for the second menu, and that the user determines item "Yes" twice. Then, the value in a general-purpose register is added twice, and the general-purpose register stores "2."

Note that if the numeral keys are used instead of the cursor keys, items corresponding to the item information numbers are read, and the commands written in the highlight command fields of the items are executed.

After the second menu is displayed, steps 133 to 138 are repeated. VOBs are sequentially reproduced in order written in the program chain. This processing is repeated until the last VOB address information is read.

(2.3.2.6) Operation Example 1 . . . Post-Processing by System Controlling Unit 93

The reproduction control moves from the GOP level to the route level after the VOB of program chain #3 is reproduced. Here, the route level is the post-processing. The post-processing is performed at steps 140–141. Step 141, which is described below, is repeated for each post-processing command written in the PGC command table.

Embedded processor 96 fetches BRANCH command "CmpRegLink R1,2,=,PGC5," which is written in the first row of the post-processing command start address pointer as shown in FIG. 17. Then, embedded processor decodes the command and judges whether general-purpose register R1 stores "2." Since the register stores the value, the current program chain branches to program chain #5.

Figure 31:
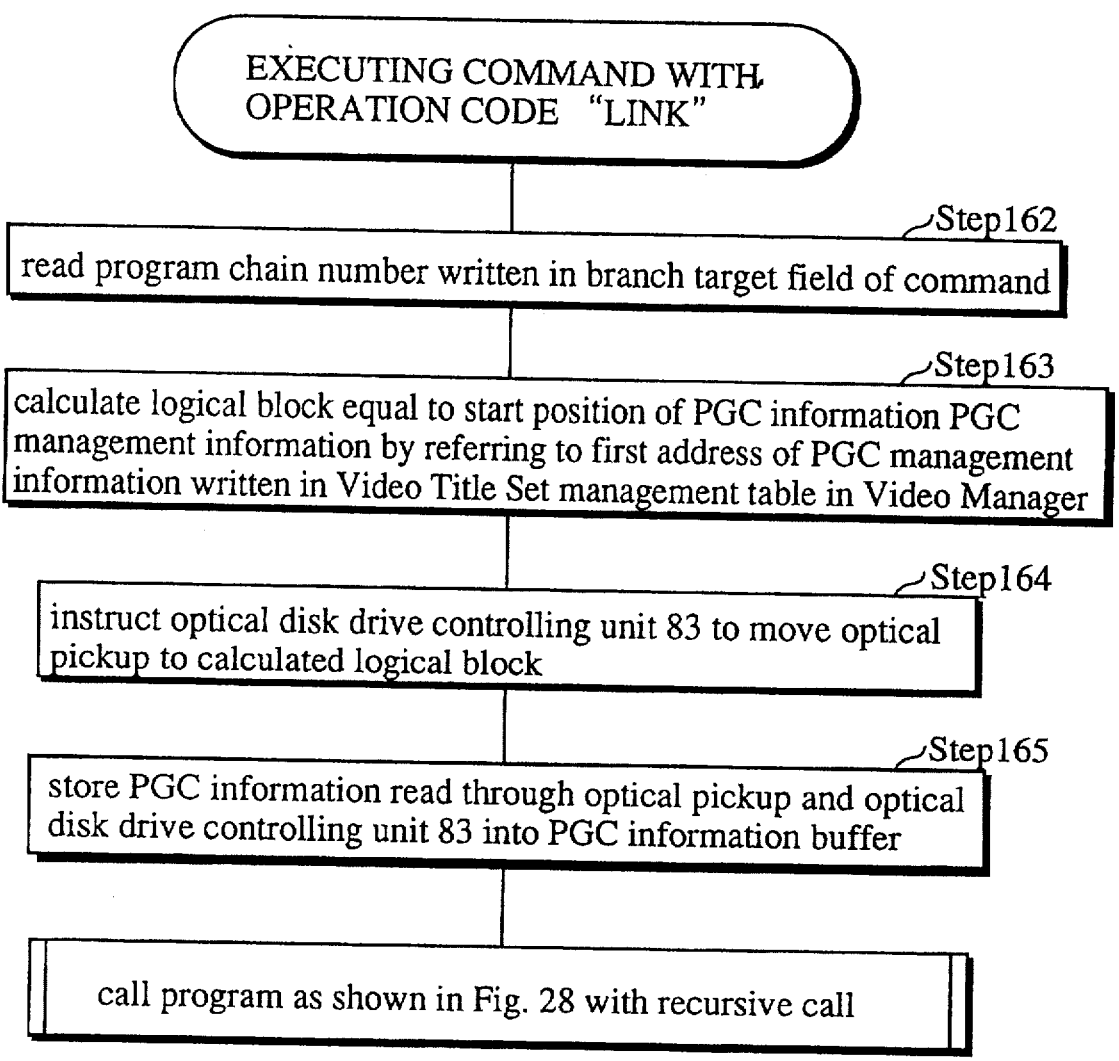
FIG. 31 shows a flowchart of a process executed by BRANCH commands.

Now, branches to program chains are described with reference to FIG. 31. FIG. 31 shows a flowchart of a process executed by BRANCH commands.

At step 162, a program chain number written in the branch target field of the command is read. At step 163, the logical block equal to the start position of PGC information #5 in the PGC management information is calculated by referring to the first address of the PGC management information written in the Video Title Set management table in the Video Manager. At step 164, optical disk drive controlling unit 83 moves the optical pickup to the calculated logical block. At step 165, PGC information #5 read from the logical block through optical pickup 82 and optical disk drive controlling unit 83 is stored in PGC information buffer 31. The PGC information is processed as shown in the flowchart of FIG. 28.

In this way, the PGC information corresponding to the branch target written in the BRANCH command shown in FIG. 33 is selectively stored in PGC information buffer 31. A VOB, which is a branch target of the multi-branch by the post-processing and specified by program chain #5, includes an action pattern among three kinds of the moving picture data shown in FIG. 21. In this way, an action pattern of the character is selectively displayed on the screen by determining items in two menus shown in FIG. 20 and by the multi-branch of the post-processing. As a result, seeing the change in the action of the character, the user would feel his/her responses to the questions in the menus have influenced and changed the character.

Now, a branch according to connection information when the branch with the post-processing is not performed is described below though this is not directly related to Operation Example 1. The flowchart of FIG. 27B shows the branch processing with route level. After the post-processing is executed at steps 140 and 141 of FIG. 28, control moves to step 172 of FIG. 27B. At step 172, system controlling unit 93 reads the program chain number of the next program chain (#5) from the PGC connection information. At step 173, system controlling unit 93 calculates the logical block of the PGC information of the next program chain by referring to the program chain management information of the Video Manager. At step 174, system controlling unit 93 instructs optical disk drive controlling unit 83 to move the optical pickup to the calculated logical block. At step 175, system controlling unit 93 stores PGC information #5, which is read through optical pickup 82 and optical disk drive controlling unit 83, in PGC information buffer 31. Then, control moves to the first step of the flowchart as shown in FIG. 28 and the program chain is reproduced according to the newly stored PGC information.

Figure 34A:
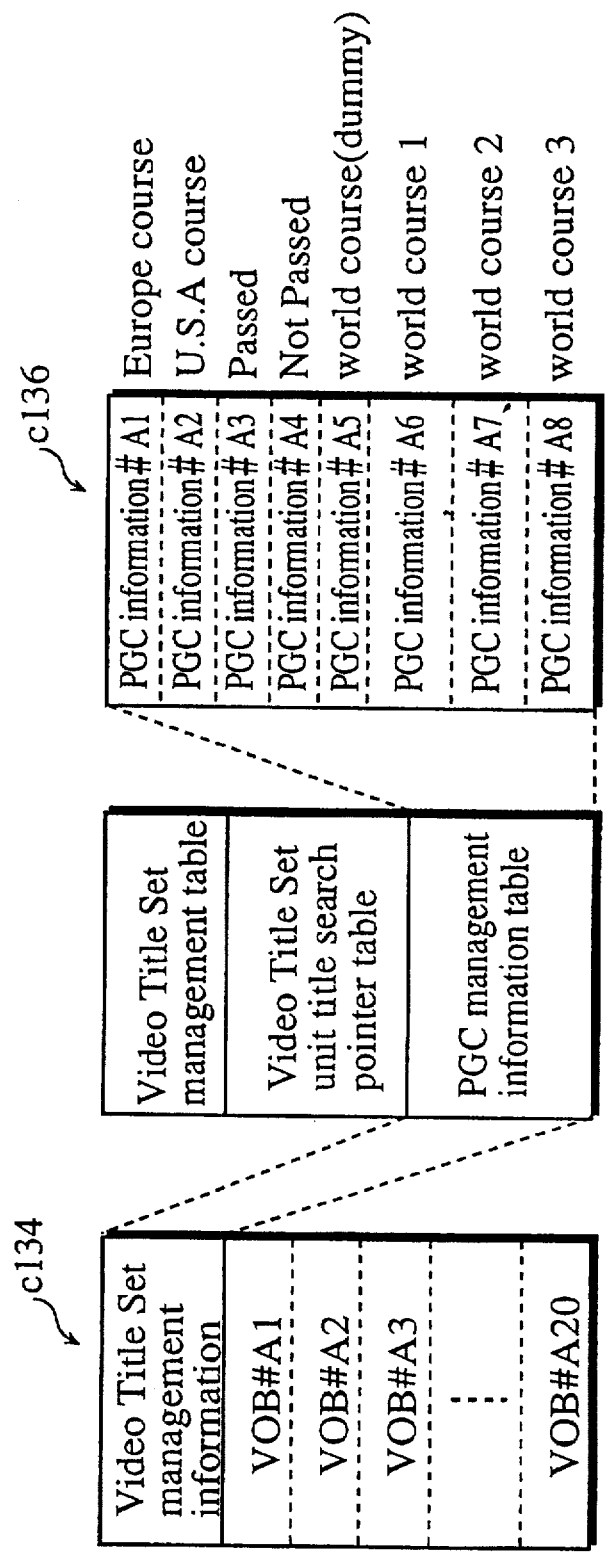
FIG. 34A shows the description in the Video Title Set management information for "round-the-world quiz."
Figure 35:
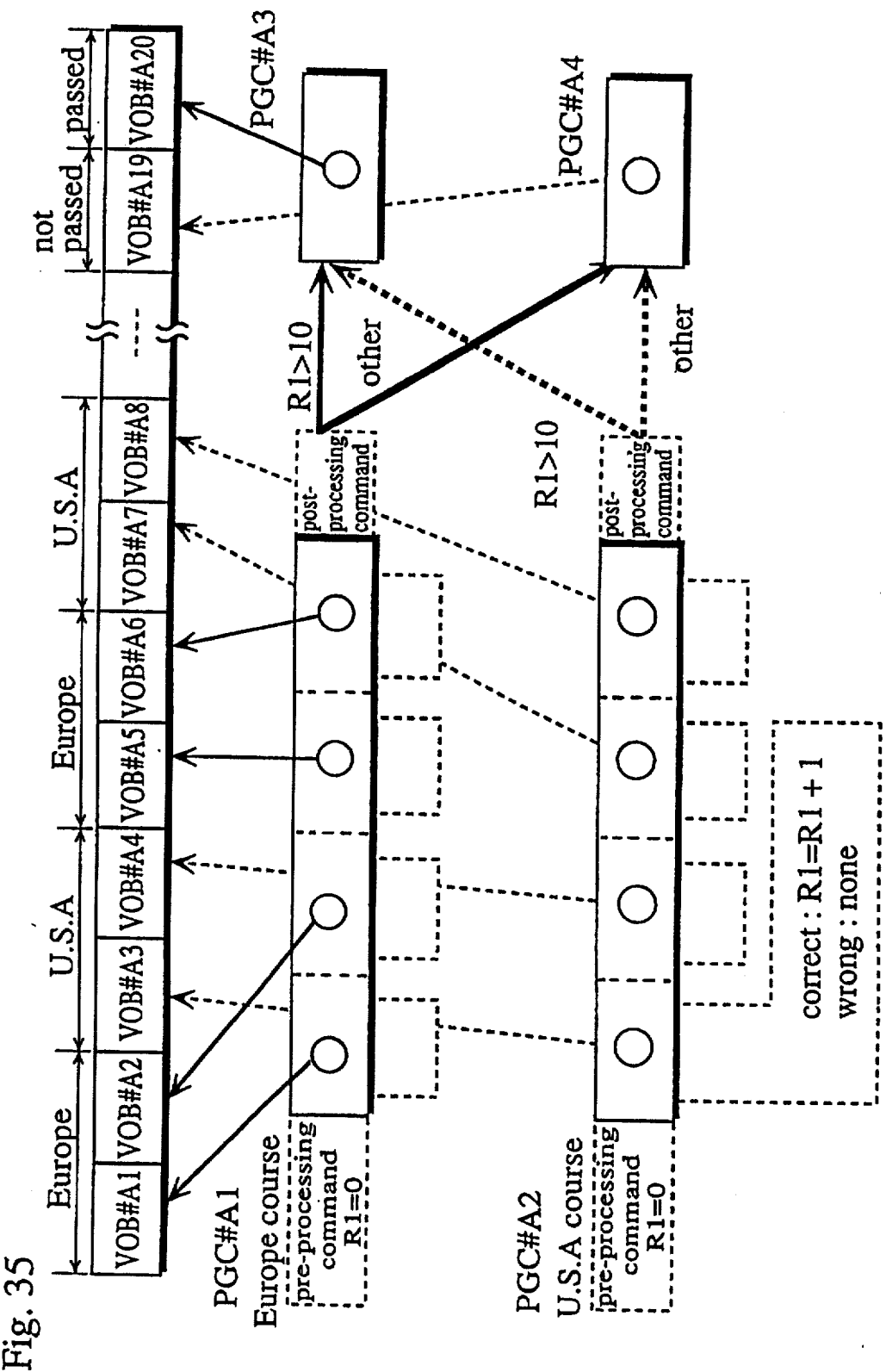
FIG. 35 shows a relation between PGC information #A1 and #A2 and VOBs.

FIG. 35 shows VOBs specified by the VOB address information of PGC information #A1 and #A2 indicated by reference c136 in FIG. 34 and PGC information specified by the post-processing of the VOBs. The black circles indicate VOB address information. The arrows indicate that the VOB address information of PGC information #A1 specifies the VOBs.

The broken line arrows indicate that the VOB address information of PGC information #A2 specifies the VOBs.

The two arrows that extend from the post-processing command of PGC information #A1 and #A2 indicate that the PGC information branches to any of the two branch targets according to the values stored in a general-purpose register.

(2.3.3) Operation Example 2

In Operation Example 2, it is supposed that the user selects "Europe course" of "round-the-world quiz" in the volume menu as shown in FIG. 33.

FIG. 34A shows the construction of Video Title Set "round-the-world quiz." As indicated by reference c134 in the drawing, the Video Title Set includes 20 VOBs, namely, VOB#A1–VOB#A20. Also, as indicated by reference c136, the PGC management information table of the Video Title Set management information of the Video Title Set includes eight program chains, namely, PGC information #A1-#A8, each representing a reproduction order of VOB#A1-VOB#A20. PGC information #A1 is the first program chain reproduced in "Europe course" of "round-the-world quiz."

FIG. 34B shows the contents of the reproduction control by PGC information #A1. Also, FIG. 34C shows the contents of the reproduction control by PGC information #A5.

As shown in FIG. 34B, the VOB address information table of PGC information #A1 includes the VOB address information on VOB#A1, VOB#A2, VOB#A5, and VOB#A6. That means, the disk reproduction apparatus reproduces these VOBs in the written order. Since PGC information #A1 stores command "SetReg R1,0" as a pre-processing command, the disk reproduction apparatus initializes register R1 by immediate value "0" before reproducing the VOBs according to PGC information #A1. Also, since PGC information #A1 stores command "CmpRegLink R1,10,>,PGC#A3" as a post-processing command, the disk reproduction apparatus, after completing the reproduction of the above VOBs, branches to PGC information #A3 if the value in register R1 is greater than immediate value "10." Since the PGC connection information specifies PGC information #A4 as the next program chain, the disk reproduction apparatus branches to PGC information #A4 if the execution of the post-processing command does not specify a branch target. PGC information #A3 for reproducing an image representing "not passed" and #A4 for "passed" are exclusively executed according to the points the user obtains through the quiz.

Each of VOB#A1, VOB#A2, VOB#A5, and VOB#A6 to be reproduced according to PGC information #A1 includes 4–5 questions concerning Europe. Here, VOB#A1 is closely looked at.

Figure 36:
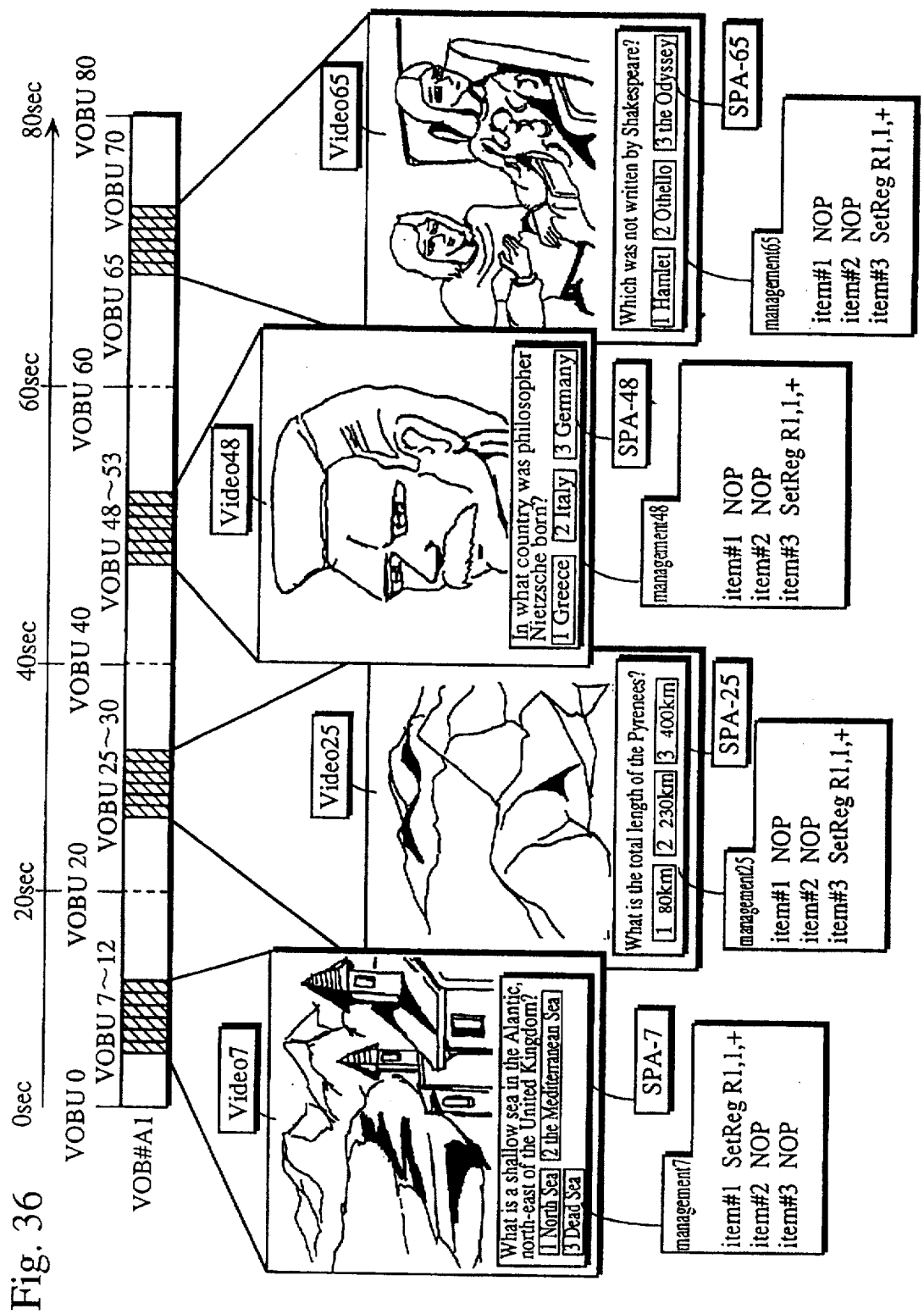
FIG. 36 shows the contents of VOBs for "round-the-world quiz."

FIG. 36 shows the contents of VOB#A1. The first VOBU (VOBU#0) to VOBU#20 correspond to the first question reproduced for about 20 seconds and include a shot of European coasts filmed from an airplane. Among the VOBUs, VOBU#7 to VOBU#12 (shaded portions) include a menu image reproduced for five to six seconds in which a question is given and answered. An image of VOBU#7 including a menu is shown in the drawing. VOBU#7 includes video pack #7, sub-picture pack #7, and management information pack #7. Management information pack #7 includes item information #1-#3. Item information #1-#3 respectively correspond to items #1-#3 in the menu of sub-picture pack 7 (SP A-7). The correct answer for the first question is item 1. Therefore, item information #1 stores command "SetReg R1,1,+" which instructs the disk reproduction apparatus to add immediate value "1" to the value in register R1 used to accumulate the points of the user. The other pieces of the item information store command "NOP" which instructs the apparatus to execute nothing. Each of the five VOBUs following VOBU#7 stores the same highlight command as VOBU#7.

VOBU#21 to VOBU#40 correspond to the second question reproduced for about 20 seconds and include a shot of European sceneries filmed from a train window. Among the VOBUs, VOBU#25 to VOBU#30 (shaded portions) include a menu image reproduced for five to six seconds in which a question is given and answered. An image of VOBU#25 including a menu is shown in the drawing. VOBU#25 includes video pack #25, sub-picture pack #25, and management information pack #25. Management information pack #25 includes item information #1-#3. Item information #1-#3 respectively correspond to items 1–3 in the menu of sub-picture pack #25 (SP A-25). The correct answer for the second question is item 3. Therefore, item information #3 stores command "SetReg R1,1,+" which instructs the disk reproduction apparatus to add immediate value "1" to the value in register R1 used to accumulate the points of the user. The other pieces of the item information store command "NOP" which instructs the apparatus to execute nothing. Each of the five VOBUs following VOBU#25 stores the same highlight command as VOBU#25.

VOBU#41 to VOBU#60 correspond to the third question reproduced for about 20 seconds and include a shot introducing the works of Nietzsche. Among the VOBUs, VOBU#48 to VOBU#53 (shaded portions) include a menu image reproduced for five to six seconds in which a question is given and answered. An image of VOBU#48 including a menu is shown in the drawing. VOBU#48 includes video pack 48, sub-picture pack 48, and management information pack 48. Management information pack 48 includes item information #1-#3. Item information #1-#3 respectively correspond to items 1–3 in the menu of sub-picture pack 48 (SP A-48). The correct answer for the third question is item 3. Therefore, item information #3 stores command "SetReg R1,1,+" which instructs the disk reproduction apparatus to add immediate value "1" to the value in register R1 used to accumulate the points of the user. The other pieces of the item information store command "NOP" which instructs the apparatus to execute nothing. Each of the five VOBUs following VOBU#48 stores the same highlight command as VOBU#48.

VOBU#61 to VOBU#80 correspond to the fourth question reproduced for about 20 seconds and include a shot of digested Shakespearian plays. Among the VOBUs, VOBU#65 to VOBU#70 (shaded portions) include a menu image reproduced for five to six seconds in which a question is given and answered. An image of VOBU#65 including a menu is shown in the drawing. VOBU#65 includes video pack 65, sub-picture pack 65, and management information pack 65. Management information pack 65 includes item information #1-#3. Item information #1-#3 respectively correspond to items 1–3 in the menu of sub-picture pack 65 (SP A-65). The correct answer for the fourth question is item 3. Therefore, item information #3 stores command "SetReg R1,1,+" which instructs the disk reproduction apparatus to add immediate value "1" to the value in register R1 used to accumulate the points of the user. The other pieces of the item information store command "NOP" which instructs the apparatus to execute nothing. Each of the five VOBUs following VOBU#65 stores the same highlight command as VOBU#65.

The operation of system controlling unit 93 for the reproduction of "Europe course" of "round-the-world quiz" is described below. Note that it is supposed that the first PGC information for the title is already stored in PGC information buffer 31 of system controlling unit 93.

(2.3.3.1) Operation Example 2 . . . Pre-Processing by System Controlling Unit 93

As the entry program chain of "Europe course" of "round-the-world quiz" is stored, system controlling unit 93 performs the pre-processing for the reproduction control with the route level. The pre-processing command field stores the set register command, "SetReg R1,0," as in "beginner" of "detective story gave." Embedded processor 96 fetches the command and decodes it, then transfers immediate value "0"

to general-purpose register R1. After the pre-processing for the entry program chain completes, the reproduction control moves from the route level to the GOP level.

(2.3.3.2) Operation Example 2 . . . Reading and Decoding of VOBs by System Controlling Unit 93

Step 136 is executed for each VOB and its logical block according to the VOB address information included in the VOB position table. When VOB#0 to VOB#20 of VOB#A1 are reproduced, the shot of European coasts is displayed on TV monitor 2. The menu of sub-picture pack 7 is superimposed on the image of video pack 7 on the same timing, as shown in FIG. 36.

Suppose the user finally selects and determines item 1 remembering the geography of Europe. That means at step 151 of FIG. 30, it is judged as "No," and control moves to step 156. At step 156, it is judged whether ENTER key has been pressed. Since the judgement is "yes," the item number of the item where the cursor currently stays is read from cursor position memory 33 at step 157. In this case, item number #1 corresponding to item 1 is read. At step 158, the determination color is read from the item color information in the management information pack of VOBU#7. At step 159, sub-picture decoder 88 receives the color number of the determination color so that it can change an area specified with start coordinates (X1, Y1) and end coordinates (X2, Y2) for the item the cursor currently stays to the determination color. At step 160, the set register command "SetReg R1,1,+" written in the highlight command field is read from Highlight Information #1 of item number #1. By executing the command, embedded processor 96 adds "1" to the value stored in general-purpose register R1 specified by the command.

Note that if any of the other items is determined, embedded processor 96 ends the processing after executing command "NOP," namely, without any executions.

In this way, points are accumulated in a general-purpose register when the highlight command is executed.

After steps 136 through 138 are executed, control returns to step 136. When VOB#21 to VOB#40 of VOB#A1 are reproduced, the shot of European sceneries filmed from a train window is displayed on TV monitor 2. The menu of sub-picture pack #25 is superimposed on the image of video pack #25, the Pyrenees, on the same timing, as shown in FIG. 36. The menu says, "What is the total length of the Pyrenees?"

Suppose the user finally selects and determines item 3 during steps 151 through 155. Then, during steps 156 through 161, the disk reproduction apparatus operates as follows. Item number #3 corresponding to item 3 is read. The command "SetReg R1,1,+" written in the highlight command field is executed. If any of the other items is determined, embedded processor 96 ends the processing without any executions. In this way, in the above example, the presentation of questions are synchronized with the change of the scenes, and points are added each time the user correctly answers to the questions.

(2.3.3.3) Operation Example 2 . . . Reproduction Control for Third Menu

As steps 136 through 138 are repeated, the reproduction apparatus reads VOBU#41 to VOBU#60, and video decoder 87 and sub-picture decoder 88 decode the video packs and sub-picture packs to convert them into image signals. TV monitor 2 displays the works of Nietzsche. The menu of sub-picture pack 48 is superimposed on the image of video pack 48 on the same timing, as shown in FIG. 36.

Suppose the user finally selects and determines item 3. The command "SetReg R1,1,+" written in the highlight command field of item information #3 is executed. If any of the other items is determined, embedded processor 96 ends the processing without any executions.

(2.3.3.4) Operation Example 2 . . . Reproduction Control for Fourth Menu

As steps 136 through 138 are repeated, the reproduction apparatus reads VOBU#61 to VOBU#80, and video decoder 87 and sub-picture decoder 88 decode the video packs and sub-picture packs to convert them into image signals. TV monitor 2 displays the Shakespearian plays. The menu of sub-picture pack 65 is superimposed on the image of video pack 65 on the same timing, as shown in FIG. 36.

If the user selects and determines a correct item, the command "SetReg R1,1,+" written in the highlight command field of item information #3 is executed. If any of the other items is determined, embedded processor 96 ends the processing without any executions.

Here, it is supposed that the user has selected correct answers for the first, the third, and the fourth menu. Then, a general-purpose register stores "3" after three additions.

Steps 133–138 are repeated after the fourth menu is displayed and the user determines an item. The succeeding VOBS, namely, VOB#A2, VOB#A5, and VOB#A6, are sequentially reproduced. In each VOB, four or five questions are given to the user, as in VOB#A1, and the points are accumulated in register R1. After the reproduction of the last VOB, namely, VOB#A6, is completed, control moves to step 140.

(2.3.3.5) Operation Example 2 . . . Post-Processing by System Controlling Unit 93

The reproduction control moves from the GOP level to the route level after the reproduction of VOB#A6 is completed. Here, the route level is the post-processing. The post-processing is performed at steps 140–141. Step 141, which is described below, is repeated for each post-processing command written in the PGC command table.

Here, it is supposed that the post-processing command field of the entry program chain stores the following BRANCH command:

CmpRegLink R1,10,>,PGC#A3.

Embedded processor 96 fetches the above BRANCH command since it is written on the first row of the post-processing command start address pointer. On decoding the command, embedded processor 96 recognizes that the command is a BRANCH command specifying certain conditions, and fetches the operands, namely, "R1, 10," and ">." On decoding ">," embedded processor 96 judges whether the value in general-purpose register R1 is greater than 10. The value stored in register R1 indicates the points acquired by the user. Here, if register R1 stores a value greater than 10, the disk reproduction apparatus branches to PGC#A3 which displays an image representing "passed." If register R1 stores "10" or less, the disk reproduction apparatus branches to PGC#A4 which is a default branch target stored in PGC connection information and displays an image representing "not passed." That means which of the images "passed" and "not passed" is displayed is determined according to whether the total points exceed "10" or not.

(2.3.4) Operation Example 3

Figure 37:
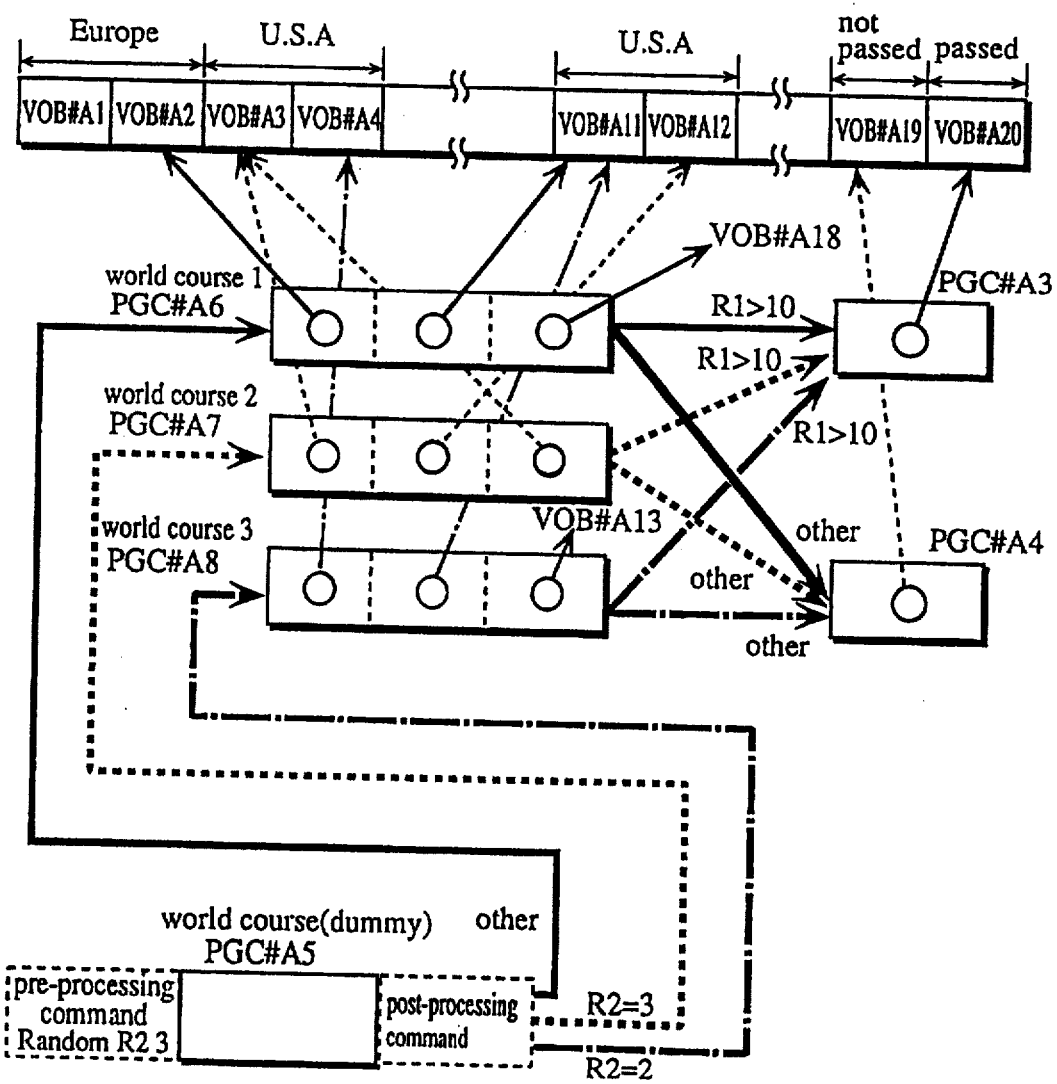
FIG. 37 shows how PGC information #A5 branches.

In Operation Example 3, it is supposed that the user selects "world course" of "round-the-world quiz" in the volume menu as shown in FIG. 33. The construction of Video Title Set "round-the-world quiz" is shown in FIGS. 34A, 34B, and 34C. Also, the connection of the program chains and the VOBs in "world course" of "round-the-world quiz" are shown in FIG. 37. Operation Example 3 is described below with reference to these drawings.

As indicated by reference c136 in FIG. 34A, "world course" of "round-the-world quiz" is reproduced according to PGC information #A3-#A8. PGC information #A3 for reproducing an image representing "not passed" and #A4 for "passed" are exclusively executed according to the points the user obtains through the quiz, as in Operation Example 2.

Each of PGC information #A6-#A8 includes a combination of three VOBs picked up from VOB#A1-VOB#A20, the combination being different from each other. The VOBs are questions given to the user. Also, each of PGC information #A6-#A8 includes the same PGC connection information, post-processing commands, and pre-processing commands as PGC information #A1 explained in Operation Example 2, except for the VOBs stored in each PGC information.

PGC information #A5 is executed first as the title is reproduced, and determines any of PGC information #A6-#A8 at random. FIG. 34C shows the contents of PGC information #A5. As shown in the drawing, PGC information #A5 stores command "Random R2,3" as a pre-processing command and also stores commands "CmpRegLink R2,2,=,PGC#A7" and "CmpRegLink R2,1,=, PGC#A8" as post-processing commands. The PGC connection information specifies PGC information #A6.

(2.3.4.1) Operation Example 3 . . . Pre-Processing

At step 131, embedded processor 96 fetches a pre-preprocessing command by referring to the pre-processing command start address pointer and decodes the operation code. Since the operation code is "Random," embedded processor 96 fetches immediate value "3" from the immediate value field. Then, a number is generated among the random numbers of maximum "3." The generated number is stored in general-purpose register R1 specified by identifier "R1" stored in the register identifier field. Then, control moves to steps 132–139 in FIG. 28.

(2.3.4.2) Operation Example 3 . . . Post-Processing

At steps 140–141, a branch target is selected from three branch targets since general-purpose register R1 stores any of random numbers generated by a "Random" command. That means, control branches to any of PGC information #A6, #A7, and #A8 at random. The VOBs specified by the program chains are reproduced sequentially. The points acquired by the user by answering the questions correctly are accumulated in register R1. When the reproduction of the program chains completes, the disk reproduction apparatus branches to PGC#A3 if the user is passed and to PGC#A4 if not passed.

(2.3.5) Operation Example 4

Operation Example 4 is an application to Operation Example 3. In Operation Example 3, a next program chain is selected using a random number. Now, it is also possible to determine a next program chain by combining a random number and the selection of an item by the user. This is described below.

Suppose the points obtained by the user for the questions of PGC information #A1 are stored in register R1. Also suppose one of ten pieces of PGC information #101–#110 is selected as the next branch target according to the points. The ten pieces of PGC information are graded based on the difficulty of the questions (PGC information #101 for the easiest and PGC information #110 for the most difficult). PGC information #B100 is used to select a program chain among the above pieces of PGC information. PGC information #100 stores the following post-processing commands:

CmpRegLink R1,10,<,PGC#100
SetReg R1,10,-
Random R2,R1
SetReg R2,100,+
Link R2, where the value as the points stored in register R1 ranges from "0" to "20."

If the user acquires point "9" or less, namely, a bad result, the disk reproduction apparatus branches to PGC information #101. For point "10" or more, a result of the point minus "10" becomes a base for generating a random number. "100" is added to the generated random number, and the result is converted into an identification code. The disk reproduction apparatus branches to a piece of PGC information specified by the identification code. That is, if the user obtains a good result in a current piece of PGC information (in this case, #A1), the next program chain is selected among a variety of higher ranks in the difficulty of the questions; if a bad result, among a variety of lower ranks.

As understood from the above description of the present embodiment, the Highlight Information set in a video object per GOP makes it possible for the disk reproduction apparatus to receive an instruction from the user with time accuracy of around 0.5 to 1.0 seconds synchronizing with the images and without halting the reproduction of the moving pictures.

Furthermore, a piece of PGC information that manages a plurality of video objects and the reproduction order as the reproduction route makes it possible for the disk reproduction apparatus to achieve a reproduction control in which a next group of consecutively reproduced moving pictures and the reproduction order are determined by evaluating the user instructions having been received.

In other words, a variety of interactive reproductions are achieved by the reproduction control of two levels, namely, the reproduction control with GOP level which synchronizes with the images and the reproduction control with route level which is performed independent of the images.

The reproduction control with two levels, or GOP level and route level, also enables the reduction in memory usage at the reproduction control, which is performed together with the image reproduction, to the memory usage for a piece of PGC information and a piece of Highlight Information, reducing the memory capacity required for the disk reproduction apparatus.

In the present embodiment, the VOB address information table of the PGC information includes a plurality of pieces of VOB address information specifying VOB recording sections to be used by the disk reproduction apparatus for reading VOBs. However, the VOB address information may specify a part of the VOB recording section so that the optical pickup can read the part of the VOB. Such a partial reading is called trimming. The part of a VOB fetched through trimming is operated in units of cells. The specification of a part of the VOB recording section in the VOB address information increases the use efficiency of image materials since a part of VOB can be used effectively.

In the present embodiment, the sub-picture data includes the image data of subtitles. However, the sub-picture data may include vector graphics or three dimensional computer graphics (CG). With such arrangements, games in which compressed moving pictures of filmed shots and CG are mixed may be achieved.

In the present embodiment, a VOB unit consists of a GOP. It is needless to say that if the stored moving pictures have a reproduction time of about a second, a VOB unit may consist of two or three GOPs with very short reproduction time. In this case, a management information pack is set before such a plurality of consecutive GOPs. The management information pack is effective for the plurality of GOPs.

In the present embodiment, the items in menus are reproduced with the sub-picture data. This is because with this arrangement, the change of the cursor is indicated by the change in color or contrast. However, the items may be reproduced with the moving picture data or may be replaced by narrations if such a change is not required.

In the present embodiment, the PCM data and the AC-3 data are used for the audio data. However, other kinds of audio data such as compressed PCM data, MPEG audio data, and MIDI data may be used as far as the data can be interleaved in the system stream.

In the present embodiment, the digital moving picture data under MPEG2 is used for the moving picture data. However, other kinds of moving picture data such as the digital moving picture data under MPEG1 and the digital moving picture data with a conversion algorithm other than DCT (Discrete Cosine Transform) under MPEG may be used as far as the moving picture data can form the multi-media data with the audio data and the sub-picture data.

In the present embodiment, the management information packs are included in VOBUs in units of GOPs, being the units of reproducing moving picture data. However, it is needless to say that if the method for compressing digital moving pictures changes, the unit of the management information pack changes according to the compression method.

In the present embodiment, the Highlight Information is stored in the same storage area with the control information for the trick-plays such as forward bind. The management information pack including the Highlight Information is allocated in units of GOPs. This is because the control information for trick-plays should be allocated per unit of reproducing moving picture data. However, the management information pack including the Highlight Information may be allocated in the units other than GOPs if the Highlight Information is not stored in the same storage area with the control information for the trick-plays. For example, the management information pack may be synchronized with an image frame reproduced per a thirtieth second, being far less than 0.5 to 1.0 seconds.

In the present embodiment, a read-only DVD is used. However, the same effects can be achieved by using a rewritable disk.

In the present embodiment, an item is selected and determined by using ten keys on remote controller 91. However, the means may be replaced by the use of mouse or instruction by voice.

The commands included in the management information packs may be executed automatically independent of user operations. This will enable the reproduction control in units of smaller time units.

In the present embodiment, the pre-processing and post-processing commands stored in the PGC information are executed in the route level. However, commands may be executed before or after a VOB in a program chain is reproduced. For example, with such an arrangement, a register may be cleared after a VOB is reproduced.

In the present embodiment, the PGC information, which is the reproduction control information used in the route level, and video objects are stored in different disk areas. However, the PGC information may be stored in the video objects themselves. For example, if another management information pack (hereinafter second management information pack) including the branch target program chains is interleaved in an image reproduction section which generates a branch, the disk reproduction apparatus branches to any of the program chains. With such arrangements, the disk reproduction apparatus can obtain necessary PGC information from the video object itself without disk seek, deleting the waiting time of the user in changing the reproduction route. This is described in detail with reference to FIG. 34A. The disk reproduction apparatus is supposed to branch to another program chain when the reproduction with PGC information #A1 is completed, that is, when the reproduction of the last VOB specified in PGC information #A1, namely, VOB#A6, is completed. The branch target here is any of PGC#A3 and PGC#A4. If the second management information pack is interleaved in the last VOB unit of VOB#A6, the disk reproduction apparatus obtains candidates for the branch target PGC information immediately before the branch and branches to a program chain without disk seek. For such a performance, the disk reproduction apparatus should have another buffer like the Highlight Information buffer for temporarily storing the candidates for branch target PGC information.

In the present embodiment, a random number is used as a dynamic parameter to specify a branch target of the reproduction. However, the dynamic parameter may be specified by another means such as the use of a timer. Also, a command may be introduced to instruct the disk reproduction apparatus to branch to a program chain when a timer interrupt is input. Such a command enables an interactive software title which gives questions to the user and rejects him/her if the he/she cannot answer by a time limit. Such an application may be effective as a teaching material.

Now, a method for producing an optical disk used in the present embodiment is described. The editor has to prepare master tapes such as video tapes of various shots filmed with video cameras and music tapes in which songs and sounds are recorded live. The moving pictures and sounds in the tapes are digitized and loaded into a nonlinear editing machine. The editor creates menus and items using application programs such as a graphic editor loaded in the editing machine, reproducing pictures and sounds frame by frame. The editor also creates management information packs having highlight commands by using a GUI generator and the like. Then, the editor encodes the above data under MPEG to create moving picture data, audio data, sub-picture data, and management information pack. Then, the editor creates the VOB unit and VOBs by using the nonlinear editing machine. The editor assigns numbers to the VOBs. Also, the editor creates PGC information #1, #2, #3, . . . , #n, video file unit title search pointer table, and video file management table. The editor loads these pieces of data into a memory in a workstation.

The data is converted into logical data sequences so that the data is recorded in the file area. The logical data sequences are recorded into a medium such as the magnetic tape, then converted to physical data sequences. The physical data sequences include volume data with ECC (Error Check Code), E-F conversion, data in the lead-in area and lead-out area. A master optical disk is produced by using the physical data sequences. Then, copies of the master optical disk are manufactured by using a pressing machine.

Conventional CD manufacturing machines may be used for manufacturing the above-constructed optical disk except a part of logical data sequences related to the data construction of the present invention. Concerning this point, please refer to Heitaro Nakajima and Hiroji Ogawa: Compact Disk Dokuhon, Ohmu Ltd and Applied Physics Society Optics Meeting: Optical Disk System, Asakura Shoten.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical disc comprising:
   a data region for storing a plurality of video sequences composed from a plurality of video segments, and
   a management information region for storing sequence information which indicates a reproduction order of video segments included in each video sequence and indicates positions of the video segments included in each video sequence, and sequence-link information indicating which video sequence follows each video sequence,
   wherein at least one of the video segments includes control information which enables another video sequence to be reproduced by seamlessly branching from the video segment containing the control information by disregarding both the current sequence information and the current sequence-link information.

2. An optical disc according to claim 1, wherein each video segment includes a plurality of video data units, and the control information is included in at least one of the video data units and is effective at least during a reproduction period of said video data unit.

3. An optical disc according to claim 2, wherein the control information indicates one of two or more video sequences is allowed to be reproduced so as to branch from the corresponding video segment by disregarding the sequence information and the sequence-link information, and includes information for presenting two or more selective items which correspond to the two or more video sequences, respectively.

4. An optical disc according to claim 1, wherein the sequence-link information indicates one of two or more video sequences follows each video sequence depending on a value of a predetermined parameter, and the control information includes updating information which is used for updating the value of the predetermined parameter.

5. A system for reproducing video data from an optical disc with a reproduction device comprising:
   an optical disc including a data region for storing a plurality of video sequences composed from a plurality of video segments, and a management information region for storing sequence information which indicates a reproduction order of video segments included in each video sequence and indicates positions of the video segments included in each video sequence, and sequence-link information indicating which video sequence follows each video sequence,
   wherein at least one of the video segments includes control information which enables another video sequence to be reproduced by seamlessly branching from the video segment containing the control information by disregarding both the current sequence information and the current sequence-link information; and
   a reproduction device including:
   a reading means capable of reading and reproducing the video segments, the sequence information and the sequence-link information from the optical disc;
   a memory for storing the sequence information, the sequence-link information and the control information separated from one of the video segments;
   a controller for controlling the reading means; and
   an instruction receiving means which is allowed to receive an instruction during the reproduction of the video segment including the control information,
   wherein the controller controls the reading means to read the sequence information and the sequence-link information from an optical disc, controls the reading means to read the video segments in accordance with the sequence information and the sequence-link information, and controls the reading means to read the video sequence indicated by the control information by disregarding both the sequence information and the sequence-link information, when the instruction receiving means receives an instruction from the control information during reproduction of the video segment to seamlessly branch to another video sequence.

6. A system according to claim 5, wherein each video segment includes a plurality of video data units, and the control information is included in at least one of the video data units and is effective at least during a reproduction period of said video data unit.

7. A system according to claim 6, wherein the control information indicates one of two or more video sequences is allowed to be reproduced so as to branch from the corresponding video segment disregarding the sequence information and the sequence-link information, and the control information includes information for displaying two or more selective items which correspond to the two or more video sequences, respectively
   wherein the reproduction apparatus further comprises means for outputting images corresponding to the two or more selective items.

8. A system according to claim 5, wherein the sequence-link information indicates that one of two or more video sequences follows each video sequence depending on a value of a predetermined parameter, and the control information includes updating information which is used for updating the value of the parameter,
   wherein the reproduction apparatus further comprises a register in which the predetermined parameter is set, and
   wherein the controller updates the value of the predetermined parameter based on the updating information included in the control information, selects one of the two or more video sequences indicated by the sequence-link information depending on the value of the predetermined parameter; and controls the reading means to read the selected one of the two or more video sequences.

9. A method for reproducing an optical disc including a data region for storing a plurality of video sequences composed from a plurality of video segments, and a management information region for storing sequence information which indicates a reproduction order of video segments included in each video sequence and indicates positions of the video segments included in each video sequence, and sequence-link information indicating which video sequence follows each video sequence,
   wherein at least one of the video segments includes control information which enables another video sequence to be reproduced by seamlessly branching from the video segment containing the control information by disregarding both the current sequence information and the current sequence-link information, comprising the steps of:

reading the sequence information and the sequence-link information from the optical disc;

storing the sequence information and the sequence-link information;

reading and reproducing the video segments in accordance with the sequence information and the sequence-ink information;

separating and storing the control information from the corresponding one of the video segments;

receiving an instruction; and reading and reproducing the video sequence indicated by the control information disregarding the sequence information and the sequence-link information when the instruction is received during reproduction of the video segment including the control information.

10. A method according to claim 9, wherein each video segment includes a plurality of video data units, and the control information is included in at least one of the video data units and is effective at least during a reproduction period of said video data unit.

11. A method according to claim 10, wherein the control information indicates one of the two or more video sequences is allowed to be reproduced so as to branch from the corresponding video segment disregarding the sequence information and the sequence-link information, and the control information includes information for displaying two or more selective items which correspond to the two or more video sequences, respectively.

12. A method according to claim 9, wherein the sequencing information indicates that one of the two or more video sequences follows each video sequence depending on a value of a predetermined parameter, and the control information includes updating information which is used for updating the value of the predetermined parameter, wherein the method further comprises the steps of:

registering the predetermined parameter in a register of a reproduction apparatus;

updating the value of the predetermined parameter based on the updating information included in the control information;

selecting one of the two or more video sequences indicated by the sequence-link information depending on the value of the predetermined parameter; and reading and reproducing the selected one of the two or more video sequences.

13. An optical disc comprising:

a data region for storing a plurality of video sequences composed from a plurality of video segments, and a management information region for storing sequence information which indicates a reproduction order of video segments included in each video sequence and indicates positions of the video segments included in each video sequence, and sequence-link information indicating which video sequence follows each video sequence, wherein at least one of the video segments includes control information which enables another video sequence to be reproduced by directly branching from the video segment containing the control information by disregarding both the current sequence information and the current sequence-link information.

14. An optical disc according to claim 13, wherein each video segment includes a plurality of video data units, and the control information is included in at least one of the video data units and is effective at least during a reproduction period of said video data unit.

15. An optical disc according to claim 14, wherein the control information indicates one of two or more video sequences is allowed to be reproduced so as to branch from the corresponding video segment by disregarding the sequence information and the sequence-link information, and includes information for presenting two or more selective items which correspond to the two or more video sequences, respectively.

16. An optical disc according to claim 13, wherein the sequence-link information indicates one of two or more video sequences follows each video sequence depending on a value of a predetermined parameter, and the control information includes updating information which is used for updating the value of the predetermined parameter.

17. A system for reproducing video data from an optical disc with a reproduction device comprising:

an optical disc including a data region for storing a plurality of video sequences composed from a plurality of video segments, and a management information region for storing sequence information which indicates a reproduction order of video segments included in each video sequence and indicates positions of the video segments included in each video sequence, and sequence-link information indicating which video sequence follows each video sequence, wherein at least one of the video segments includes control information which enables another video sequence to be reproduced by directly branching from the video segment containing the control information by disregarding both the current sequence information and the current sequence-link information; and a reproduction device including:

a reading means capable of reading and reproducing the video segments, the sequence information and the sequence-link information from the optical disc;

a memory for storing the sequence information, the sequence-link information and the control information separated from one of the video segments;

a controller for controlling the reading means; and an instruction receiving means which is allowed to receive an instruction during the reproduction of the video segment including the control information, wherein the controller controls the reading means to read the sequence information and the sequence-link information from an optical disc, controls the reading means to read the video segments in accordance with the sequence information and the sequence-link information, and controls the reading means to read the video sequence indicated by the control information by disregarding both the sequence information and the sequence-link information, when the instruction receiving means receives an instruction from the control information during reproduction of the video segment to directly branch to another video sequence.

18. A system according to claim 17, wherein each video segment includes a plurality of video data units, and the control information is included in at least one of the video data units and is effective at least during a reproduction period of said video data unit.

19. A system according to claim 18, wherein the control information indicates one of two or more video sequences is allowed to be reproduced so as to branch from the corresponding video segment disregarding the sequence information and the sequence-link information, and the control information includes information for displaying two or more selective items which correspond to the two or more video sequences, respectively wherein the reproduction apparatus further comprises means for outputting images corresponding to the two or more selective items.

20. A system according to claim 18, wherein the sequence-link information indicates that one of two or more video sequences follows each video sequence depending on a value of a predetermined parameter, and the control information includes updating information which is used for updating the value of the parameter, wherein the reproduction apparatus further comprises a register in which the predetermined parameter is set, and wherein the controller updates the value of the predetermined parameter based on the updating information included in the control information, selects one of the two or more video sequences indicated by the sequence-link information depending on the value of the predetermined parameter; and controls the reading means to read the selected one of the two or more video sequences.

21. A method for reproducing an optical disc including a data region for storing a plurality of video sequences composed from a plurality of video segments, and a management information region for storing sequence information which indicates a reproduction order of video segments included in each video sequence and indicates positions of the video segments included in each video sequence, and sequence-link information indicating which video sequence follows each video sequence, wherein at least one of the video segments includes control information which enables another video sequence to be reproduced by directly branching from the video segment containing the control information by disregarding both the current sequence information and the current sequence-link information, comprising the steps of:

reading the sequence information and the sequence-link information from the optical disc;

storing the sequence information and the sequence-link information;

reading and reproducing the video segments in accordance with the sequence information and the sequence-link information;

separating and storing the control information from the corresponding one of the video segments;

receiving an instruction; and reading and reproducing the video sequence indicated by the control information disregarding the sequence information and the sequence-link information when the instruction is received during reproduction of the video segment including the control information.

22. A method according to claim 21, wherein each video segment includes a plurality of video data units, and the control information is included in at least one of the video data units and is effective at least during a reproduction period of said video data unit.

23. A method according to claim 22, wherein the control information indicates one of the two or more video sequences is allowed to be reproduced so as to branch from the corresponding video segment disregarding the sequence information and the sequence-link information, and the control information includes information for displaying two or more selective items which correspond to the two or more video sequences, respectively.

24. A method according to claim 21, wherein the sequence-link information indicates that one of the two or more video sequences follows each video sequence depending on a value of a predetermined parameter, and the control information includes updating information which is used for updating the value of the predetermined parameter, wherein the method further comprises the steps of:

registering the predetermined parameter in a register of a reproduction apparatus;

updating the value of the predetermined parameter based on the updating information included in the control information;

selecting one of the two or more video sequences indicated by the sequence-link information depending on the value of the predetermined parameter; and reading and reproducing the selected one of the two or more video sequences.

25. A data storage device comprising:

a data region for storing a plurality of video sequences composed from a plurality of video segments, and a management information region for storing sequence information which indicates a reproduction order of video segments included in each video sequence and indicates positions of the video segments included in each video sequence, and sequence-link information indicating which video sequence follows each video sequence, wherein at least one of the video segments includes control information which enables another video sequence to be reproduced by directly branching from the video segment containing the control information by disregarding both the current sequence information and the current sequence-link information.

26. A data storage device according to claim 25, wherein each video segment includes a plurality of video data units, and the control information is included in at least one of the video data units and is effective at least during a reproduction period of said video data unit.

27. A data storage device according to claim 26, wherein the control information indicates one of two or more video sequences is allowed to be reproduced so as to branch from the corresponding video segment by disregarding the sequence information and the sequence-link information, and includes information for presenting two or more selective items which correspond to the two or more video sequences, respectively.

28. A data storage device according to claim 25, wherein the sequence-link information indicates one of two or more video sequences follows each video sequence depending on a value of a predetermined parameter, and the control information includes updating information which is used for updating the value of the predetermined parameter.

29. A system for reproducing video data from data storage device with a reproduction device comprising:

a data storage device including a data region for storing a plurality of video sequences composed from a plurality of video segments, and a management information region for storing sequence information which indicates a reproduction order of video segments included in each video sequence and indicates positions of the video segments included in each video sequence, and sequence-link information indicating which video sequence follows each video sequence, wherein at least one of the video segments includes control information which enables another video sequence to be reproduced by directly branching from the video segment containing the control information by disregarding both the current sequence information and the current sequence-link information; and a reproduction device including:
- a reading means capable of reading and reproducing the video segments, the sequence information and the sequence-link information from the data storage device;
- a memory for storing the sequence information, the sequence-link information and the control information separated from one of the video segments;
- a controller for controlling the reading means; and
- an instruction receiving means which is allowed to receive an instruction during the reproduction of the video segment including the control information, wherein the controller controls the reading means to read the sequence information and the sequence-link information from an optical disc, controls the reading means to read the video segments in accordance with the sequence information and the sequence-ink information, and controls the reading means to read the video sequence indicated by the control information by disregarding both the sequence information and the sequence-link information, when the instruction receiving means receives an instruction from the control information during reproduction of the video segment to directly branch to another video sequence.

30. A system according to claim 29, wherein each video segment includes a plurality of video data units, and the control information is included in at least one of the video data units and is effective at least during a reproduction period of said video data unit.

31. A system according to claim 30, wherein the control information indicates one of two or more video sequences is allowed to be reproduced so as to branch from the corresponding video segment disregarding the sequence information and the sequence-link information, and the control information includes information for displaying two or more selective items which correspond to the two or more video sequences, respectively wherein the reproduction apparatus further comprises means for outputting images corresponding to the two or more selective items.

32. A system according to claim 29, wherein the sequence-link information indicates that one of two or more video sequences follows each video sequence depending on a value of a predetermined parameter, and the control information includes updating information which is used for updating the value of the parameter, wherein the reproduction apparatus further comprises a register in which the predetermined parameter is set, and wherein the controller updates the value of the predetermined parameter based on the updating information included in the control information, selects one of the two or more video sequences indicated by the sequence-link information depending on the value of the predetermined parameter; and controls the reading means to read the selected one of the two or more video sequences.

* * * * *